US011931309B2

(12) United States Patent
Fujita et al.

(10) Patent No.: US 11,931,309 B2
(45) Date of Patent: Mar. 19, 2024

(54) ACTUATOR UNIT FOR KNEE-ANKLE-FOOT ORTHOSIS

(71) Applicants: Suncall Corporation, Kyoto (JP); Kyoto University, Kyoto (JP)

(72) Inventors: Yasushi Fujita, Kyoto (JP); Yuusuke Adachi, Kyoto (JP); Tadao Tsuboyama, Kyoto (JP); Noriaki Ichihashi, Kyoto (JP); Koji Ohata, Kyoto (JP)

(73) Assignees: Suncall Corporation, Kyoto (JP); Kyoto University, Kyoto (JP)

( * ) Notice: Subject to any disclaimer, the term of this patent is extended or adjusted under 35 U.S.C. 154(b) by 1164 days.

(21) Appl. No.: 16/489,542

(22) PCT Filed: Apr. 28, 2017

(86) PCT No.: PCT/JP2017/016885
§ 371 (c)(1),
(2) Date: Aug. 28, 2019

(87) PCT Pub. No.: WO2018/158968
PCT Pub. Date: Sep. 7, 2018

(65) Prior Publication Data

US 2020/0069505 A1 Mar. 5, 2020

(30) Foreign Application Priority Data

Mar. 3, 2017 (JP) ................................ 2017-040079

(51) Int. Cl.
*A61H 3/00* (2006.01)

(52) U.S. Cl.
CPC ......... *A61H 3/00* (2013.01); *A61H 2003/007* (2013.01); *A61H 2201/1642* (2013.01); *A61H 2201/165* (2013.01)

(58) Field of Classification Search
CPC ................ A61H 3/00; A61H 2003/007; A61H 2201/1642; A61H 2201/165
See application file for complete search history.

(56) References Cited

U.S. PATENT DOCUMENTS

2010/0036302 A1 2/2010 Shimada et al.
2012/0016493 A1 * 1/2012 Hansen ................ A61F 2/6607 623/53

(Continued)

FOREIGN PATENT DOCUMENTS

CN 103610568 A 3/2014
JP 2011-104035 A 6/2011

(Continued)

OTHER PUBLICATIONS

Search Report and Written Opinion for European Application No. 17898613.9, European Patent Office, dated Dec. 9, 2020, 5 pages.

(Continued)

*Primary Examiner* — Jerrah Edwards
*Assistant Examiner* — Aren Patel
(74) *Attorney, Agent, or Firm* — Sterne, Kessler, Goldstein & Fox P.L.L.C.

(57) ABSTRACT

An actuator unit of the present invention includes upper and lower frames respectively connectable to a thigh frame and a lower leg frame, an actuator-side rotational connecting part connecting both frames in a rotatable manner around a pivot axis, a driver producing driving force for rotating the lower frame around the pivot axis, upper and lower connecting bodies respectively connecting the upper frame to the thigh frame and the lower frame to the lower leg frame, and an intermediate connecting body connecting the vicinity of the actuator-side rotational connecting part to the vicinity of a brace-side rotational connecting part, the intermediate connecting body having a ball stud and an accommodation (Continued)

depression respectively provided on one and the other of the knee-ankle-foot orthosis and the actuator unit.

12 Claims, 44 Drawing Sheets

(56) References Cited

U.S. PATENT DOCUMENTS

| | | | | |
|---|---|---|---|---|
| 2015/0351995 | A1* | 12/2015 | Zoss | A61H 1/0244 623/32 |
| 2016/0184165 | A1* | 6/2016 | Ohta | A61H 3/00 623/27 |
| 2016/0331624 | A1* | 11/2016 | Sankai | B25J 9/101 |
| 2018/0036147 | A1* | 2/2018 | Gregg | A61F 2/60 |
| 2018/0280163 | A1* | 10/2018 | Dietl | A61F 2/64 |
| 2018/0358870 | A1* | 12/2018 | Kawanami | A61H 1/0266 |

FOREIGN PATENT DOCUMENTS

| | | | |
|---|---|---|---|
| JP | 2012-165821 | A | 9/2012 |
| JP | 2014-144037 | A | 8/2014 |
| JP | 5724312 | B2 | 5/2015 |
| JP | 2016119996 | A | 7/2016 |
| KR | 20100044358 | A | 4/2010 |
| WO | 2008005330 | A2 | 1/2008 |
| WO | WO 2010/129716 | A1 | 11/2010 |

OTHER PUBLICATIONS

Search Report for Chinese Application No. 2017800901781, Chinese Patent Office, dated May 24, 2021, 1 page.

International Search Report of International Application No. PCT/JP2017/016885, dated Jul. 25, 2017, 3 pages.

* cited by examiner

ACTUATOR UNIT FOR KNEE-ANKLE-FOOT ORTHOSIS

FIELD OF THE INVENTION

The present invention relates to an actuator unit that is attachable to a knee-ankle-foot orthosis.

BACKGROUND ART

Knee-ankle-foot orthoses for supporting a knee joint are utilized as gait assistance or rehabilitation devices for people with leg disability or people with paralysis due to a stroke or the like, and knee-ankle-foot orthoses are also proposed that are equipped with an actuator unit including a driver such as an electric motor for assisting movement of a leg (see Patent Literature 1 below).

Meanwhile, the knee-ankle-foot orthosis has a thigh attachment and a lower leg attachment respectively attached to a user's thigh and lower leg, a thigh frame and a lower leg frame respectively supporting the thigh attachment and the lower leg attachment, and a brace-side rotational connecting part connecting the lower leg frame and the thigh frame such that the lower leg frame is rotatable around the swing axis of the user's knee joint relative to the thigh frame. The knee-ankle-foot orthosis is custom-made according to the physique of each user.

Specifically, the tilt angle and/or the curvature in the user width direction of the thigh relative to the lower leg is different depending on the physique of each user. Thus, when producing a knee-ankle-foot orthosis, the tilt angle and/or the curvature in the user width direction of the thigh frame relative to the lower leg frame needs to be tailored according to the physique of a user.

Accordingly, in conventional knee-ankle-foot orthoses equipped with an actuator unit, the actuator unit has to be produced as an exclusive product customized according to the size and shape of the knee-ankle-foot orthosis to which the actuator unit is to be attached, thus resulting in increased costs of knee-ankle-foot orthoses equipped with an actuator unit.

A motion assisting device that is detachably attached to a prosthetic limb is also proposed (see Patent Literature 2 below).

The motion assisting device described in Patent Literature 2 is detachably attached to a prosthetic limb having a first frame corresponding to the thigh, a second frame corresponding to the lower leg, and a joint rotatably connecting the first and second frames.

Specifically, the motion assisting device includes a driving part having first and second motor housings that are rotatable relative to each other, and is configured such that the screw extending from a first connecting part fixed to the first frame is inserted into the through hole of a first driving end part extending from the first motor housing and secured by a nut, and the screw extending from a second connecting part fixed to the second frame is inserted into a through hole of a second driving end part extending from the second motor housing and secured by a nut.

However, the motion assisting device described in Patent Literature 2 is attached to the prosthesis at the upper and lower sides of the driving part without connecting the driving part to the joint (the driving part is free from the joint). Accordingly, the rotational axis of the driving part and the swing axis of the joint may be positionally shifted during use.

Moreover, when attaching and detaching the motion assisting device of Patent Literature 2 to and from the prosthetic limb, screws have to be attached or detached on both upper and lower sides of the driving part while somehow lifting up the relatively heavy motion assisting device, and thus the attachment and detachment operations are extremely troublesome.

PRIOR ART DOCUMENT

Patent Literature

Patent Literature 1: JP 5724312B
Patent Literature 2: JP 2014-144037A

SUMMARY OF THE INVENTION

The present invention has been conceived in view of such conventional art, and an object of the present invention is to provide an actuator unit attachable to various knee-ankle-foot orthoses that are custom-made according to the user's physique.

In order to achieve the object, the present invention provides an actuator unit attachable to knee-ankle-foot orthosis. Knee-ankle-foot orthosis include a thigh attachment and a lower leg attachment to be respectively attached to the user's thigh and lower leg, a thigh frame and a lower leg frame respectively supporting the thigh attachment and the lower leg attachment, and a brace-side rotational connecting part connecting the thigh frame and the lower leg frame such that the lower leg frame is rotatable relative to the thigh frame around a brace-side pivot axis that is coaxial with the swing axis of the user's knee joint. The actuator unit includes an upper frame connectable to the thigh frame; a lower frame connectable to the lower leg frame; an actuator-side rotational connecting part connecting both frames such that the lower frame is rotatable around an actuator-side pivot axis relative to the upper frame; a driver mounted on an outer surface of the upper frame and producing driving force for rotating the lower frame around the actuator-side pivot axis; an upper connecting body connecting the upper frame to the thigh frame; an intermediate connecting body connecting the vicinity of the actuator-side rotational connecting part to the vicinity of the brace-side rotational connecting part; and a lower connecting body connecting the lower frame to the lower leg frame such that the lower leg frame is rotated around the brace-side pivot axis relative to the thigh frame by utilizing the rotational movement of the lower frame around the actuator-side pivot axis relative to the upper frame. The intermediate connecting body is provided with a ball stud provided on one of the knee-ankle-foot orthosis and the actuator unit concentrically with the corresponding pivot axis, and an accommodation depression that is provided on the other of the knee-ankle-foot orthosis and the actuator unit concentrically with the corresponding pivot axis in such a manner that a spherical head part of the ball stud is rotatably and detachably accommodated in the accommodation depression.

The actuator unit for knee-ankle-foot orthosis according to the present invention makes it possible to realize a state in which the lower leg frame is rotated around the brace-side pivot axis in response to the rotation of the lower frame around the actuator-side pivot axis without precisely matching the actuator-side pivot axis and the brace-side pivot axis. Accordingly, the actuator unit can be appropriately attached to variously shaped knee-ankle-foot orthoses that are custom-made according to the user's physique.

In a preferable embodiment, the spherical head part has a large diameter part having the largest diameter, a distal end-side spherical surface part, the diameter of which is reduced toward the distal end side from the large diameter part, and a proximal end-side spherical surface part, the diameter of which is reduced toward the proximal end side from the large diameter part. The accommodation depression is provided with an annular engagement groove at a portion, which the proximal end-side spherical surface part of the spherical head part faces when the spherical head part is accommodated in the accommodation depression. A retaining member is inserted into the annular engagement groove.

The retaining member is shaped such that force for expanding the retaining member in the radially outward direction is exerted on the retaining member by the movement of the spherical head part in the axial direction, and the retaining member is inserted into the annular engagement groove so as to prevent passage of the maximum diameter part of the spherical head part when the force resulting from the axial movement of the spherical head part is equal to or less than a predetermined value and so as to be elastically deformed in the radially outward direction by the spherical head part and permit passage of the maximum diameter part of the spherical head part when the force exceeds the predetermined value.

In a first example, the upper frame has an upper frame main body extending vertically so as to face the thigh frame, a connecting wall body extending outward in the user width direction from the vertically intermediate position of the upper frame main body, and an outer wall body extending downward from the connecting wall body so as to be opposed to a downward extending portion of the upper frame main body, which extends downward below the connecting wall body, while retaining an accommodating space in the user width direction between the outer wall body and the downward extending portion. The actuator-side rotational connecting part has a swing shaft, which is supported by the downward extending portion and the outer wall body such that the swing shaft crosses the accommodating space in the user width direction and defines the actuator-side pivot axis, and supports the lower frame. The ball stud is provided on the knee-ankle-foot orthosis, and the accommodation depression is provided on the downward extending portion so as to be open toward the knee-ankle-foot orthosis.

In the first example, the brace-side rotational connecting part preferably has a swinging connector for connecting the thigh frame and the lower leg frame so as to be rotatable around the brace-side pivot axis by being inserted into a brace-side frame attachment hole formed by a thigh frame attachment hole provided in the thigh frame coaxially with the brace-side pivot axis and a lower leg frame attachment hole provided in the lower leg frame coaxially with the brace-side pivot axis.

The swinging connector has an internally threaded member and an externally threaded member, the internally threaded member including a cylindrical part to be inserted into the brace-side frame attachment hole from one side in the user width direction and a flange part extending more radially outward than the brace-side frame attachment hole from one side in the user width direction of the cylindrical part, the cylindrical part having a screw hole that is open toward the free end side, the externally threaded member having a cylindrical part that has an external thread to be screwed into the screw hole from the other side in the user width direction and a flange part that extends more radially outward than the brace-side frame attachment hole from the other side in the user width direction of the cylindrical part.

In this configuration, the ball stud is provided on the knee-ankle-foot orthosis by being screw-connected to an inner threaded member positioned on the inner side in the user width direction among the internally threaded member and the externally threaded member in place of an outer threaded member positioned on the outer side in the user width direction among the internally threaded member and the externally threaded member.

In a case where the internally threaded member is the inner threaded member, the ball stud is screw-connected to the inner threaded member via a fastening member inserted in an axial hole that penetrates the ball stud in the axial direction.

In this case, the axial hole has a large diameter hole that is open on the side where the spherical head part is positioned with respect to the axial direction, a small diameter hole that is open on the side opposite to the spherical head part with respect to the axial direction, and a step connecting the large diameter hole and the small diameter hole. The fastening member has a head part inserted in the large diameter hole and a shaft part that is reduced in diameter from the head part via a radially extending part and that penetrates the small diameter hole to extend outward, a portion of the shaft part extending outward, with the radially extending part being in contact with the step, has a screw structure screwed into the internally threaded member.

In any one of the above various configurations, the upper connecting body may include an upper rotational shaft provided on the upper frame so as to extend inward in the user width direction, an upper fastening member supported by the upper rotational shaft so as to be rotatable around an axis, and an upper receiving member supported by the upper frame in a position spaced apart in the user front-back direction from the upper rotational shaft only a distance that enables the thigh frame to be interposed between the upper receiving member and the upper rotational shaft.

The upper fastening member has a bearing part supported by the upper rotational shaft and a cam part extending radially outward from the bearing part. The cam part is configured such that a radial distance between an outer circumferential surface of the cam part and the axis of the upper rotational shaft is increased toward a first side around the axis of the upper rotational shaft.

In the state where the upper fastening member is positioned in a released position around the upper rotational shaft, relatively moving the upper frame and the thigh frame toward each other with respect to the user width direction enables the thigh frame to be positioned in the space between the upper fastening member and the upper receiving member, and in the state where the thigh frame is positioned in the space, relatively moving the upper frame and the thigh frame away from each other with respect to the user width direction enables the thigh frame to be retreated from the space, while, in the state where the thigh frame is positioned in the space, rotating the upper fastening member from the released position around the upper rotational shaft to a second side opposite to the first side around the axis causes the cam part to hold the thigh frame in cooperation with the upper receiving member with respect to the user front-back direction, and thereby the upper frame is connected to the thigh frame.

The upper fastening member preferably may have an operation arm extending radially outward from the bearing part in a position circumferentially different from the cam part.

In this case, a radial length between a free end of the operation arm and the axis of the upper rotational shaft is greater than a radial length between the radially outermost end of the cam part and the axis (251*a*) of the upper rotational shaft.

The upper connecting body preferably may include an upper receiving shaft provided on the upper frame so as to extend inward in the user width direction. The upper receiving member may include an elastic roller supported by the upper receiving shaft. The upper fastening member may have an engagement arm extending radially outward from the bearing part on the inner side in the user width direction than the cam part.

The engagement arm is provided with an engagement groove for engagement with a portion of the upper receiving shaft, which extends more inward in the user width direction than the elastic roller, when the upper fastening member is rotated around the upper rotational shaft from the released position toward the second side around the axis to hold the thigh frame with respect to the user front-back direction in cooperation with the upper receiving member.

In any one of the above various configurations, the lower connecting body may include a lower rotational shaft provided on the lower frame so as to extend inward in the user width direction, a lower fastening member supported by the lower rotational shaft so as to be rotatable around an axis and a lower receiving member supported by the lower frame in a position spaced apart in the user front-back direction from the lower rotational shaft only a distance that enables the lower leg frame to be interposed between the lower fastening member and the lower rotational shaft.

The lower fastening member has a bearing part supported by the lower rotational shaft and a cam part extending radially outward from the bearing part. The cam part is configured such that a radial distance between an outer circumferential surface of the cam part and the axis of the lower rotational shaft is increased toward a first side around the axis of the lower rotational shaft.

In the state where the lower fastening member is positioned in a released position around the lower rotational shaft, relatively moving the lower frame and the lower leg frame toward each other with respect to the user width direction enables the lower leg frame to be positioned in the space between the lower fastening member and the lower receiving member, and in the state where the lower leg frame is positioned in the space, relatively moving the lower frame and the lower leg frame away from each other with respect to the user width direction enables the lower leg frame to be retreated from the space, while, in the state where the lower leg frame is positioned in the space, axially rotating the lower fastening member from the released position around the lower rotational shaft to a second side opposite to the first side causes the cam part to hold the lower leg frame in cooperation with the lower receiving member with respect to the user front-back direction, and thereby the lower frame is connected to the lower leg frame.

The lower fastening member preferably may have an operation arm extending radially outward from the bearing part in a position circumferentially different from the cam part.

The operation arm is configured such that the radial length between the free end of the operation arm and the axis of the lower rotational shaft is greater than the radial length between the radially outermost end of the cam part and the axis of the lower rotational shaft.

The lower connecting body preferably may include a lower receiving shaft provided on the lower frame so as to extend inward in the user width direction. The lower receiving member includes an elastic roller supported by the lower receiving shaft. The lower fastening member has an engagement arm extending radially outward from the bearing part in a position more inside in the user width direction than the cam part.

The engagement arm is provided with an engagement groove for engagement with a portion of the lower receiving shaft, which extends more inward in the user width direction than the elastic roller, when the lower fastening member is rotated around the lower rotational shaft from the released position toward the second side around the axis to hold the lower leg frame with respect to the user front-back direction in cooperation with the lower receiving member.

The lower frame preferably include a first lower frame connected to the upper frame via the actuator-side rotational connecting part so as to be rotatable around the actuator-side pivot axis, and a second lower frame directly or indirectly supporting the lower rotational shaft and the lower receiving member. The second lower frame is connected to the first lower frame so as to be rotatable around a swing shaft in the user front-back direction.

In order to achieve the object, a second aspect of the present invention provides an actuator unit attachable to knee-ankle-foot orthosis including a thigh attachment and a lower leg attachment to be respectively attached to the user's thigh and lower leg, a thigh frame and a lower leg frame respectively supporting the thigh attachment and the lower leg attachment, and a brace-side rotational connecting part connecting the thigh frame and the lower leg frame such that the lower leg frame is rotatable relative to the thigh frame around a brace-side pivot axis that is coaxial with the swing axis of the user's knee joint, the actuator unit of the second aspect includes an upper frame opposed to an outer side thigh frame that is positioned on the outer side in the user width direction among the thigh frame; a lower frame opposed to an outer side lower leg frame that is positioned in on the outer side in the user width direction among the lower leg frame; an actuator-side rotational connecting part connecting the upper and lower frames such that the lower frame is rotatable around a pivot axis relative to the upper frame; a driver mounted on an outer surface of the upper frame and producing driving force for rotating the lower frame around the pivot axis; an upper connecting body engaging the upper frame with the outer side thigh frame; and a lower connecting body transmitting movement of the lower frame to the outer side lower leg frame, wherein the upper connecting body has an outer elastic body and an inner connecting member, the outer elastic body being disposed between an outer binding region of an inner surface of the upper frame, which faces the outer surface of the outer side thigh frame, and the outer surface of the outer side thigh frame, and the inner connecting member having an inner binding region that is opposed to the inner surface of the outer side thigh frame on the side surface facing outward in the user width direction, and is detachably connected to the upper frame such that the outer side thigh frame and the outer elastic body are pressed by the inner binding region and the outer binding region.

The actuator unit for knee-ankle-foot orthosis according to the second aspect of the present invention makes it possible to absorb the difference in the tilt angle and/or curvature of the outer side thigh frame relative to the outer side lower leg frame, which exists among variously shaped knee-ankle-foot orthoses that are custom-made according to the user's physique.

Accordingly, the actuator unit can be adequately attached to variously shaped knee-ankle-foot orthoses.

In the actuator unit for knee-ankle-foot orthosis according to the second aspect, the upper connecting body preferably may have an inner elastic body interposed between the inner binding region and the inner surface of the outer side thigh frame.

In order to achieve the object, a third aspect of the present invention provides an actuator unit attachable to knee-ankle-foot orthosis including a thigh attachment and a lower leg attachment to be respectively attached to the user's thigh and lower leg, a thigh frame and a lower leg frame respectively supporting the thigh attachment and the lower leg attachment, and a brace-side rotational connecting part connecting the thigh frame and the lower leg frame such that the lower leg frame is rotatable relative to the thigh frame around a swing axis of the user's knee joint, the actuator unit of the third aspect includes an upper frame opposed to an outer side thigh frame that is positioned on the outer side in the user width direction among the thigh frame; a lower frame opposed to an outer side lower leg frame that is positioned on the outer side in the user width direction among the lower leg frame; an actuator-side rotational connecting part connecting the upper and lower frames such that the lower frame is rotatable around a pivot axis relative to the upper frame; a driver mounted on an outer surface of the upper frame and producing driving force for rotating the lower frame around the pivot axis; an upper connecting body engaging the upper frame with the outer side thigh frame; and a lower connecting body transmitting movement of the lower frame to the outer side lower leg frame, wherein the upper connecting body has an outer spacer and an inner connecting member, the outer spacer being detachably attached to an outer binding region of an inner surface of the upper frame, which faces the outer surface of the outer side thigh frame, the inner connecting member having an inner binding region that is opposed to the inner surface of the outer side thigh frame on the side surface facing outward in the user width direction, and is detachably connected to the upper frame such that the outer side thigh frame and the outer elastic body are pressed by the inner binding region and the outer binding region, and the outer spacer being configured such that the side surface facing outward in the user width direction is in surface contact with the outer binding region and that the side surface facing inward in the user width direction is in surface contact with the outer surface of the outer side thigh frame.

According to the actuator unit for knee-ankle-foot orthosis of the third aspect, it is possible to be adequately attached to variously shaped knee-ankle-foot orthoses, merely by replacing the outer spacer with a dedicated outer spacer that has a shape adjusted to the tilt angle and/or curvature of the outer side thigh frame relative to the outer side lower leg frame in the corresponding knee-ankle-foot orthosis among variously shaped knee-ankle-foot orthoses that are custom-made according to the user's physique.

In the actuator unit for knee-ankle-foot orthosis according to the third aspect, the upper connecting body preferably may have an inner spacer detachably attached to the inner binding region.

The inner spacer is configured such that the side surface facing inward in the user width direction is in surface contact with the inner binding region and that the side surface facing outward in the user width direction is in surface contact with the inner surface of the outer side thigh frame.

In any one of the above various configurations of the actuator unit for knee-ankle-foot orthosis according to the second and third aspects, the lower connecting body preferably may have a lower frame-side engagement part provided on the inner surface of the lower frame, lower frame-side engagement part having a depressed or projecting shape in the user width direction and being directly or indirectly depression/projection-engaged with the outer side lower leg frame.

In any one of the above various configurations, the actuator unit preferably may include a rotation center connecting body that causes the actuator-side connecting part to be coaxially engaged with the brace-side connecting part.

In a case where the brace-side rotational connecting part has a thigh frame attachment hole provided in the lower part of the outer side thigh frame, a lower leg frame attachment hole provided in the upper part of the outer side lower leg frame, an internally threaded member having a screw hole and inserted into the thigh frame attachment hole and the lower leg frame attachment hole in such a manner that the screw hole is open outward in the user width direction, and an externally threaded member that is screwed into the screw hole of the internally threaded member and that connects the outer side thigh frame and the outer side lower leg frame so as to be capable of relative rotation, and the actuator-side connecting part has an upper frame-side attachment hole provided in the lower part of the upper frame, a lower frame-side attachment hole provided in the upper part of the lower frame, and a rotational connecting shaft inserted in the upper frame-side attachment hole and the lower frame-side attachment hole, the rotation center connecting body may include a brace-side rotation center connecting member that has an external thread screwed into the screw hole of the internally threaded member on one end side and one of a projection and a depression on the other end side, and an actuator-side rotation center connecting member fixed to the upper frame so as to be positioned coaxially with the upper frame-side attachment hole, the actuator-side rotation center connecting member having the other of the projection and the depression that is depression/projection-engaged with the one of the projection and the depression of the brace-side rotation center connecting member.

In order to provide an actuator unit capable of being attached to variously shaped knee-ankle-foot orthoses that are custom-made according to the user's physique in a state where a pivot axis of the actuator unit is reliably aligned with a swing axis of the corresponding knee-ankle-foot orthosis, a fourth aspect of the present invention provides an actuator unit attachable to knee-ankle-foot orthosis including a thigh attachment and a lower leg attachment to be respectively attached to the user's thigh and lower leg, a thigh frame and a lower leg frame respectively supporting the thigh attachment and the lower leg attachment, and a brace-side rotational connecting part connecting the thigh frame and the lower leg frame such that the lower leg frame is rotatable relative to the thigh frame around a swing axis of the user's knee joint, the actuator unit of the fourth aspect includes an upper frame connectable to an outer side thigh frame that is positioned on the outer side in the user width direction among the thigh frame; a lower frame connectable to an outer side lower leg frame that is positioned on the outer side in the user width direction among the lower leg frame; an actuator-side rotational connecting part connecting the upper and lower frames such that the lower frame is rotatable around the pivot axis relative to the upper frame; a driver mounted on an outer surface of the upper frame and producing driving force for rotating the lower frame around the pivot axis; an upper connecting body engaging the upper frame with the thigh frame; a rotation center connecting body for coaxially connecting the actuator-side rotational connecting part to the brace-side rotational connecting body; and a lower connecting body for connecting the lower frame to the lower leg frame such that the lower leg frame is rotated around the swing axis relative to the thigh frame by utilizing the rotational movement of the lower frame around the pivot axis relative to the upper frame.

The actuator unit for knee-ankle-foot orthosis according to the fourth aspect can be appropriately attached to variously shaped knee-ankle-foot orthoses that are custom-made according to the user's physique in a state where the pivot axis of the actuator unit is reliably aligned with the swing axis of the corresponding knee-ankle-foot orthosis.

The brace-side rotational connecting part may has a thigh frame attachment hole provided in the lower part of the thigh frame coaxially with the swing axis, a lower leg frame attachment hole provided in the upper part of the lower leg frame coaxially with the swing axis, and a swinging connector that is inserted into a brace-side frame attachment hole formed by the thigh frame attachment hole and the lower leg frame attachment hole and that connects the thigh frame and the lower leg frame so as to be rotatable around the swing axis.

The swinging connector may have an internally threaded member and an externally threaded member, the internally threaded member having a cylindrical part to be inserted into the brace-side frame attachment hole from one side in the user width direction and a flange part extending more radially outward than the brace-side frame attachment hole from one side in the user width direction of the cylindrical part, the cylindrical part having a screw hole that is open toward the free end side, the externally threaded member having a cylindrical part that has an external thread to be screwed into the screw hole from the other side in the user width direction and a flange part extending more radially outward than the brace-side frame attachment hole from the other side in the user width direction of the cylindrical part.

The actuator side rotational connecting part has an upper frame attachment hole provided in the lower part of the upper frame, a lower frame attachment hole provided in the upper part of the lower frame, and a rotational connecting shaft that is inserted into an actuator-side frame attachment hole formed by the upper frame attachment hole and the lower frame attachment hole and that supports the upper frame and the lower frame so as to be rotatable around the pivot axis The rotation center connecting body has a brace-side rotation center connecting member and an actuator-side rotation center connecting member. The brace-side rotation center connecting member has a screw structure that can be screwed to the screw hole or the external screw of the threaded member, which is inserted in the brace-side attachment hole from the inner side in the user width direction, among the internally threaded member and the externally threaded member on one end side and a brace-side depression/projection engagement part on the other end side. The actuator-side rotation center connecting member has an actuator-side depression/projection engagement part that can be detachably depression/projection-engaged with the brace-side depression/projection engagement part, and is fixed to the upper frame or the lower frame.

The brace-side depression/projection engagement part and the actuator-side depression/projection engagement part are configured so as to attain a coaxially connected state where the actuator unit is connected to the knee-ankle-foot orthosis, with the swing axis and the pivot axis being coaxially positioned, by relatively moving the actuator unit in the user width direction toward the knee-ankle-foot orthosis to mutually depression/projection-engage the actuator unit and the knee-ankle-foot orthosis, and cancel the depression/projection engagement from the coaxially connected state by relatively moving the actuator unit away from the knee-ankle-foot orthosis in the user width direction.

In one embodiment of the actuator unit for knee-ankle-foot orthosis according to the fourth aspect, the internally threaded member is a threaded member inserted into the brace-side attachment hole from the inner side in the user width direction, the brace-side depression/projection engagement part of the brace-side rotation center connecting member is a projecting engagement part facing outward in the user width direction coaxially with the swing axis, and the actuator-side depression/projection engagement part of the actuator-side rotation center connecting member is a depressed engagement part facing inward in the user width direction coaxially with the pivot axis so as to detachably depression/projection-engage with the brace-side depression/projection engagement part.

In a first example regarding the lower connecting body, the lower connecting body has a lower engagement groove directly or indirectly provided in one of the lower frame and the lower leg frame.

The lower engagement groove is open toward the other of the lower frame and the lower leg frame and extends in the longitudinal direction of said one of the frames. The lower engagement groove is configured so as to be directly or indirectly depression/projection-engaged with the other frame by relatively moving the actuator unit toward the knee-ankle-foot orthosis in the user width direction so that an interlocking state is attained where the lower leg frame is rotated around the swing axis relative to the thigh frame in conjunction with the rotational movement the lower frame around the pivot axis relative to the upper frame, with the lower frame being relatively movable relative to the lower leg frame in the longitudinal direction of the frame and outward in the user width direction. The lower engagement groove is also configured so as to cancel the depression/projection engagement by relatively moving the actuator unit away from the knee-ankle-foot orthosis in the user width direction from the interconnecting state.

For example, the lower connecting body may have a lower projecting member that is fixed to the other of the lower frame and the lower leg frame and that is capable of depression/projection engagement with the lower engagement groove, and a retaining mechanism.

The lower projecting member may have a proximal end part fixed to the other of the lower frame and the lower leg frame, an extending part extending in the user width direction from the proximal end part and having a narrower width than the opening width of the lower engagement groove, and a wide head part enlarged from the free end of the extending part in the width direction of the lower engagement groove via a step to a size that enables insertion into the lower engagement groove.

The retaining mechanism may have a shutter member provided on one of the lower frame and the lower leg frame so as to be capable of changing the position, and a retaining biasing member for biasing the shutter member.

The shutter member is provided on one of the lower frame and the lower leg frame so as to be slidable in the width direction of the lower engagement groove such that the shutter member can reach a retaining position in which the shutter member partially cover the lower engagement groove so as to be engaged with the step, with the wide head part being inserted in the lower engagement groove, and a retreated position in which the lower engagement groove is open such that the wide head part is capable of advancing and retreating relative to the lower engagement groove. The retaining biasing member biases the shutter member toward the retaining position.

Preferably, a cam surface that converts the relative movement of the lower frame toward the lower leg frame in the user width direction into force for pressing the shutter member from the retaining position toward the retreated position against the biasing force of the retaining biasing member can be provided on at least one of the contact portions of the wide head part and the shutter member brought into contact with each other when bringing the lower frame spaced apart from the lower leg frame close to the lower leg frame in the user width direction.

In a configuration where the lower connecting body is provided with the retaining mechanism, the lower connecting body is further provided with a lower depressed member that is formed with the lower engagement groove and that is fixed to the lower frame, and the lower projecting member is fixed to the lower leg frame.

In this case, the retaining mechanism is provided on the lower depressed member.

In a second example regarding the lower connecting body, the lower frame is configured to have a proximal end part connected to the upper frame so as to be rotatable around the pivot axis, and a distal end part extending from the proximal end part toward the lower leg frame. The distal end part has an opposing surface that faces the outer surface of the lower leg frame facing outward in the user width direction and that has a predetermined length in a width direction corresponding to the width direction of the lower leg frame.

The lower connecting body has a support hole formed in the distal end part of the lower frame so as to open to the opposing surface in an intermediate region in the width direction of the opposing surface and extends in a direction substantially perpendicular to the outer surface of the lower leg frame, an engagement pin that is accommodated in the support hole so as to capable of advancing and retreating and that can take a projecting position where the distal end projects from the opposing surface and a retreated position where the distal end is in the support hole so as to be away from the lower leg frame, a biasing spring for biasing the engagement pin toward the projecting position, and an engagement arm provided on the opposing surface in a position spaced away from the engagement pin in the width direction.

The engagement arm has an axially extending part extending from the opposing surface toward the lower leg frame. The axially extending part and the engagement pin are positioned so that a width-direction separating distance between them is set such that the lower leg frame can be disposed between them with respect to the width direction of the lower frame. Thus, by positioning the lower leg frame between the engagement pin and the engagement arm with respect to the width direction of the lower frame, an interlocking state is attained where the lower leg frame is rotated around the swing axis relative to the thigh frame in conjunction with the rotational movement of the lower frame around the pivot axis relative to the upper frame with the lower frame being relatively movable in the longitudinal direction of the frame relative to the lower leg frame.

In the second example regarding the lower connecting body, the engagement arm may preferably include a width-direction extending part extending from the axially extending part toward the engagement pin with respect to a width direction of the opposing surface.

In this case, an axially separating distance between the width-direction extending part and the opposing surface is greater than the thickness of the lower leg frame such that the lower leg frame can be disposed in a retaining space surrounded by the engagement pin, the opposing surface, the axially extending part and the width-direction extending part.

In the second example regarding the lower connecting body, preferably, the engagement pin may be positioned in the center in the width direction of the opposing surface, and the engagement arm may have first and second engagement arms respectively provided on one side and the other side in the width direction of the opposing surface.

In any one of the above configurations, the upper connecting body may have a hook provided on one of the thigh frame and the upper frame, and an opening which is provided on the other of the thigh frame and the upper frame and into which the hook is detachably inserted.

Alternatively, the upper connecting body may have an engagement hole provided in the thigh frame so as to be parallel to the pivot axis and open toward the upper frame, and an engagement pin provided on the upper frame so as to be engageable with the engagement hole.

EMBODIMENT FOR CARRYING OUT THE INVENTION

First Embodiment

Below, the first embodiment of the actuator unit for a knee-ankle-foot orthosis according to the present invention will now be described with reference to the attached drawings.

Figure 1:
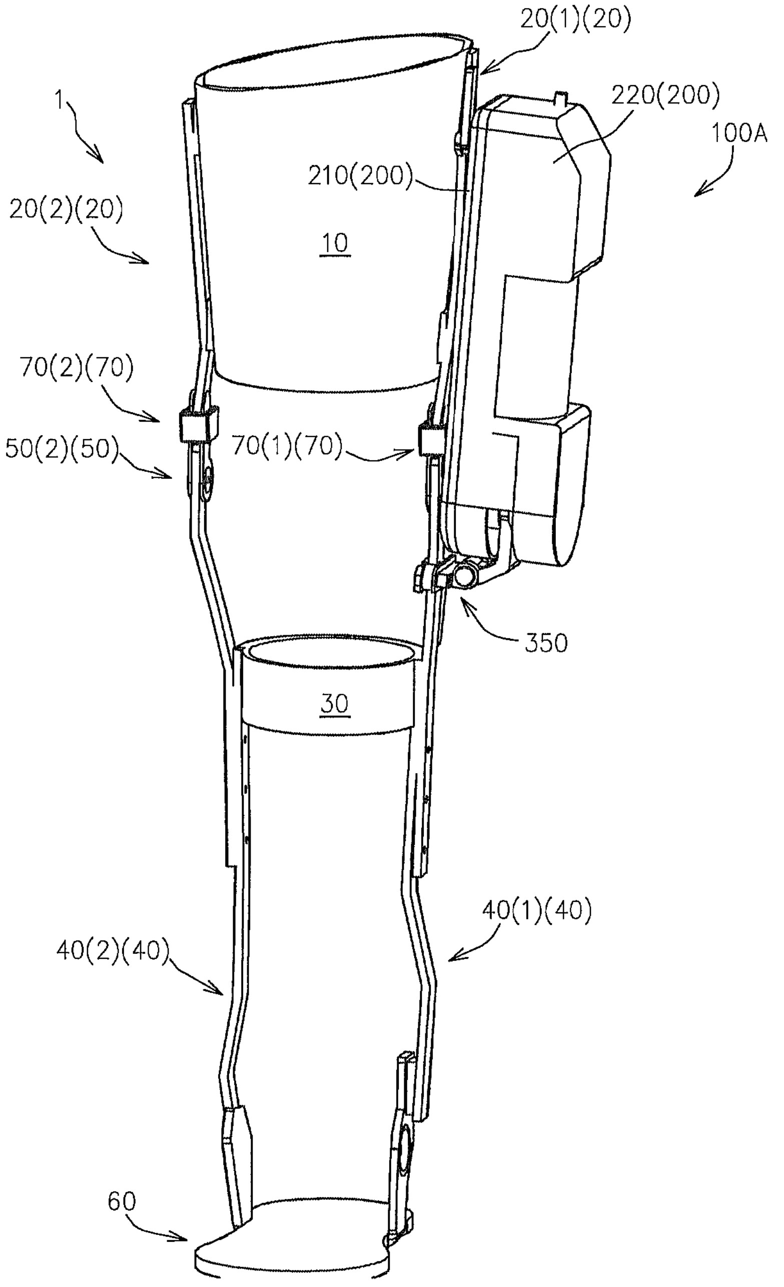
FIG. 1 is a perspective view of a knee-ankle-foot orthosis to which an actuator unit according to a first embodiment of the present invention is attached.

FIG. 1 shows a perspective view of a knee-ankle-foot orthosis 1 to which an actuator unit 100A according to the present embodiment is attached.

Figure 2:
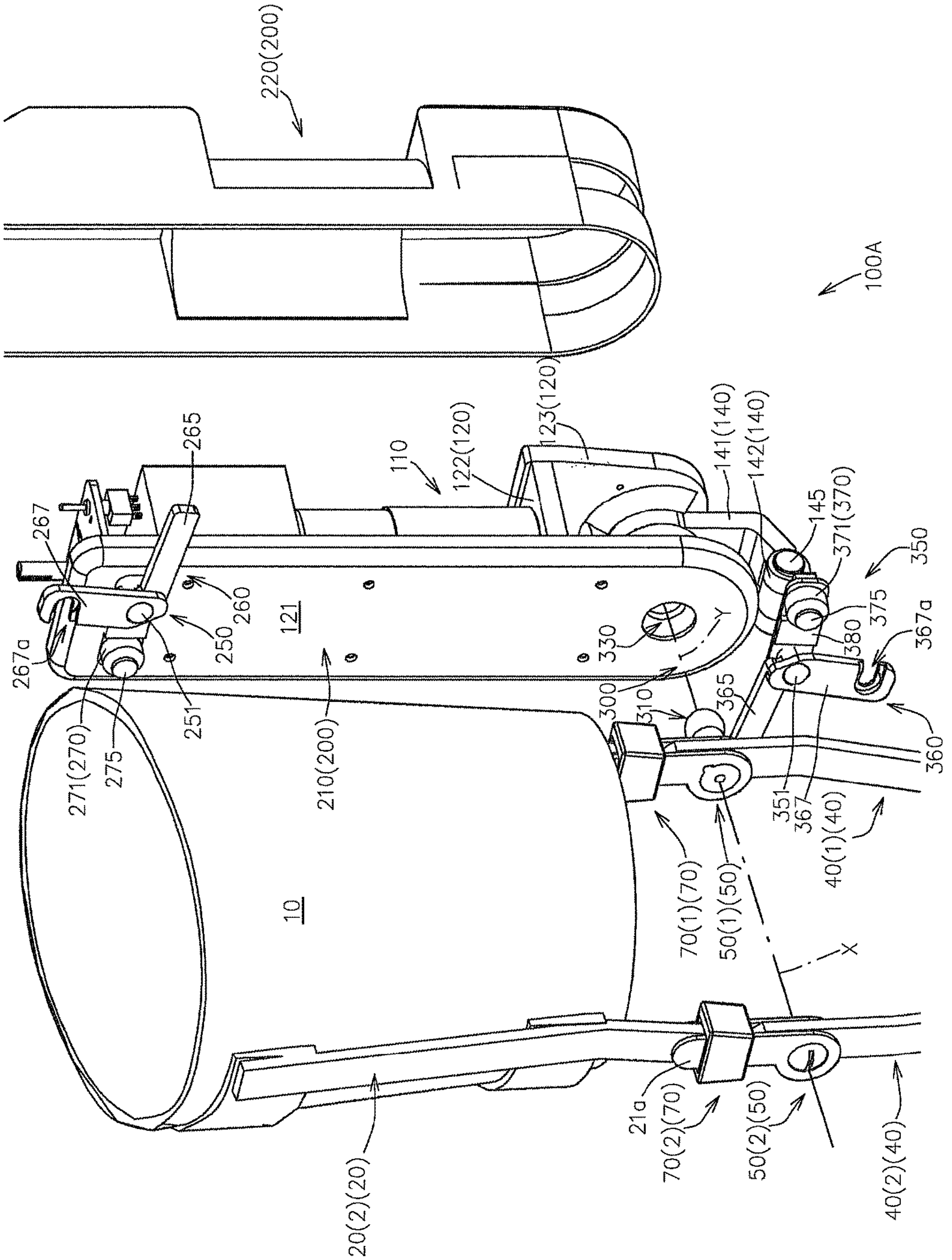
FIG. 2 is a partially exploded perspective view of FIG. 1 as viewed from the outer side in the user width direction.
Figure 3:
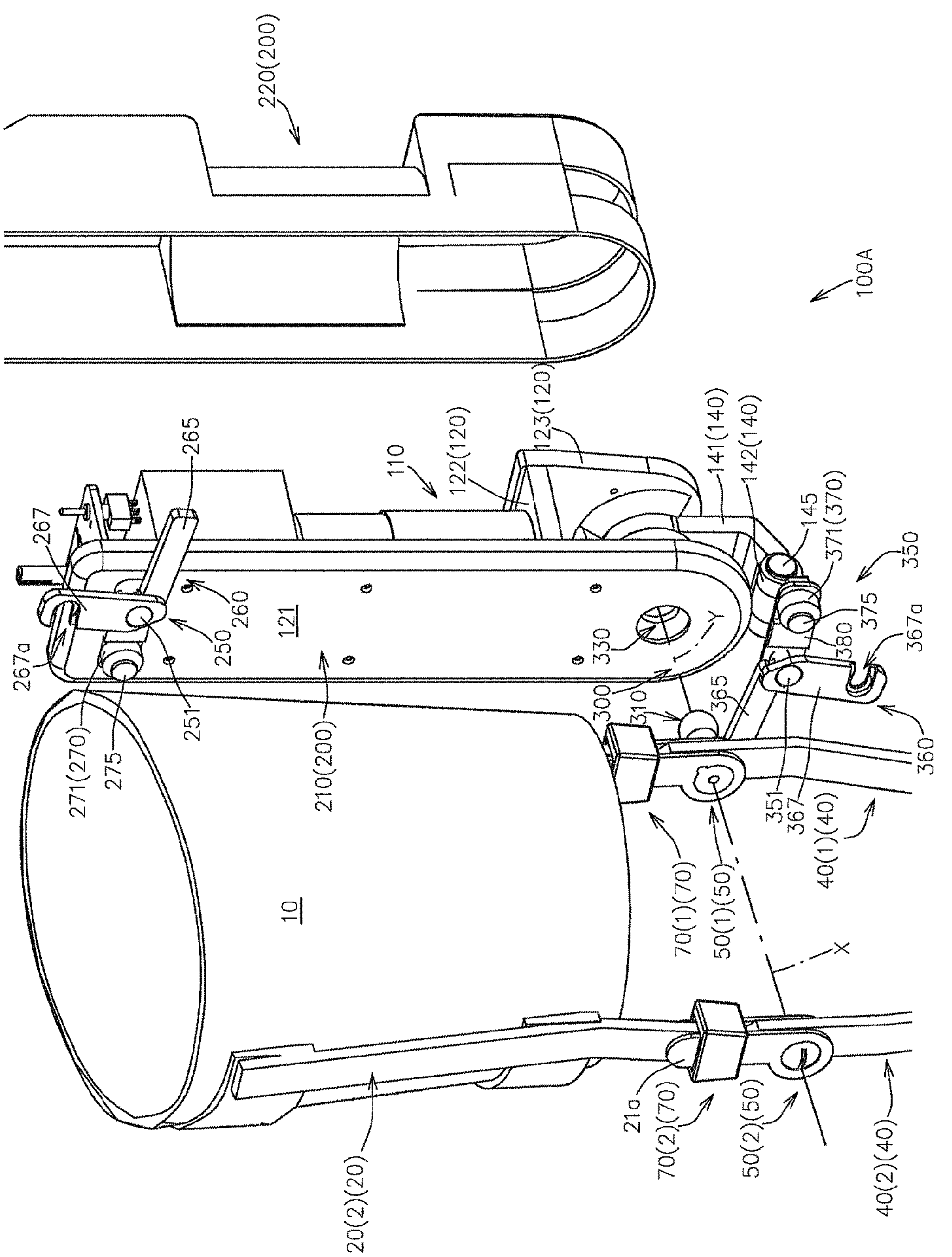
FIG. 3 is a partially exploded perspective view of FIG. 1 as viewed from the inner side in the user width direction.

FIGS. 2 and 3 respectively show partially exploded perspective views of the knee-ankle-foot orthosis of FIG. 1 as viewed from the outer side and the inner side in the user width direction.

The knee-ankle-foot orthosis 1 is a device to be worn by a person with leg disability or a person with paralysis due to a stroke or the like for gait assistance or for rehabilitation, and is custom-made according to the user's physique.

The actuator unit 100A imparts gait assisting force to the user who wears the knee-ankle-foot orthosis 1.

First, the configuration of the knee-ankle-foot orthosis 1 will now be described.

As shown in FIGS. 1 to 3, the knee-ankle-foot orthosis 1 has a thigh attachment 10 and a lower leg attachment 30 to be respectively attached to the user's thigh and lower leg, a thigh frame 20 and a lower leg frame 40 respectively supporting the thigh attachment 10 and the lower leg attachment 30, and a brace-side rotational connecting part 50 connecting the thigh frame 20 and the lower leg frame 40.

The thigh attachment 10 and the lower leg attachment 30 may take various forms as long as they are respectively attachable to the user's thigh and lower leg.

In the present embodiment, as shown in FIG. 1, the thigh attachment 10 is in a cylindrical form having an attachment hole with such a size that the user's thigh can be inserted and the thigh attachment fits the thigh.

Likewise, the lower leg attachment 30 is in a cylindrical form having an attachment hole with such a size that the user's lower leg can be inserted and the lower leg attachment fits the lower leg.

As shown in FIGS. 1 to 3, the thigh frame 20 has a first thigh frame 20(1) vertically extending along the user's thigh on the outer side in the user width direction.

In the present embodiment, as shown in FIGS. 1 to 3, the thigh frame 20 further has a second thigh frame 20(2) vertically extending along the user's thigh on the inner side in the user width direction so as to be opposed to the first thigh frame 20(1), with the user's thigh inserted in the thigh attachment 10 in-between.

As shown in FIGS. 1 to 3, the lower leg frame 40 has a first lower leg frame 40(1) vertically extending along the user's lower leg on the outer side in the user width direction.

In the present embodiment, as shown in FIGS. 1 to 3, the lower leg frame 40 further has a second lower leg frame 40(2) vertically extending along the user's lower leg on the inner side in the user width direction so as to be opposed to the first lower leg frame 40(1), with the user's lower leg inserted in the lower leg attachment 30 in-between.

Figure 4:
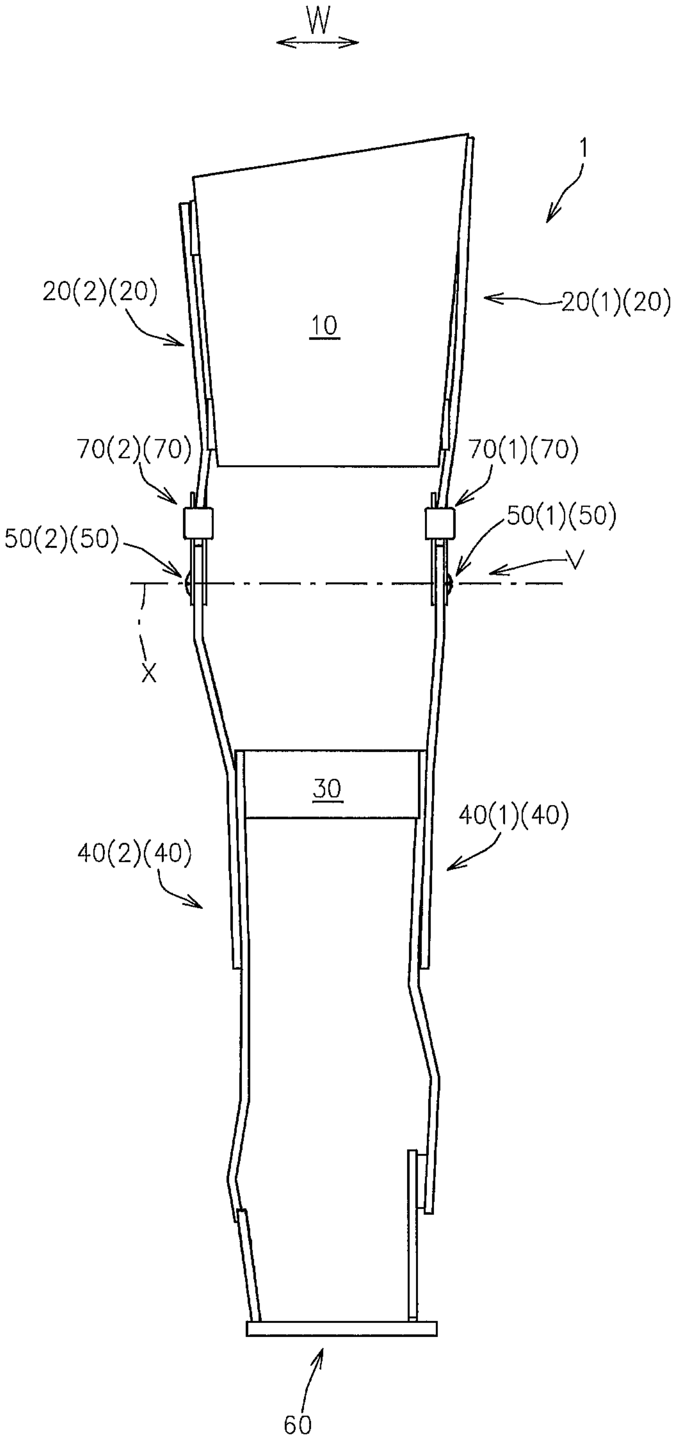
FIG. 4 is a front view of the knee-ankle-foot orthosis alone in a state where the actuator unit is removed.

FIG. 4 shows a front view of the knee-ankle-foot orthosis 1 alone.

As described above, the thigh frame 20 and the lower leg frame 40 are custom-made according to a user so as to extend along the user's thigh and lower leg, respectively.

That is, the tilt angle and/or the curvature with respect to a user width direction W of the thigh frame 20 relative to the lower leg frame 40 is different for each knee-ankle-foot orthosis that is custom-made according to the user's physique.

In the present embodiment, as shown in FIGS. 1 and 4, the knee-ankle-foot orthosis 1 further has a foot frame 60 on which a user places a foot.

In this case, the lower end part of the lower leg frame 40 is connected to the foot frame 60.

Figure 5:
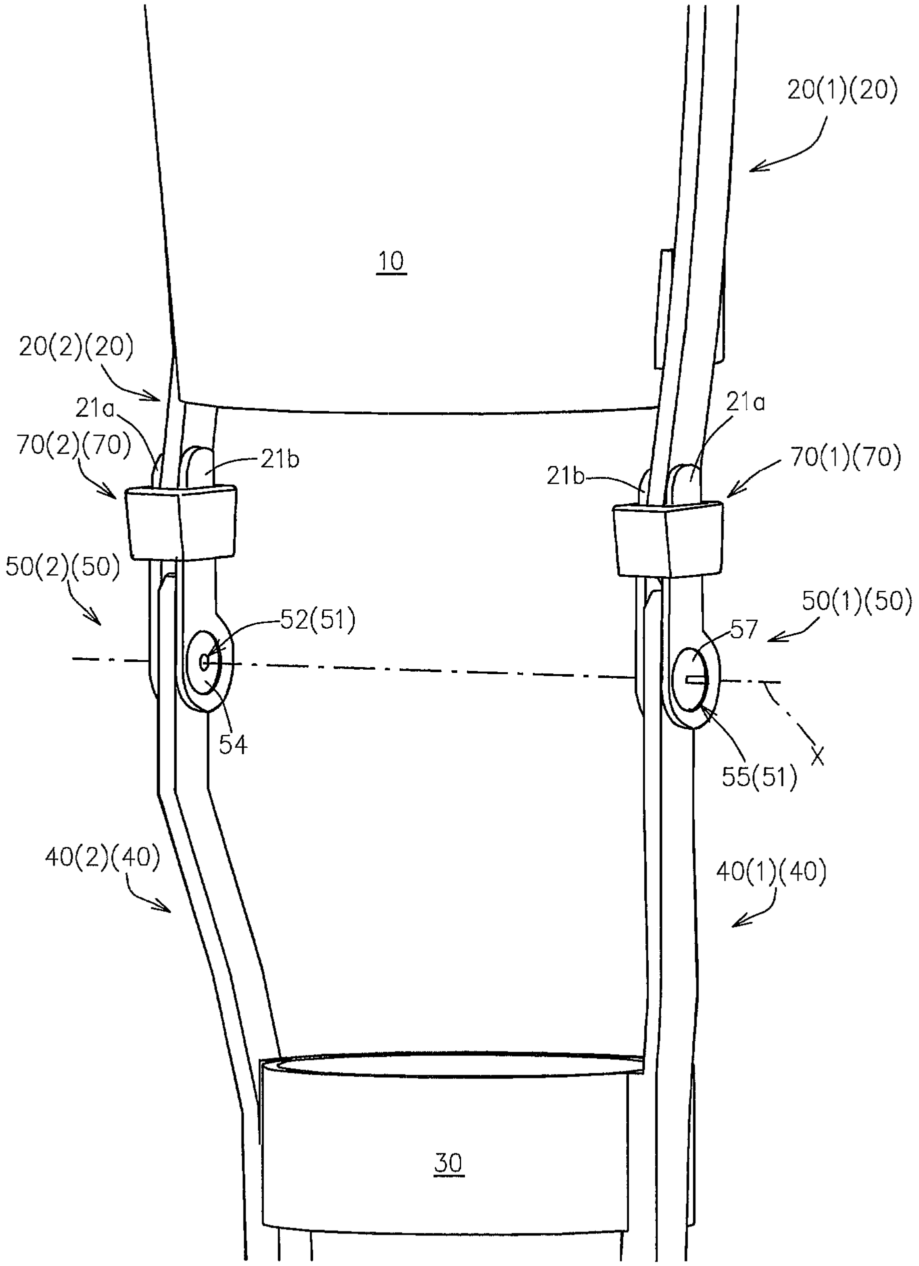
FIG. 5 is a perspective view of V part in FIG. 4.

FIG. 5 shows a perspective view of the V part in FIG. 4.

The brace-side rotational connecting part 50 connects both frames 20, 40 such that the lower leg frame 40 is rotatable relative to the thigh frame 20 around a brace-side pivot axis X that is coaxial with the swing axis of the user's knee joint.

As described above, in the present embodiment, the thigh frame 20 has the first and second thigh frames 20(1), 20(2), and the lower leg frame 40 has the first and second lower leg frames 40(1), 40(2).

Accordingly, as shown in FIGS. 1 to 5, the brace-side rotational connecting part 50 has a first brace-side rotational connecting part 50(1) for connecting the first thigh frame 20(1) and the first lower leg frame 40(1) positioned on the outer side in the user width direction so as to be rotatable around the brace-side pivot axis X, and a second brace-side rotational connecting part 50(2) for connecting the second thigh frame 20(2) and the second lower leg frame 40(2) positioned on the inner side in the user width direction so as to be rotatable around the brace-side pivot axis X.

Figure 6:
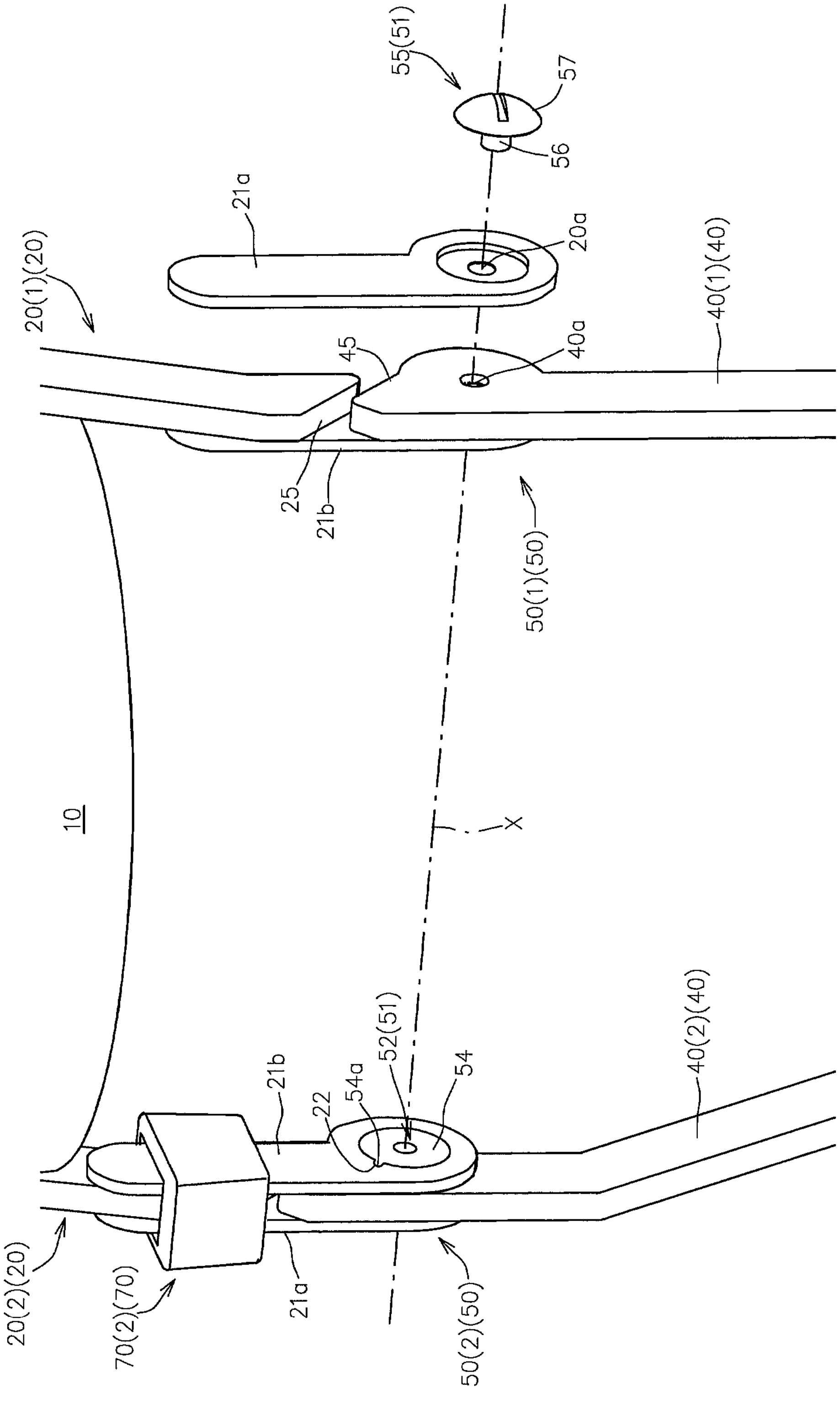
FIG. 6 is an enlarged perspective view in which a first connecting piece of a first thigh frame in the knee-ankle-foot orthosis that is positioned on an outer side in the user width direction and an externally threaded member of a first brace-side rotational connecting part that is positioned on an outer side in the user width direction in FIG. 5 are disassembled.

FIG. 6 shows an enlarged perspective view in which a first connecting piece 21*a*, which will be described below, of the first thigh frame 20(1) and an externally threaded member 55, which will be described below, of the first brace-side rotational connecting part 50(1) in FIG. 5 are disassembled.

In FIG. 6, illustration of a first locking member 70(1), which will be described below, is omitted for easier understanding.

Figure 7:
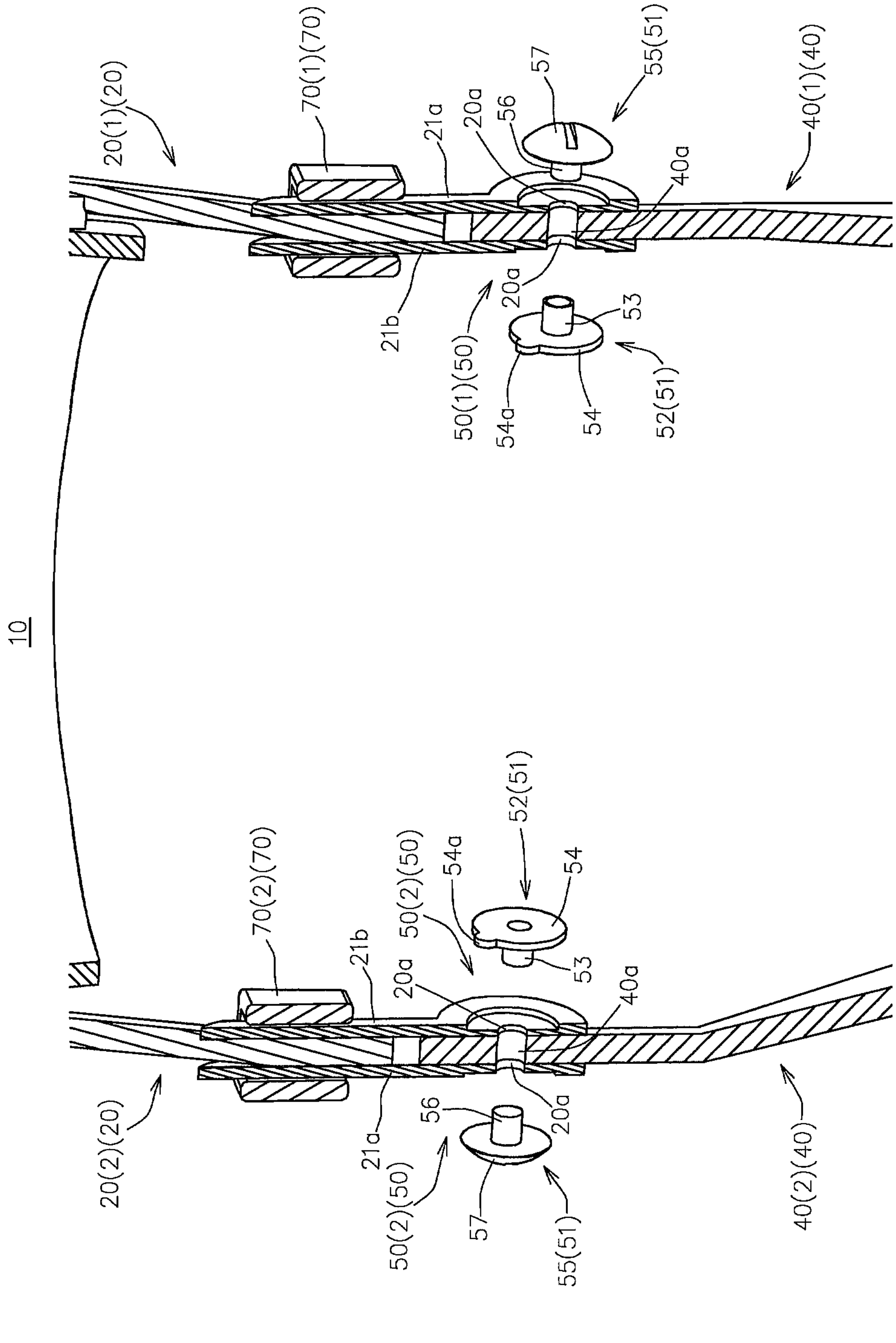
FIG. 7 is a vertical cross-sectional front view corresponding to FIG. 5.

FIG. 7 shows a vertical cross-sectional front view corresponding to FIG. 5.

In the present embodiment, as shown in FIGS. 5 to 7, the thigh frame 20 has a vertically extending thigh frame main body and a pair of connecting pieces 21*a*, 21*b* fixed to the respective sides in the user width direction of the lower end part of the frame main body by pinning, welding, or the like. The upper part of the lower leg frame 40 is interposed between the pair of connecting pieces 21*a*, 21*b*.

As shown in FIG. 6, the brace-side rotational connecting part 50 has a swinging connector 51 for connecting the thigh frame 20 and the lower leg frame 40 so as to be rotatable around the brace-side pivot axis X by being inserted into a brace-side frame attachment hole formed by a thigh frame attachment hole 20*a* provided in the lower part of the thigh frame 20 coaxially with the brace-side pivot axis X and a lower leg frame attachment hole 40*a* provided in the upper part of the lower leg frame 40 coaxially with the brace-side pivot axis X.

In the present embodiment, as described above, the thigh frame 20 has a pair of connecting pieces 21*a*, 21*b*. Accordingly, the thigh frame attachment hole 20*a* is formed in each of the pair of connecting pieces 21*a*, 21*b*.

As shown in FIGS. 5 to 7, the swinging connector 51 has an internally threaded member 52 and an externally threaded member 55 separably screwed to each other in the brace-side frame attachment hole.

The internally threaded member 52 has a cylindrical part 53 to be inserted into the brace-side frame attachment hole from one side in the user width direction and a flange part 54 extending more radially outward than the brace-side frame attachment hole from one side in the user width direction of the cylindrical part 53. The cylindrical part 53 has a screw hole that is open toward the free end side.

On the other hand, the externally threaded member 55 has a cylindrical part 56 having an external thread to be screwed into the screw hole from the other side in the user width direction and a flange part 57 extending more radially outward than the brace-side frame attachment hole from the other side in the user width direction of the cylindrical part 56.

As shown in FIGS. 5 to 7, in the present embodiment, the internally threaded member 52 is inserted into the brace-side attachment hole from the inner side in the user width direction, and the externally threaded member 55 is screwed to the internally threaded member 52 from the outer side in the user width direction.

Reference number 54*a* in FIGS. 6 and 7 is a radially outward projection that is provided on the flange part 54 and that engages with a depression 22 (see FIG. 6) formed in the inner connecting piece 21*b*, and thereby the internally threaded member 52 is retained so as to be incapable of relative rotation around the axis relative to the inner connecting piece 21*b* (i.e., the thigh frame 20).

In the present embodiment, as shown in FIGS. 5 to 7, the knee-ankle-foot orthosis 1 further has a locking member 70 for inhibiting the rotation of the lower leg frame 40 around the brace-side pivot axis X relative to the thigh frame 20.

The locking member 70 is configured so as to be capable of reaching a locked state (the state shown in FIG. 5) where the thigh frame 20 and the lower leg frame 40 are surrounded by the locking member 70 to connect both frames 20, 40 and prevent the lower leg frame 40 from being relatively rotated around the brace-side pivot axis X relative to the thigh frame 20, and a cancelled state where connection between the thigh frame 20 and the lower leg frame 40 is cancelled to permit the lower leg frame 40 to be relatively rotated around the brace-side pivot axis X relative to the thigh frame 20.

In the present embodiment, the locking member 70 has a first locking member 70(1) positioned on the outer side in the user width direction and acting on the first thigh frame 20(1) and the first lower leg frame 40(1), and a second locking member 70(2) positioned on the inner side in the user width direction and acting on the second thigh frame 20(2) and the second lower leg frame 40(2).

In the present embodiment, as shown in FIG. 6, an upper-end surface 45 of the lower leg frame 40 (the end surface facing the thigh frame 20) is a sloped surface such that the radial distance from the brace-side pivot axis X increases from one side toward the other side around the brace-side pivot axis X, and a lower-end surface 25 of the thigh frame 20 (the end surface facing the lower leg frame 40) is a sloped surface corresponding to the upper-end surface 45 of the lower leg frame 40.

Due to this configuration, the lower leg frame 40 rotates only toward one side around the brace-side pivot axis X relative to the thigh frame 20 (in the direction in which the user's lower leg is bent relative to the thigh) and does not rotate toward the other side (in the direction in which the user's lower leg is extended relative to the thigh).

Below, the actuator unit 100A according to the present embodiment will now be described.

As shown in FIGS. 1 to 3, the actuator unit 100A includes an upper frame 120 connectable to the first thigh frame 20(1), a lower frame 140 connectable to the lower leg frame 40(1), an actuator-side rotational connecting part 150 connecting both frames 120, 140 such that the lower frame 140 is rotatable around an actuator-side pivot axis Y relative to the upper frame 120, and a driver 110 for producing driving force for rotating the lower frame 140 around the actuator-side pivot axis Y.

As shown in FIGS. 2 and 3, the upper frame 120 has a plate-like upper frame main body 121 facing the first thigh frame 20(1)(20), a connecting wall body 122 extending outward in the user width direction from the vertically intermediate position of the upper frame main body 121, and an outer wall body 123 extending downward from the connecting wall body 122.

In the present embodiment, the upper frame main body 121 is opposed to the first thigh frame 21(1) via inner cover main body 210.

That is, as shown in FIGS. 1 to 3, the actuator unit 100A according to the present embodiment has a cover 200 partially surrounding the upper frame 120, the driver 110, and the lower frame 140.

The cover 200 has the inner cover main body 210 fixed to the inner side in the user width direction of the upper frame main body 121, and an outer cover main body 220 detachably connected to the inner cover main body 210 so as to partially surround the upper frame 120 including the upper frame main body 121, the driver 110, and the lower frame 140.

In this configuration, the upper frame main body 121 is opposed to the first thigh frame 20(1) via the inner cover main body 210.

The outer wall body 123 is opposed to a downward extending portion 121*a* of the upper frame main body 121, which extends downward below the connecting wall body 122, while retaining an accommodating space in the user width direction between the outer wall body 123 and the downward extending portion 121*a*.

Figure 8:
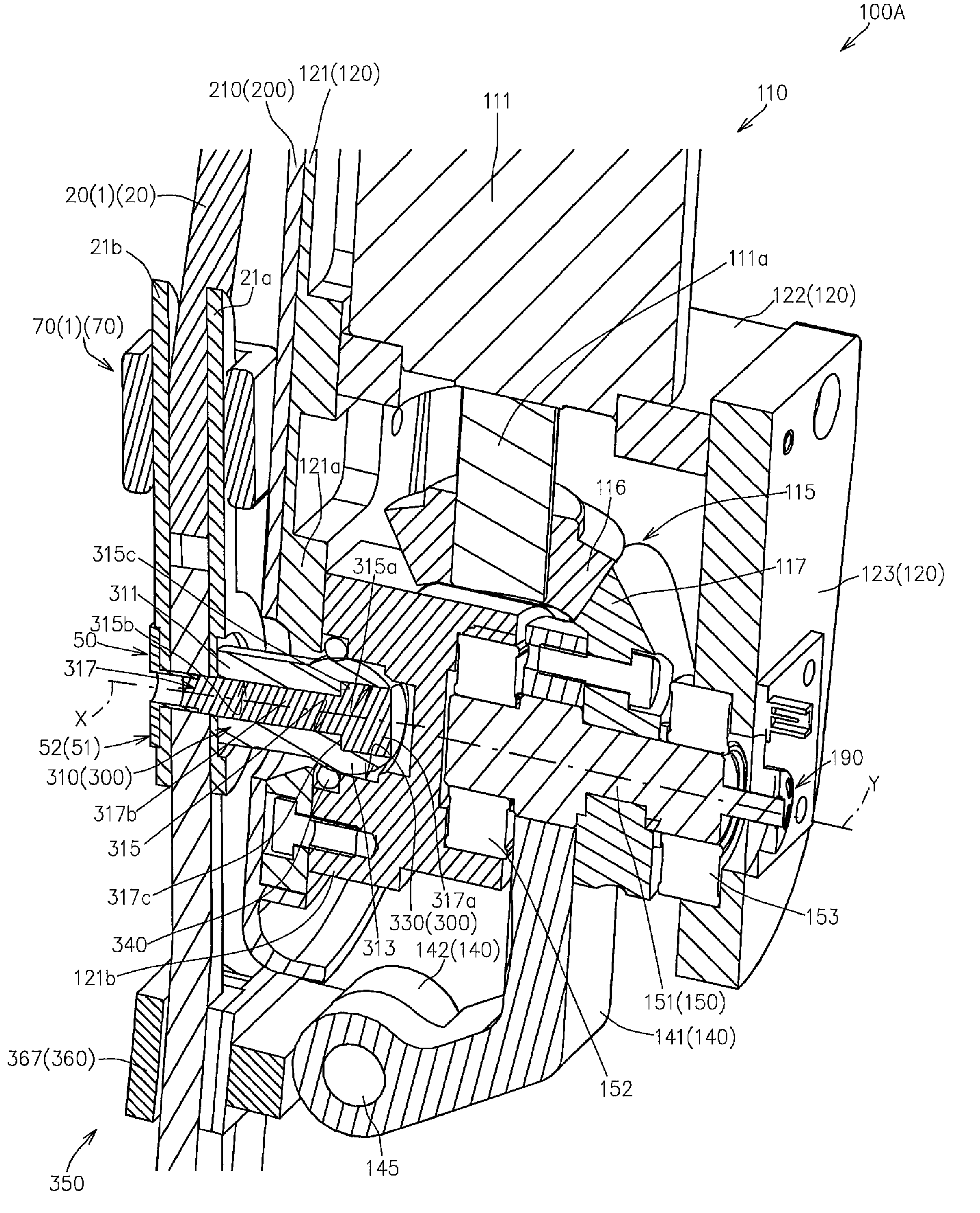
FIG. 8 is a partially enlarged vertical cross-sectional view of the vicinity of an intermediate connecting body in a state where the actuator unit is attached to the knee-ankle-foot orthosis.

FIG. 8 is a partially enlarged vertical cross-sectional view of a portion in the vicinity of the actuator-side rotational connecting part 150.

Figure 9:
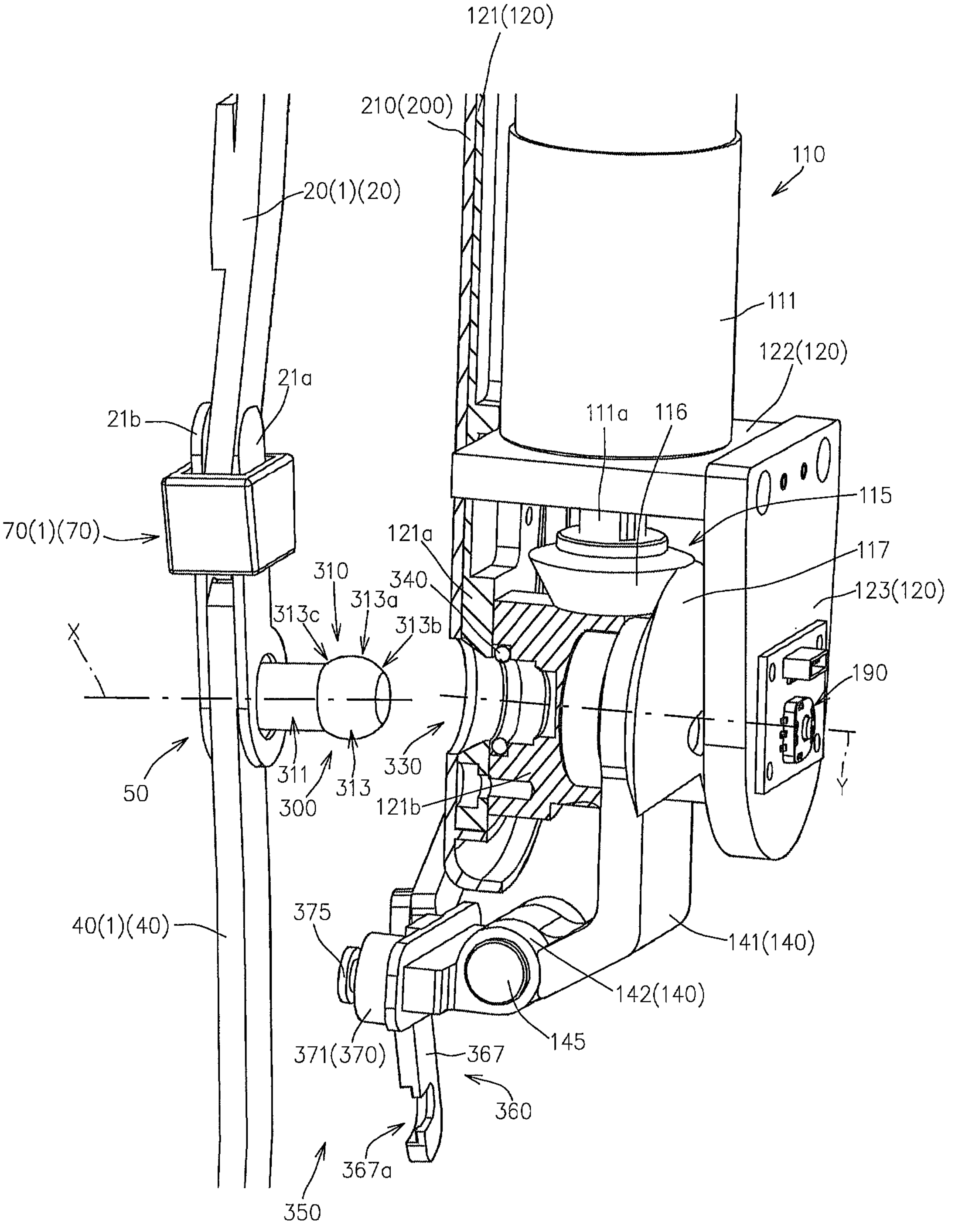
FIG. 9 is a partially exploded perspective view corresponding to FIG. 8, and shows cross-sections of only some components.

FIG. 9 is a partially exploded perspective view corresponding to FIG. 8, and shows cross-sections of only some components.

In FIGS. 8 and 9, illustration of the outer cover main body 220 is omitted.

The actuator-side rotational connecting part 150 connects both frames 120, 140 such that the lower frame 140 is rotatable around the actuator-side pivot axis Y relative to the upper frame 120.

The actuator-side rotational connecting part 150 has a swing shaft 151 that supports the lower frame 140 and that is supported by the upper frame 120 so as to extend along the actuator-side pivot axis Y.

In the present embodiment, as shown in FIGS. 8 and 9, the inner end part in the user width direction of the swing shaft 151 is supported by the downward extending portion 121*a* and the outer end part in the user width direction of the swing shaft 151 is supported by the outer wall body 123 such that the swing shaft 151 crosses the accommodating space in the user width direction and defines the actuator-side pivot axis, and the intermediate part in the user width direction of the swing shaft 151 supports the lower frame 140.

In the present embodiment, the upper frame main body 121 has a block body 121*b* fixed to the outer side in the user width direction of the downward extending portion 121*a*, and the inner end side in the user width direction of the swing shaft 151 is supported so as to be axially rotatable by the block body 121*b* via a bearing member 152, and the outer side in the user width direction of the swing shaft 151 is supported so as to be axially rotatable by the outer wall body 123 via a bearing member 153.

The driver 110 has a driving source 111 such as an electric motor, and a transmission mechanism 115 for transmitting driving force produced by the driving source 111 to the lower frame 140.

The driving source 111 is supported by the upper frame 120.

In the present embodiment, as shown in FIGS. 2, 8, and 9, the driving source 111 is placed on the connecting wall body 122 of the upper frame 120, with an output shaft 111*a* extending downward.

In the present embodiment, as shown in FIG. 8, the transmission mechanism 115 has a drive-side bevel gear 116 supported by the output shaft 111*a* so as to be incapable of relative rotation, and a driven-side bevel gear 117 that is connected to the lower frame 140 so as to be incapable of relative rotation around the actuator-side pivot axis Y and that is meshed with the drive-side bevel gear 116.

In the present embodiment, the lower frame 140 is supported by the swing shaft 151 so as to be incapable of relative rotation, and the actuator unit 100A includes a sensor 190 for detecting the angle of axial rotation of the swing shaft 151.

Detecting the angle of axial rotation of the swing shaft 151 by the sensor 190 enables the swinging angle of the lower frame 140 to be recognized.

The actuator unit 100A according to the present embodiment is detachably attached to three locations, i.e., the upper part, vertically intermediate part, and lower part, of the knee-ankle-foot orthosis 1.

Specifically, as shown in FIGS. 2, 3, 8, and 9, the actuator unit 100A has an upper connecting body 250 for connecting the upper frame 120 to the thigh frame 20, an intermediate connecting body 300 for connecting the vicinity of the actuator-side rotational connecting part 150 to the vicinity of the brace-side rotational connecting part 50, and a lower connecting body 350 for connecting the lower frame 140 to the lower leg frame 40 such that the lower leg frame 40 is rotated around the brace-side pivot axis X relative to the thigh frame 20 by utilizing the rotational movement of the lower frame 140 around the actuator-side pivot axis Y relative to the upper frame 120.

First, the intermediate connecting body 300 will now be described.

The intermediate connecting body 300 has a ball stud 310 provided on one of the knee-ankle-foot orthosis 1 and the actuator unit 100A (hereinafter referred to as a first unit), and an accommodation depression 330 that is provided on the other of the knee-ankle-foot orthosis 1 and the actuator unit 100A (hereinafter referred to as a second unit) and that receives the ball stud 310 by way of a ball-and-socket joint.

In the present embodiment, as shown in FIGS. 8 and 9, the knee-ankle-foot orthosis 1 is the first unit provided with the ball stud 310, and the actuator unit 100A is the second unit provided with the accommodation depression 330.

The ball stud 310 has a shaft part 311 that is provided concentrically with the pivot axis (the brace-side pivot axis X in the present embodiment) of the first unit in a projecting manner and that extends toward the second unit, and a spherical head part 313 provided at the distal end part of the shaft part 311.

As described above, in the present embodiment, the knee-ankle-foot orthosis 1 is the first unit, and the knee-ankle-foot orthosis is the second unit. Accordingly, the shaft part 311 is provided on the knee-ankle-foot orthosis 1 in a projecting manner so as to extend toward the actuator unit 100A coaxially with the brace-side pivot axis X.

In the present embodiment, the ball stud 310 is provided on the knee-ankle-foot orthosis 1 in a projecting manner by utilizing the swinging connector 51.

Specifically, as shown in FIG. 8, the ball stud 310 is provided on the knee-ankle-foot orthosis 1 in a projecting manner by being screw-connected to the inner threaded member positioned on the inner side in the user width direction among the internally threaded member 52 and the externally threaded member 55 (the internally threaded member 52 in the present embodiment) in place of the outer threaded member positioned on the outer side in the user width direction among the internally threaded member 52 and the externally threaded member 55 (the externally threaded member 55 in the present embodiment) in the swinging connector 51.

Specifically, as shown in FIG. 8, the ball stud 310 has an axial hole 315 penetrating in the axial direction, and the ball stud 310 is screw-connected to the inner threaded member via a fastening member 317 such as a bolt inserted in the axial hole 315.

Specifically, the axial hole 315 has a large diameter hole 315*a* that is open on the side where the spherical head part 313 is positioned with respect to the axial direction, a small diameter hole 315*b* that is open on the side opposite to the spherical head part 313 with respect to the axial direction, and a step 315*c* connecting the large diameter hole 315*a* and the small diameter hole 315*b*.

The fastening member 317 has a head part 317*a* inserted in the large diameter hole 315*a* and a shaft part 317*b* that is reduced in diameter from the head part 317*a* via a radially extending part 317*c* and that penetrates the small diameter hole 315*b* to extend outward.

The radially extending part 317*c* can be brought into contact with the step 315*c*. A portion of the shaft part 317*b* extending outward, with the radially extending part 317*c* being in contact with the step 315*c*, has a screw structure screwed to the inner threaded member.

According to this configuration, the ball stud 310 can be easily provided on the existing knee-ankle-foot orthosis 1 in a projecting manner so as to be coaxial with the brace-side pivot axis X.

The actuator unit 100A according to the present embodiment has the following configuration for preventing the ball stud 310 from being unintentionally dislocated from the accommodation depression 330.

Specifically, as shown in FIG. 9, the spherical head part 313 has a large diameter part 313*a* having the largest diameter, a distal end-side spherical surface part 313*b*, the diameter of which is reduced toward the distal end side from the large diameter part 313*a*, and a proximal end-side spherical surface part 313*c*, the diameter of which is reduced toward the proximal end side from the large diameter part 313*a*.

The accommodation depression 330 is provided with an annular engagement groove at a portion, which the proximal end-side spherical surface part 313*c* of the spherical head part 313 faces when the spherical head part 313 is accommodated in the accommodation depression 330, and a retaining member 340 is inserted into the annular engagement groove.

The retaining member 340 is shaped such that force for expanding the retaining member 340 in the radially outward direction is exerted on the retaining member by the movement of the spherical head part 313 in the axial direction, and the retaining member 340 is inserted into the annular engagement groove so as to prevent passage of the maximum diameter part 313*a* of the spherical head part 313 when the force resulting from the axial movement of the spherical head part 313 is equal to or less than a predetermined value and so as to be elastically deformed in the radially outward direction by the spherical head part 313 and permit passage of the maximum diameter part 313*a* of the spherical head part 313 when the force exceeds the predetermined value.

The retaining member 340 is formed by, for example, inserting an elongated body having a circular cross-section in a spirally wound state into the annular engagement groove and retaining it in a circular shape, and thereby the retaining member 340 is elastically deformable in the radially outward direction while being inserted in the annular engagement groove.

According to the intermediate connecting body 300 having this configuration, by moving the actuator unit 100A inward in the user width direction relative to the knee-ankle-foot orthosis 1 such that the ball stud 310 is accommodated in the accommodation depression 330, the vicinity of the actuator-side rotational connecting part 150 of the actuator unit 100A can remain connected to the vicinity of the brace-side rotational connecting part 50 of the knee-ankle-foot orthosis 1 without precisely matching the brace-side pivot axis X and the actuator-side pivot axis Y, and by moving the actuator unit 100A outward in the user width direction from the knee-ankle-foot orthosis 1 (by moving the actuator unit 100A outward in the user width direction by force exceeding the predetermined value when the retaining structure is provided), connection between the vicinity of the actuator-side rotational connecting part 150 and the vicinity of the brace-side rotational connecting part 50 can be cancelled.

Next, the upper connecting body 250 will now be described.

Figure 10:
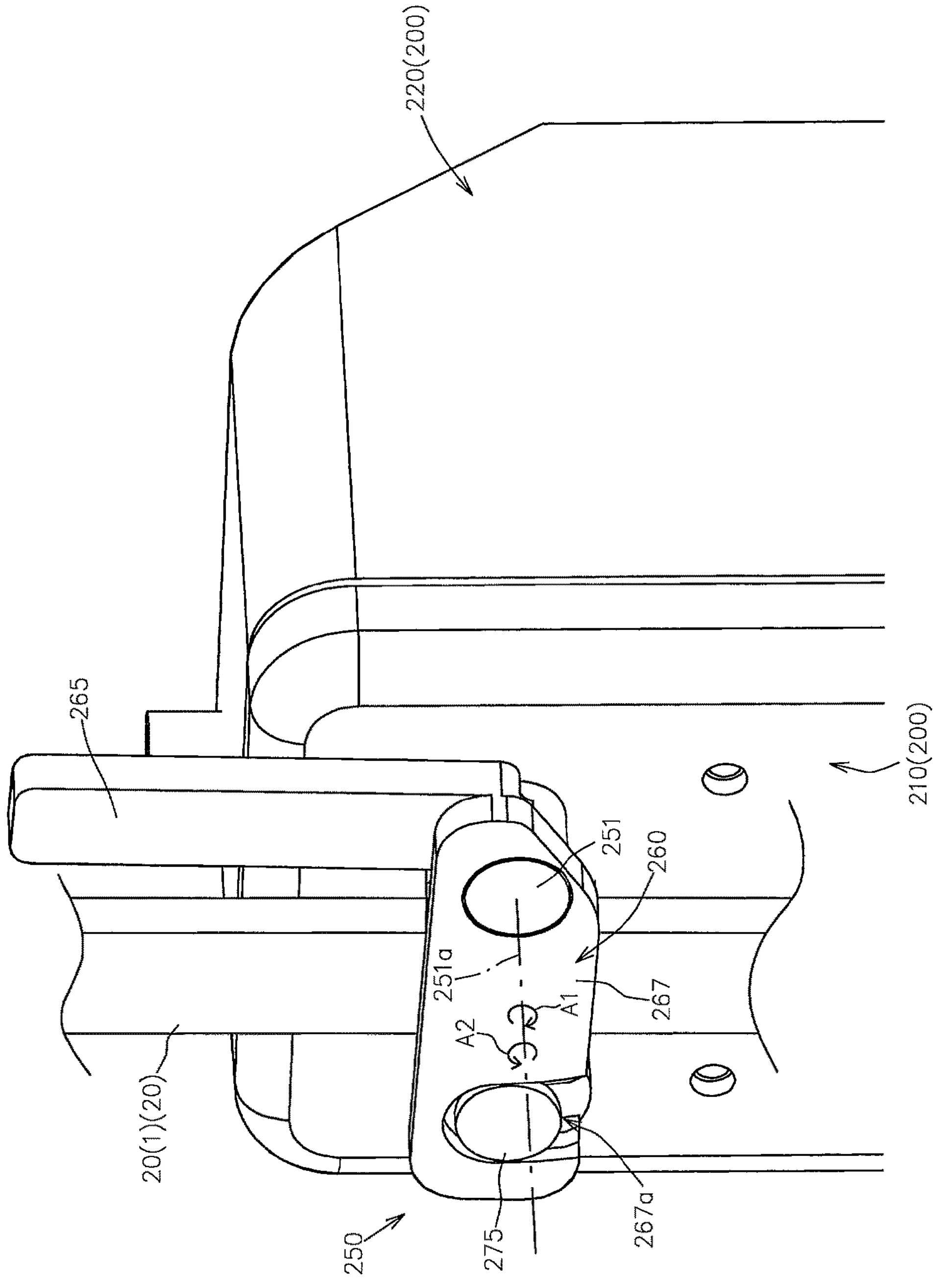
FIG. 10 is a perspective view of the vicinity of an upper connecting part as viewed from the inner side in the user width direction in a state where the actuator unit is attached to the knee-ankle-foot orthosis.

FIG. 10 is a perspective view of the vicinity of the upper connecting part 250 as viewed from the inner side in the user width direction.

In FIG. 10, illustration of the thigh attachment 10 is omitted for easier understanding.

As shown in FIG. 10, the upper connecting body 250 includes an upper rotational shaft 251 provided on the upper frame 120 so as to extend inward in the user width direction (in the state of penetrating the inner cover main body 210 in the present embodiment) and an upper fastening member 260 supported by the upper rotational shaft 251 so as to be rotatable around an axis 251*a*.

Figure 11:
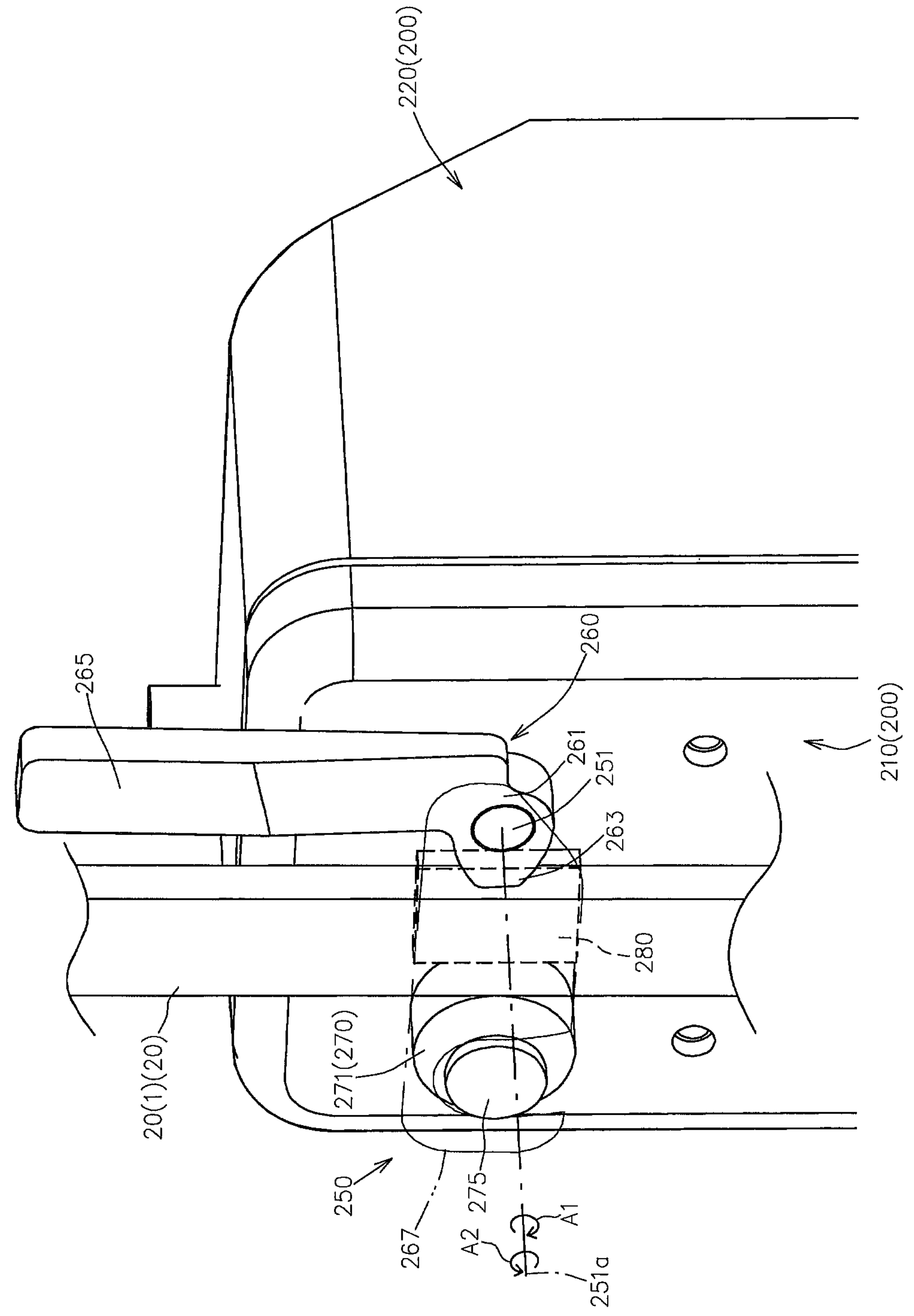
FIG. 11 is a cross-sectional perspective view corresponding to FIG. 10, and showing a state where an upper fastening member is positioned in a held position.

FIG. 11 is a partial cross-sectional perspective view in which a part of the upper fastening member 260 in the state depicted in FIG. 10 is cut away.

As shown in FIG. 11, the upper fastening member 260 has a bearing part 261 supported by the upper rotational shaft 251 and a cam part 263 extending radially outward from the bearing part 261.

The cam part 263 is configured such that the radial distance between the outer circumferential surface and the axis 251*a* of the upper rotational shaft 251 is increased toward a first side A1 around the axis 251*a* of the upper rotational shaft 251.

As shown in FIG. 11, the upper connecting body 250 further includes an upper receiving member 270 supported (in the state of penetrating the inner cover main body 210 in the present embodiment) by the upper frame 20 in a position spaced apart in the user front-back direction from the upper rotational shaft 251 only a distance that enables the thigh frame 20 to be interposed between the upper receiving member 270 and the upper rotational shaft 251.

In the present embodiment, the upper connecting body 250 includes the upper receiving shaft 275 provided (in the state of penetrating the inner cover main body 210 in the present embodiment) on the upper frame 120 so as to extend inward in the user width direction, and an elastic roller 271 supported by the upper receiving shaft 275 acts as the upper receiving member 270.

Figure 12:
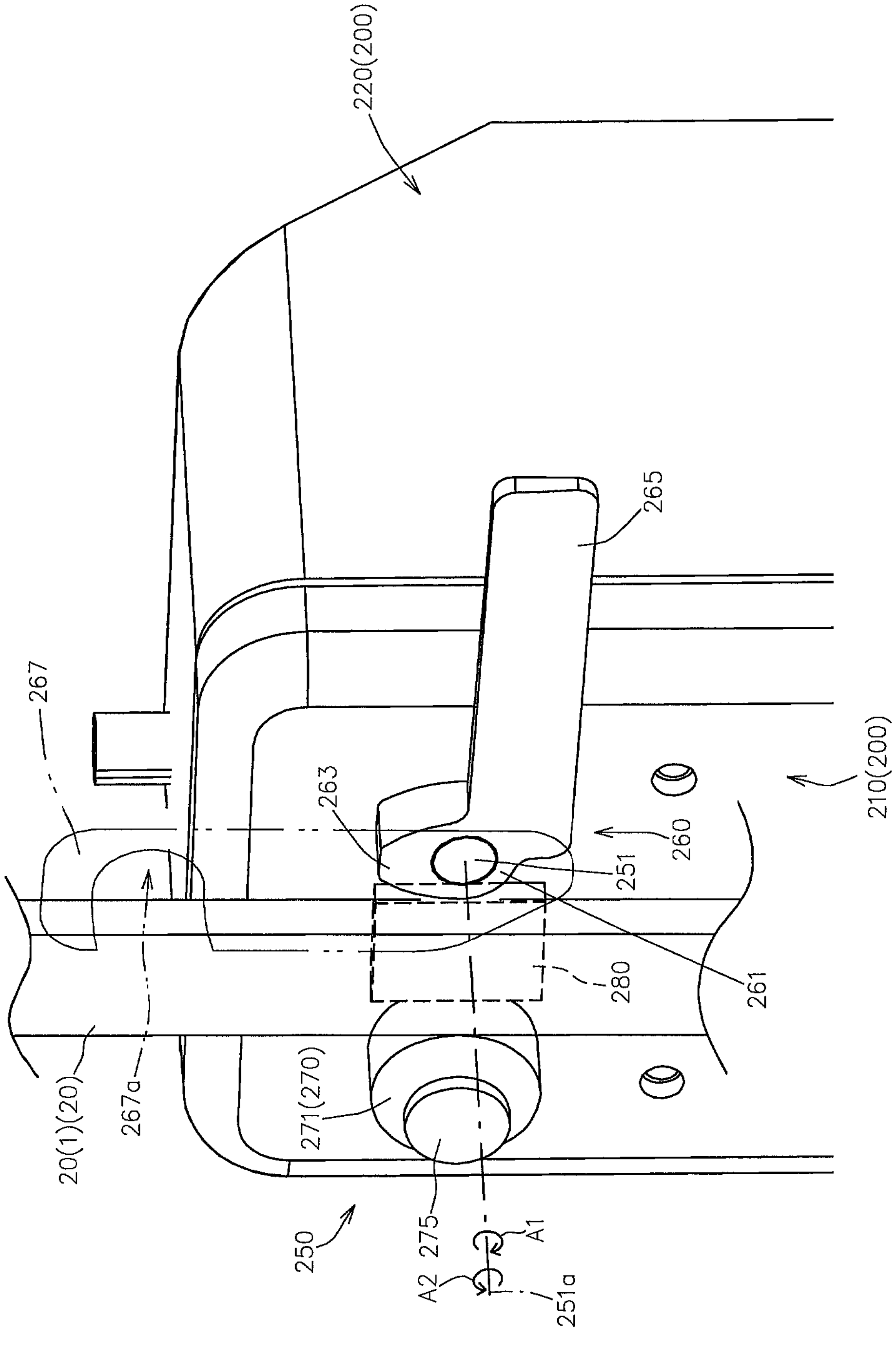
FIG. 12 is a cross-sectional perspective view corresponding to FIG. 10, and showing a state where the upper fastening member is positioned in a released position.

FIG. 12 is a partial cross-sectional perspective view corresponding to FIG. 11, and shows the state where the upper fastening member 260 is positioned in a predetermined released position around the upper rotational shaft 251.

As shown in FIG. 12, in the state where the upper fastening member 260 is positioned in a released position around the upper rotational shaft 251, relatively moving the upper frame 120 and the thigh frame 20 toward each other with respect to the user width direction enables the thigh frame 20 to be positioned in the space between the upper fastening member 260 and the upper receiving member 270, and in the state where the thigh frame 20 is positioned in the space, relatively moving the upper frame 120 and the thigh frame 20 away from each other with respect to the user width direction enables the thigh frame 20 to be retreated from the space.

Moreover, as shown in FIG. 11, in the state where the thigh frame 20 is positioned in the space, rotating the upper fastening member 260 from the released position around the upper rotational shaft 251 to a second side A2 opposite to the first side A1 around the axis causes the cam part 263 to hold the thigh frame 20 in cooperation with the upper receiving member 270 with respect to the user front-back direction, and thereby the state where the upper frame 120 is connected to the thigh frame 20 is attained.

As shown in FIGS. 10 to 12, in the present embodiment, the upper fastening member 260 has an operation arm 265 extending radially outward from the bearing part 261 in a position circumferentially different from the cam part 263.

The operation arm 265 is configured such that the radial length between the free end of the operation arm 265 and the axis 251*a* of the upper rotational shaft 251 is greater than the radial length between the radially outermost end of the cam part 263 and the axis 251*a* of the upper rotational shaft 251.

This configuration, while making it easy to rotate the upper fastening member 260 around the upper rotational shaft 251 via the operation arm 265, makes it possible to effectively prevent connection between the upper frame 120 and the thigh frame 20 from being cancelled by the rotation of the upper fastening member 260 around the upper rotational shaft 251 via the cam part 263 when the thigh frame 20 and the upper frame 120 are relatively moved unintentionally.

As shown in FIGS. 10 to 12, in the present embodiment, the upper fastening member 260 has an engagement arm 267 extending radially outward from the bearing part 261 on the inner side in the user width direction than the cam part 263.

In FIGS. 11 and 12, the engagement arm 267 is indicated by an imaginary line (dashed double-dotted line).

The engagement arm 267 is provided on the upper fastening member 260 so as to be positioned on the inner side in the user width direction than the thigh frame 20 positioned in the space between the upper fastening member 260 and the upper receiving member 270.

The engagement arm 267 is provided with an engagement groove 267*a* for engagement with a portion of the upper receiving shaft 275, which extends more inward in the user width direction than the upper receiving member 270, when the upper fastening member 260 is rotated around the upper rotational shaft 251 from the released position toward the second side A2 around the axis to hold the thigh frame 20 with respect to the user front-back direction in cooperation with the upper receiving member 270, and by the inward extending portion of the upper receiving shaft 275 inserted in the engagement groove 267*a*, the unintentional relative movement of the upper frame 120 and the thigh frame 20 in the user width direction is prevented.

Reference number 280 in FIGS. 11 and 12 denotes a spacer for filling the gap between the thigh frame 20 and the upper frame 120 (the inner case main body 210 in the present embodiment) with respect to the user width direction when the thigh frame 20 is positioned in the space between the upper fastening member 260 and the upper receiving member 270 and the upper fastening member 260 is positioned in a held position. The spacer is preferably a rubber body.

Next, the lower connecting body 350 will be now described.

Figure 13:
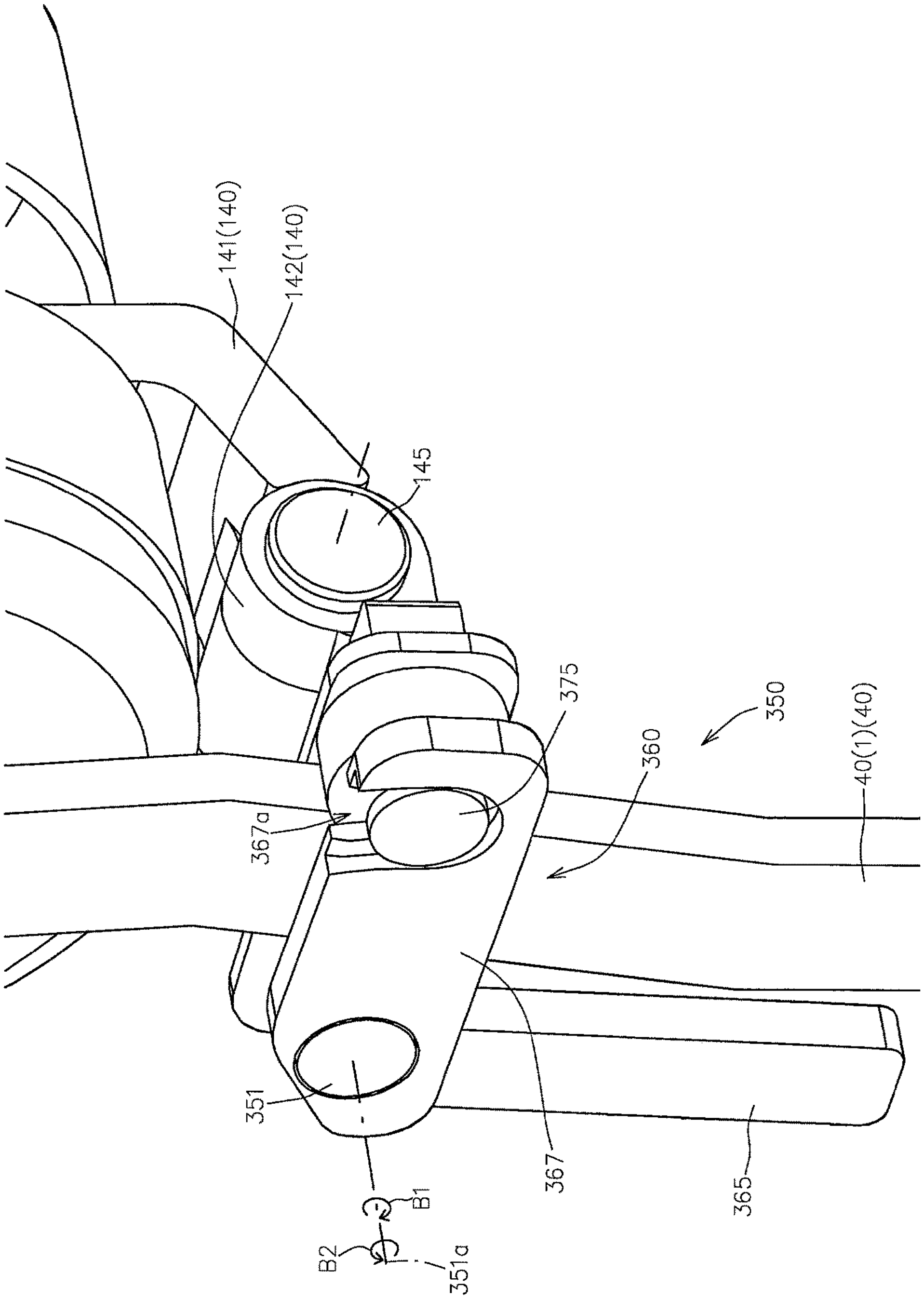
FIG. 13 is a perspective view of the vicinity of a lower connecting body as viewed from the inner side in the user width direction in a state where the actuator unit is attached to the knee-ankle-foot orthosis.

FIG. 13 shows a perspective view of the vicinity of the lower connecting body 350 as viewed from the inner side in the user width direction.

In FIG. 13, illustration of the lower leg attachment 30 is omitted for easier understanding.

As shown in FIG. 13, the lower connecting body 350 includes a lower rotational shaft 351 provided on the lower frame 140 so as to extend inward in the user width direction and a lower fastening member 360 supported by the lower rotational shaft 351 so as to be rotatable around an axis 351*a*.

Figure 14:
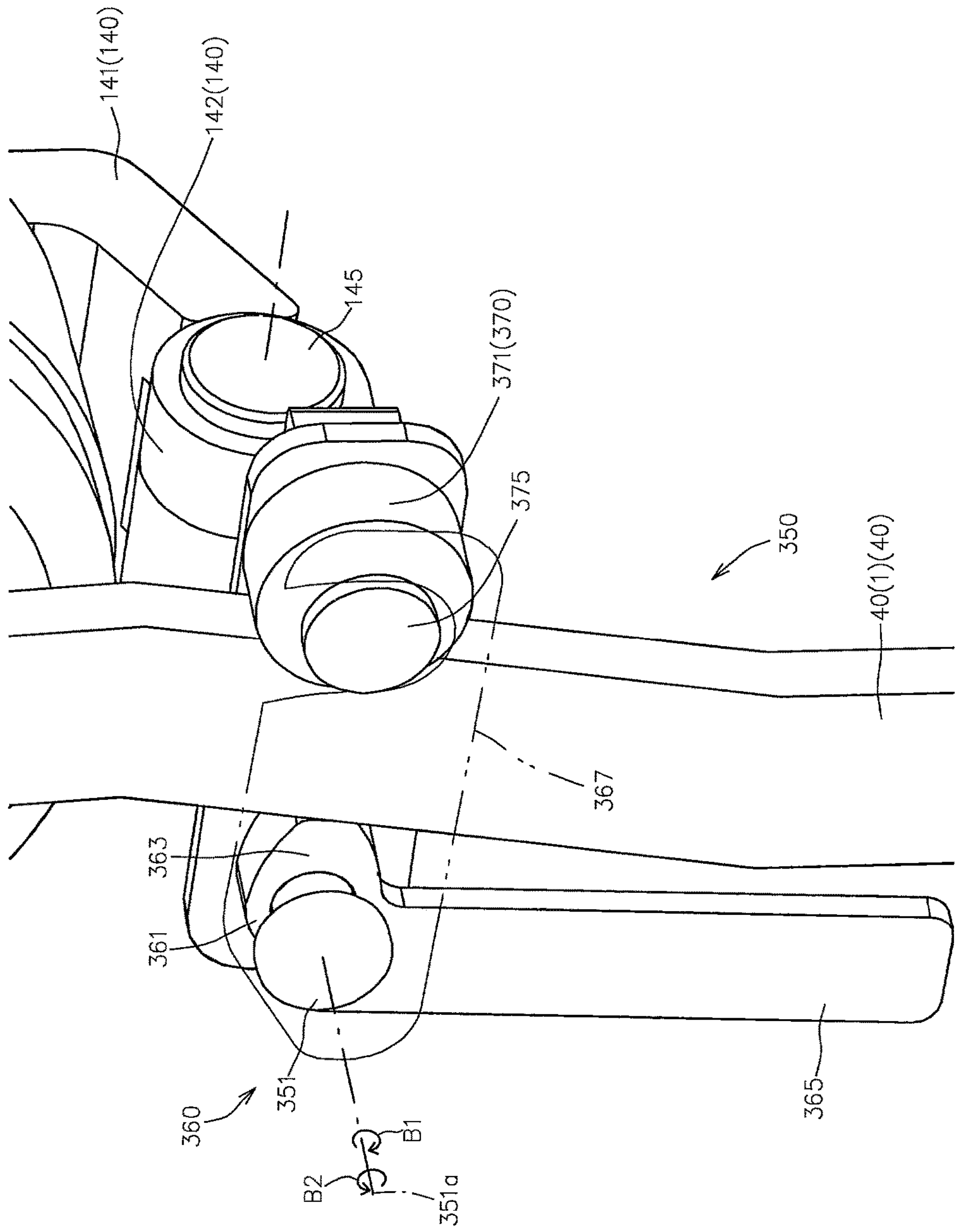
FIG. 14 is a cross-sectional perspective view corresponding to FIG. 13, and showing a state where a lower fastening member is positioned in a held position.

FIG. 14 is a partial cross-sectional perspective view in which a part of the lower fastening member 360 in the state depicted in FIG. 13 is cut away.

As shown in FIG. 14, the lower fastening member 360 has a bearing part 361 supported by the lower rotational shaft 351 and a cam part 363 extending radially outward from the bearing part 361.

The cam part 363 is configured such that the radial distance between the outer circumferential surface and the axis 351*a* of the lower rotational shaft 351 is increased toward a first side B1 around the axis 351*a* of the lower rotational shaft 351.

As shown in FIG. 14, the lower connecting body 350 further includes a lower receiving member 370 supported by the lower frame 140 in a position spaced apart in the user front-back direction from the lower rotational shaft 351 only a distance that enables the lower leg frame 40 to be interposed between the lower fastening member 360 and the lower rotational shaft 351.

In the present embodiment, the lower connecting body 350 includes a lower receiving shaft 375 provided on the lower frame 140 so as to extend inward in the user width direction, and an elastic roller 371 supported by the lower receiving shaft 375 acts as the lower receiving member 370.

Figure 15:
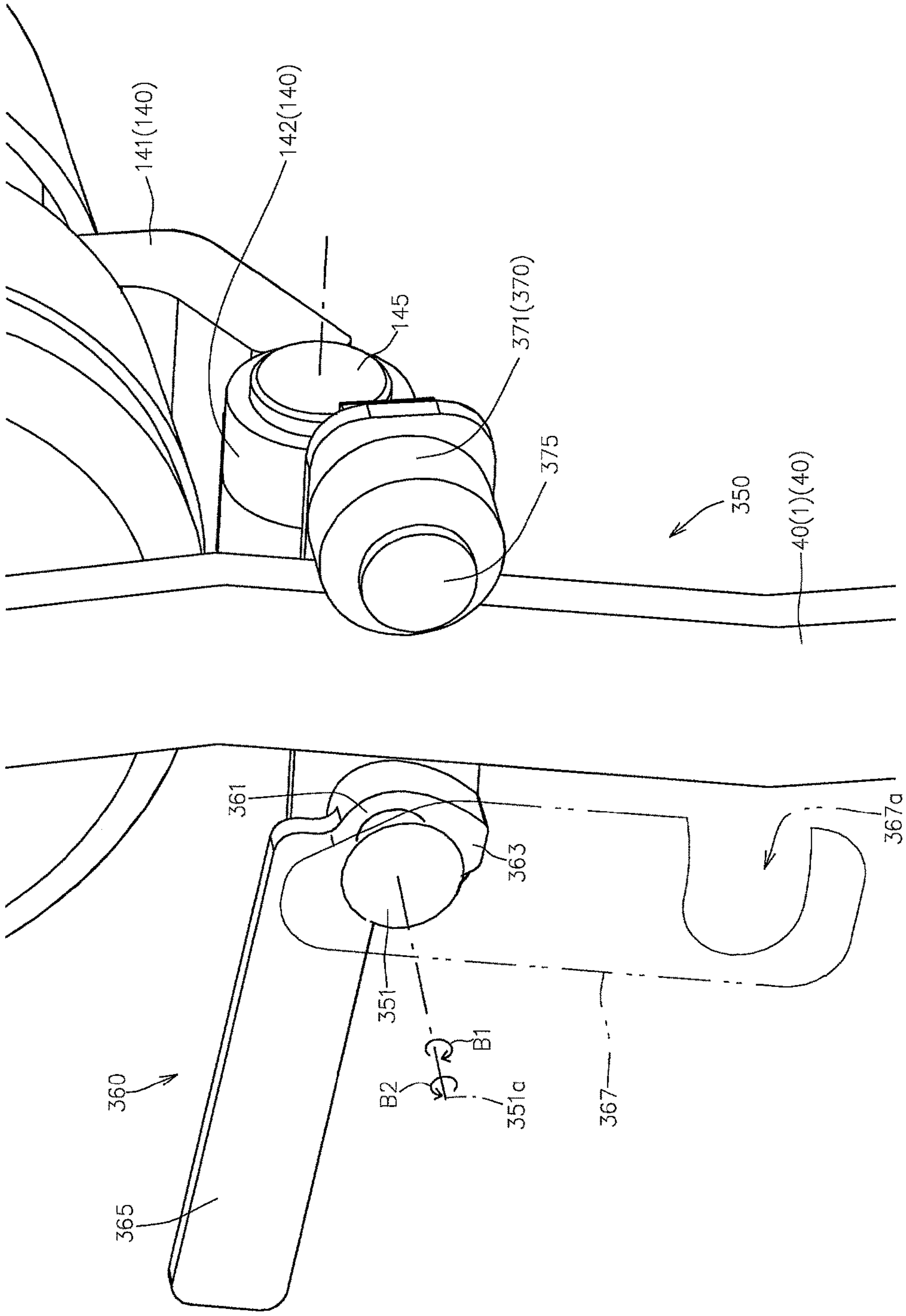
FIG. 15 is a cross-sectional perspective view corresponding to FIG. 13, and showing a state where a lower fastening member is positioned in a released position.

FIG. 15 is a partial cross-sectional perspective view corresponding to FIG. 14, and shows the state where the lower fastening member 360 is positioned in a predetermined released position around the lower rotational shaft 351.

As shown in FIG. 15, in the state where the lower fastening member 360 is positioned in a released position around the lower rotational shaft 351, relatively moving the lower frame 140 and the lower leg frame 40 toward each other with respect to the user width direction enables the lower leg frame 40 to be positioned in the space between the lower fastening member 360 and the lower receiving member 370, and in the state where the lower leg frame 40 is positioned in the space, relatively moving the lower frame 140 and the lower leg frame 40 away from each other with respect to the user width direction enables the lower leg frame 40 to be retreated from the space.

Moreover, as shown in FIG. 14, in the state where the lower leg frame 40 is positioned in the space, axially rotating the lower fastening member 360 from the released position around the lower rotational shaft 351 to a second side B2 opposite to the first side B1 causes the cam part 363 to hold the lower leg frame 40 in cooperation with the lower receiving member 370 with respect to the user front-back direction, and thereby the state where the lower frame 140 is connected to the lower leg frame 40 is attained.

As shown in FIGS. 13 to 15, in the present embodiment, the lower fastening member 360 has an operation arm 365 extending radially outward from the bearing part 361 in a position circumferentially different from the cam part 363.

The operation arm 365 is configured such that the radial length between the free end of the operation arm 365 and the axis 351*a* of the lower rotational shaft 351 is greater than the radial length between the radially outermost end of the cam part 363 and the axis 351*a* of the lower rotational shaft 351.

This configuration, while making it easy to rotate the lower fastening member 360 around the lower rotational shaft 351 via the operation arm 365, makes it possible to effectively prevent connection between the lower frame 140 and the lower leg frame 40 from being cancelled by the rotation of the lower fastening member 360 around the lower rotational shaft 351 via the cam part 363 when the lower leg frame 40 and the lower frame 140 are relatively moved unintentionally.

As shown in FIGS. 13 to 15, in the present embodiment, the lower fastening member 360 has an engagement arm 367 extending radially outward from the bearing part 361 in a position more inside in the user width direction than the cam part 363.

In FIG. 14 and FIG. 15, the engagement arm 367 is indicated by an imaginary line (dashed double-dotted line).

The engagement arm 367 is provided on the lower fastening member 360 so as to be positioned on the inner side in the user width direction than the lower leg frame 40 positioned in the space between the lower fastening member 360 and the lower receiving member 370.

The engagement arm 367 is provided with an engagement groove 367*a* for engagement with a portion of the lower receiving shaft 375, which extends more inward in the user width direction than the lower receiving member 370, when the lower fastening member 360 is rotated around the lower rotational shaft 351 from the released position toward the second side B2 around the axis to hold the lower leg frame 40 with respect to the user front-back direction in cooperation with the lower receiving member 370, and by the inward extending portion of the lower receiving shaft 375 inserted in the engagement groove 367*a*, the unintentional relative movement of the lower frame 140 and the lower leg frame 40 in the user width direction is prevented.

The lower connecting body 350 is also provided with a spacer 380 (see FIG. 3) for filling the gap between the lower leg frame 40 and the lower frame 140 with respect to the user width direction when the lower fastening member 360 is positioned in a held position, with the lower leg frame 40 being positioned in the space between the lower fastening member 360 and the lower receiving member 370.

Moreover, with the actuator unit 100A according to the present embodiment being attached to the knee-ankle-foot orthosis 1, the position in the user width direction of the lower connecting body 350 is adjustable, and, accordingly, the actuator unit 100A can be effectively attached to knee-ankle-foot orthoses having various shapes and sizes.

That is, as shown in, for example, FIGS. 8, 9, and 13 to 15, the lower frame 140 includes a first lower frame 141 connected to the upper frame 120 via the actuator-side rotational connecting part 150 so as to be rotatable around the actuator-side pivot axis Y, and a second lower frame 142 directly or indirectly supporting the lower rotational shaft 351 and the lower receiving member 370, and the second lower frame 142 is connected to the first lower frame 141 so as to be rotatable around a swing shaft 145 in the user front-back direction.

This configuration makes it possible to change the orientation of the attached actuator unit 100A, and thus the actuator unit 100A can be appropriately attached to variously shaped knee-ankle-foot orthoses 1 that are custom-made according to the user's physique.

That is, the knee-ankle-foot orthosis 1 is custom-made according to the user's physique, and thus the tilt angle and/or the curvature of the thigh frame 20 relative to the lower leg frame 40 with respect to the user width direction W (see FIG. 4) is different for each knee-ankle-foot orthosis 1.

In this regard, adopting the configuration in which the second lower frame 142 directly or indirectly supporting the lower rotational shaft 351 and the lower receiving member 370 is connected so as to be rotatable around the swing shaft 145 in the user front-back direction to the first lower frame 141 connected to the upper frame 120 via the actuator-side rotational connecting part 150 so as to be rotatable around the actuator-side pivot axis Y enables the actuator unit 100A to be effectively attached to various knee-ankle-foot orthoses 1 having different tilt angles and/or curvatures with respect to the user width direction W of the thigh frame 20 relative to the lower leg frame 40.

Second Embodiment

Below, the second embodiment of the actuator unit for a knee-ankle-foot orthosis according to the present invention will now be described with reference to the attached drawings.

Figure 16:
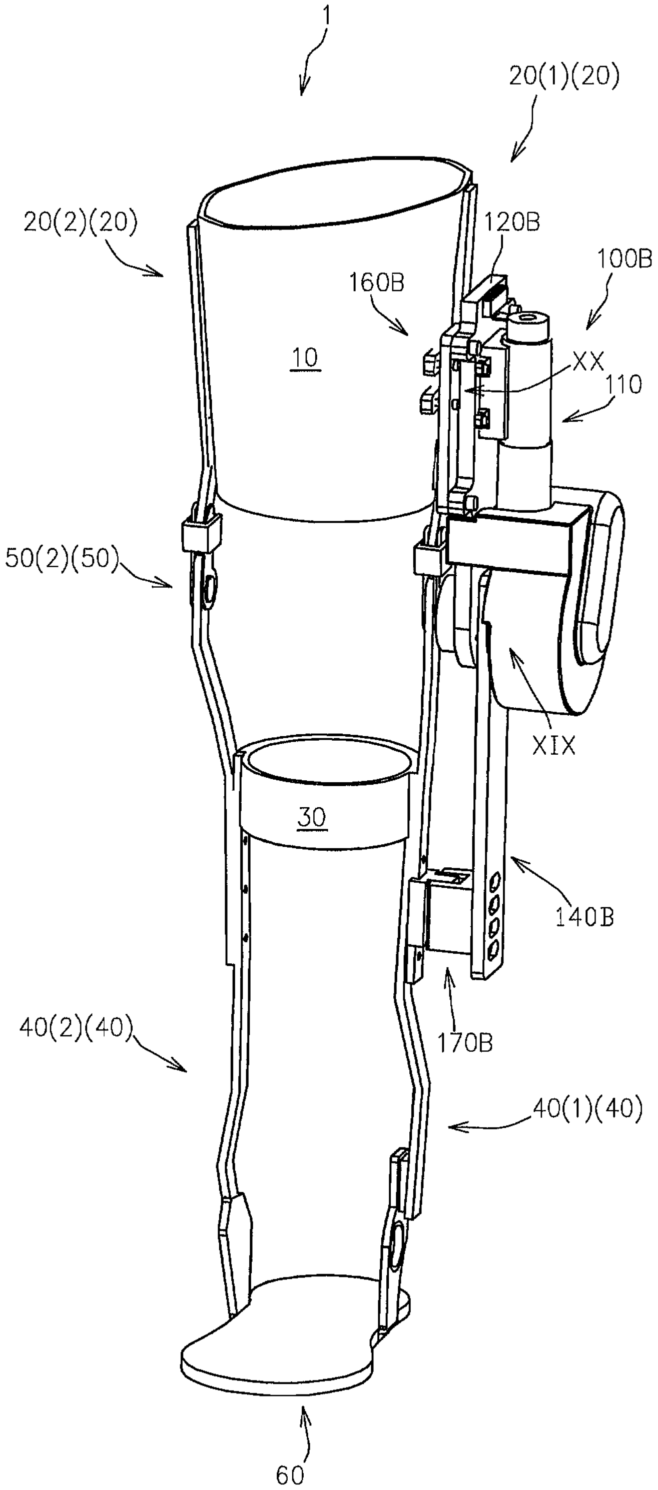
FIG. 16 is a perspective view of the knee-ankle-foot orthosis to which an actuator unit according to a second embodiment of the present invention is attached.

FIG. 16 shows a perspective view of the knee-ankle-foot orthosis 1 to which an actuator unit 100B according to the present embodiment is attached.

Figure 17:
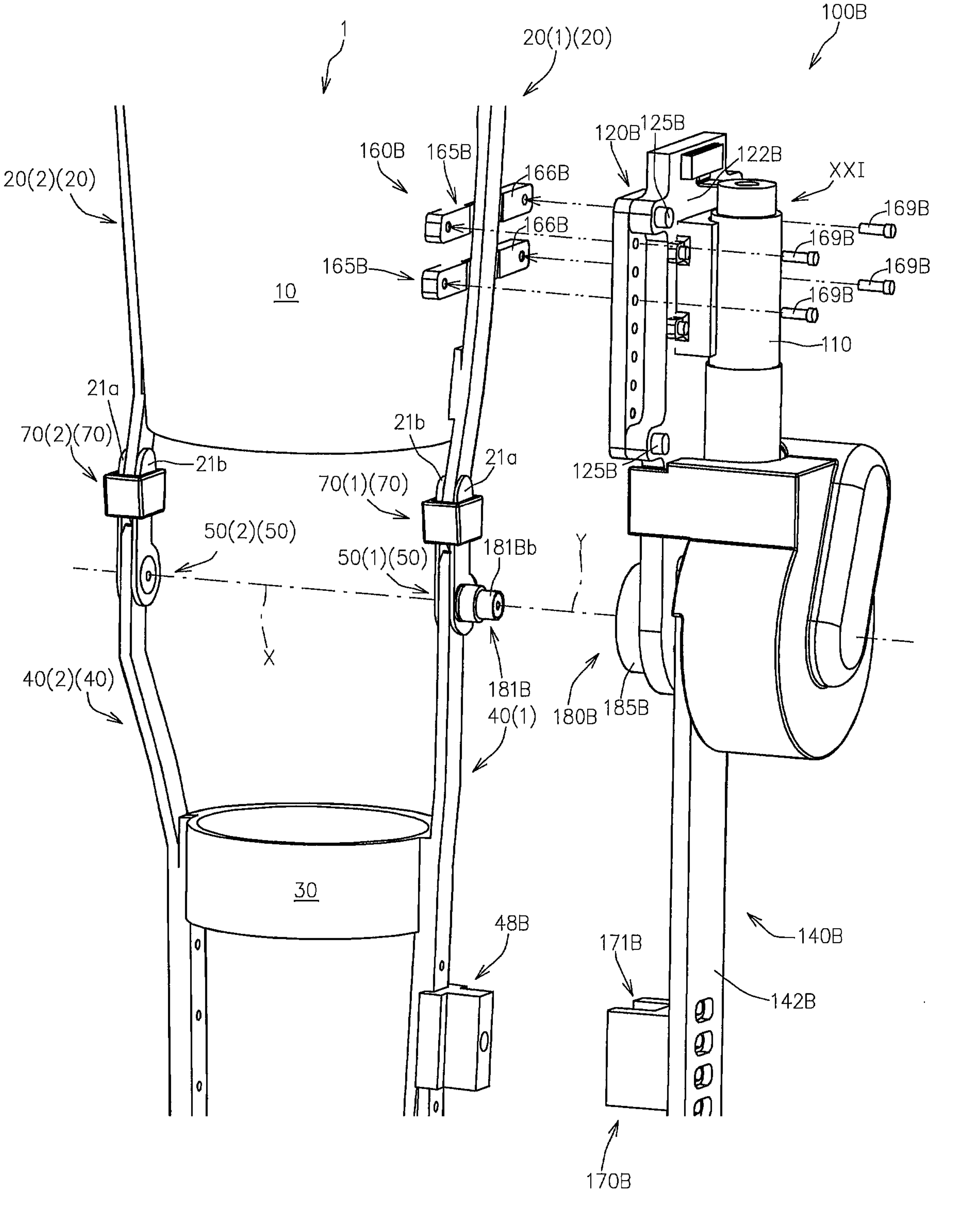
FIG. 17 is an enlarged exploded perspective view of FIG. 16 as viewed from the outer side in the user width direction.
Figure 18:
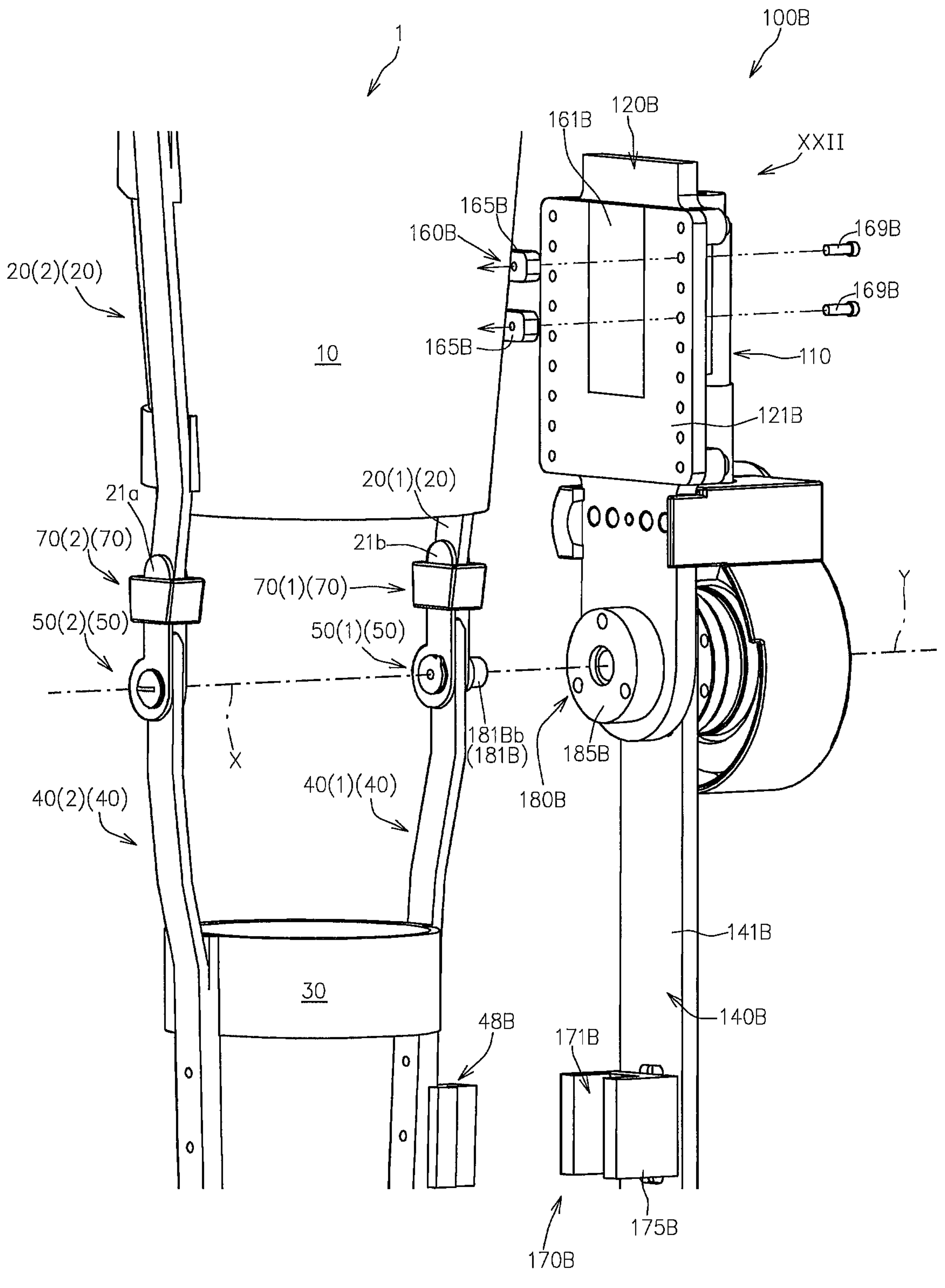
FIG. 18 is an enlarged exploded perspective view of FIG. 16 as viewed from the inner side in the user width direction.

FIGS. 17 and 18 respectively show partially exploded perspective views of the knee-ankle-foot orthosis of FIG. 16 as viewed from the outer side and the inner side in the user width direction.

Figure 19:
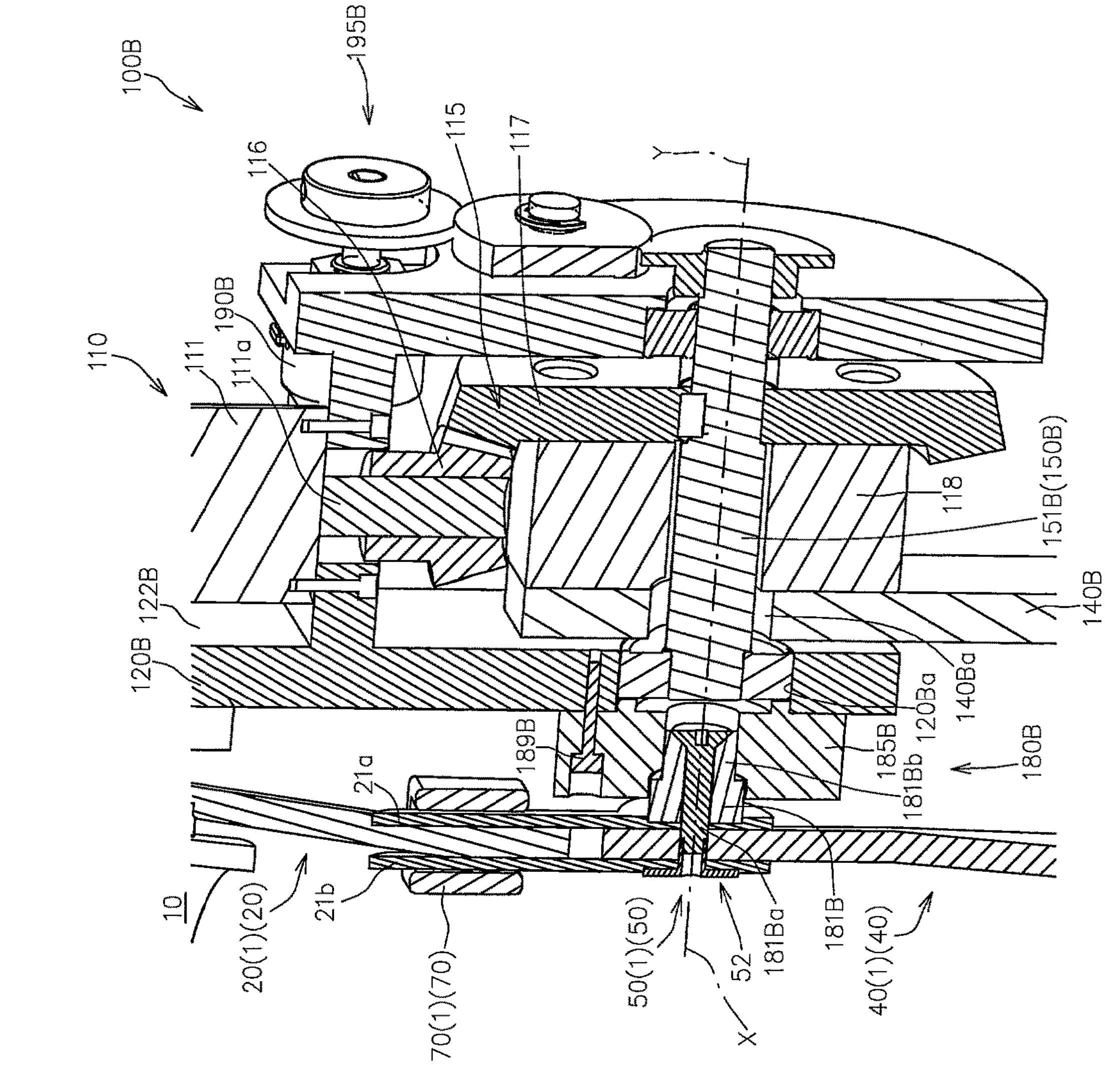
FIG. 19 is a partial vertical cross-sectional front view of XIX part in FIG. 16.

Moreover, FIG. 19 shows a partial vertical cross-sectional front view of the XIX part in FIG. 16.

As shown in FIGS. 16 to 19, the actuator unit 100B includes an upper frame 120B disposed so as to face the first thigh frame 20(1), a lower frame 140B disposed so as to face the first lower leg frame 40(1), an actuator-side connecting part 150B connecting the upper frame 120B and the lower frame 140B, a driver 110 for producing driving force for rotating the lower frame 140B, an upper connecting body 160B for engaging the upper frame 120B with the first thigh frame 20, and a lower connecting body 170B for engaging the lower frame 140B with the first lower leg frame 40(1).

Figure 20:
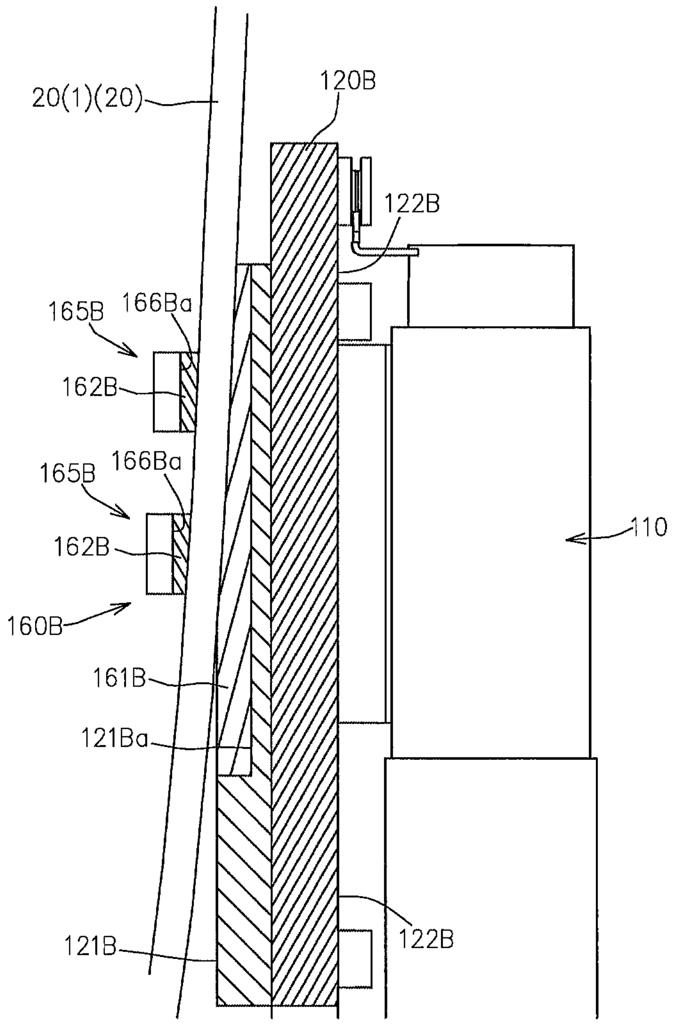
FIG. 20 is a partial vertical cross-sectional front view of XX part in FIG. 16.

FIG. 20 shows a partial vertical cross-sectional front view of the XX part in FIG. 16.

As shown in FIGS. 17, 18, and 20, the upper frame 120B has an inner surface 121B facing inward in the user width direction and opposed to the first thigh frame 20(1) and an outer surface 122B facing outward in the user width direction.

As shown in FIGS. 17 and 18, the lower frame 140B has an inner surface 141B facing inward in the user width direction and opposed to the first lower leg frame 40(1) and an outer surface 142B facing outward in the user width direction.

The actuator-side connecting part 150B connects both frames 120B, 140B such that the lower frame 140B is rotatable around the pivot axis Y relative to the upper frame 120B.

In the present embodiment, as shown in FIG. 19, the actuator-side connecting part 150B has an upper frame-side attachment hole 120Ba provided in the lower part of the upper frame 120B, a lower frame-side attachment hole 140Ba provided in the upper part of the lower frame 140B, and a rotational connecting shaft 151B inserted in the upper frame-side attachment hole 120Ba and the lower frame-side attachment hole 140Ba.

The driving source 111 is fixed to an outer surface 122B of the upper frame 120B.

In the present embodiment, as shown in FIG. 19, the driving source 111 is fixed to the outer surface 122B of the upper frame 120B, with the output shaft 111*a* extending downward.

In the present embodiment, as shown in FIG. 19, rotational power that is output from the driving source 111 is transmitted to the lower frame 140B via the transmission mechanism 115 and a torque limiter 118.

That is, rotation of the driven-side bevel gear 117 is transmitted to the lower frame 140B via the torque limiter 118.

In the present embodiment, the driven-side bevel gear 117 is supported by the rotational connecting shaft 151B so as to be incapable of relative rotation, and the actuator unit 100B is provided with a sensor 190B for detecting the angle of axial rotation of the rotational connecting shaft 151B.

Detecting the angle of axial rotation of the rotational connecting shaft 151B by the sensor 190B enables the swinging angle of the lower frame 140B to be recognized.

Reference number 195B in FIG. 19 denotes a gear train for transmitting the rotation of the rotational connecting shaft 151B to the sensor 190B.

Figure 21:
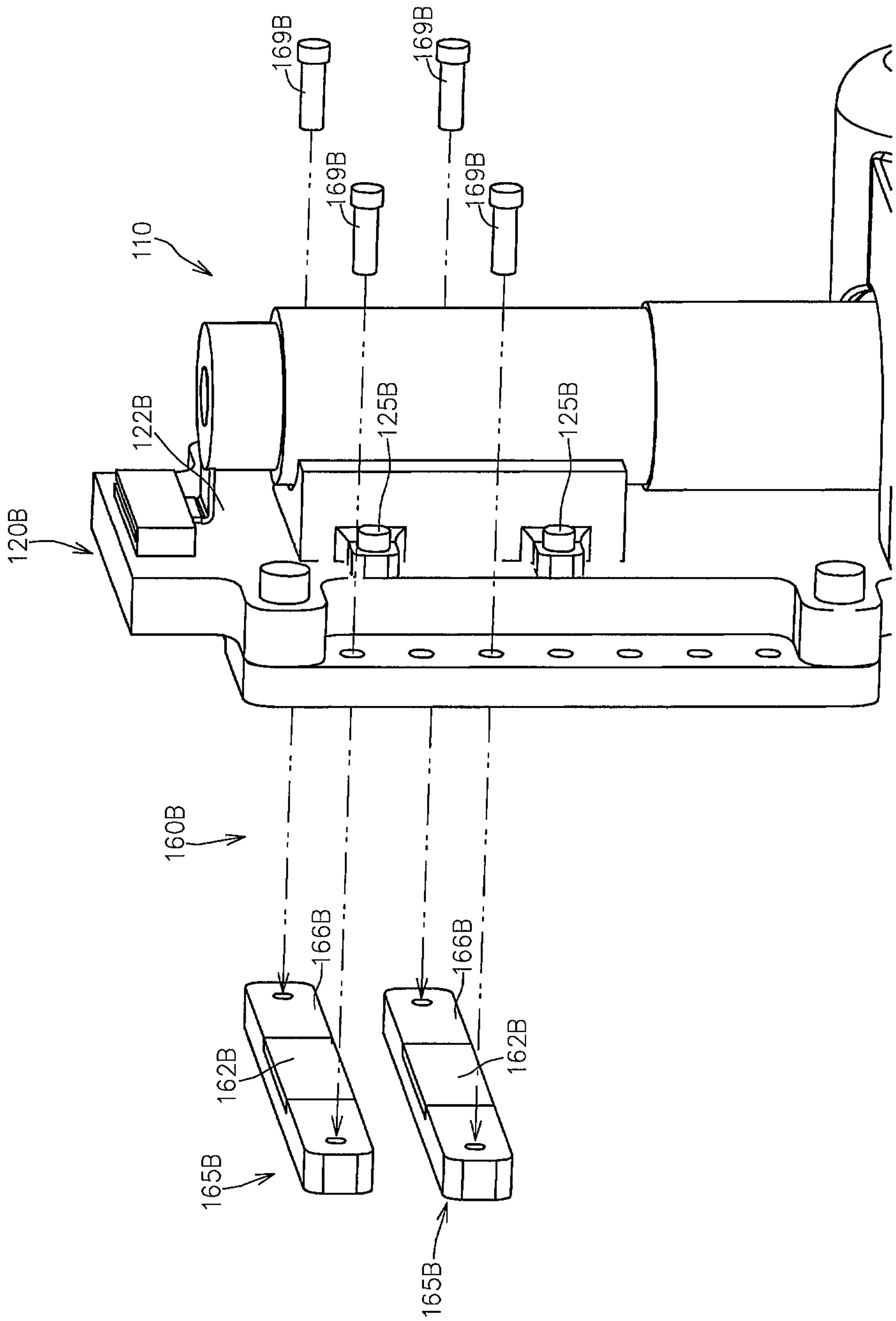
FIG. 21 is an enlarged view of XXI part in FIG. 17.
Figure 22:
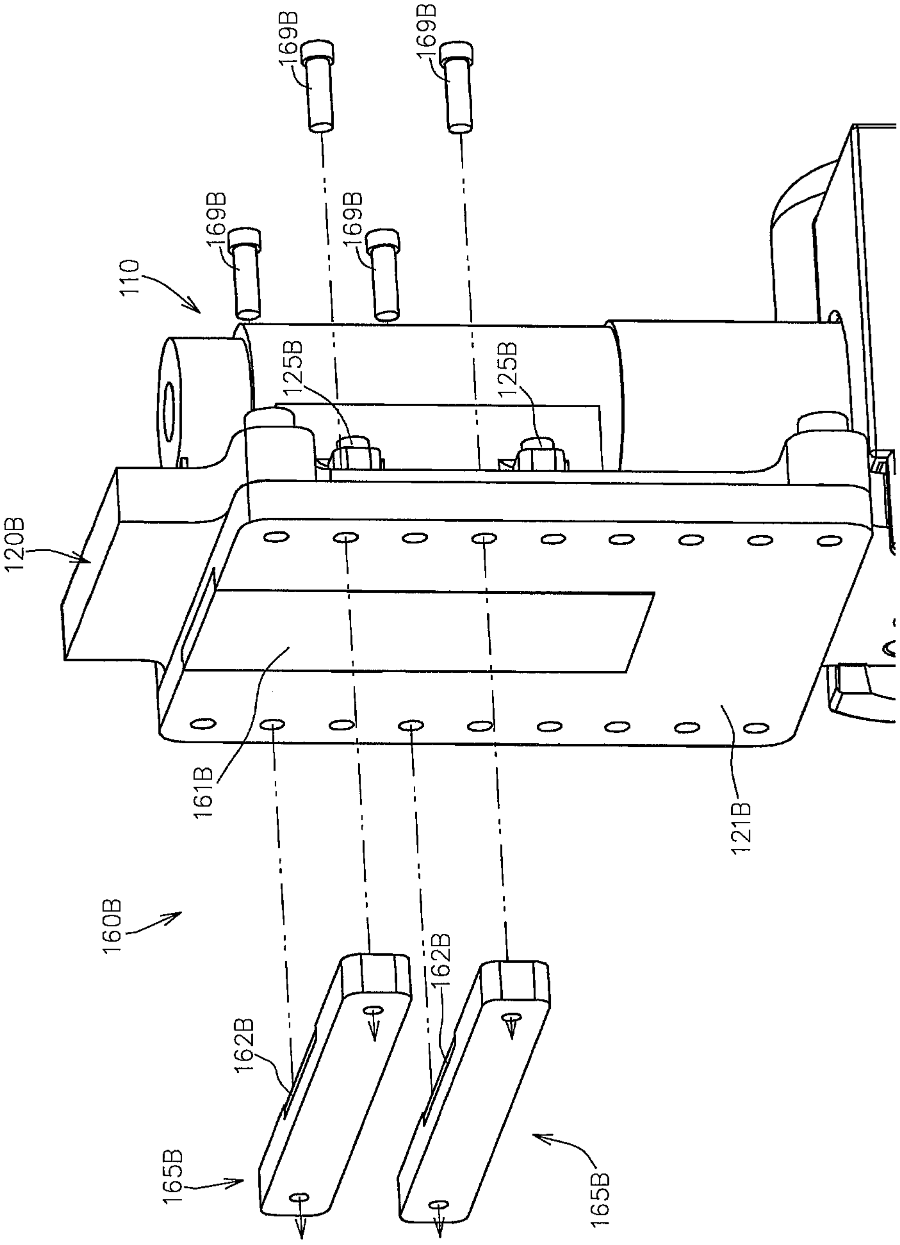
FIG. 22 is an enlarged view of XXII part in FIG. 18.

FIGS. 21 and 22 show enlarged views of the XXI part and the XXII part in FIGS. 17 and 18, respectively.

In FIGS. 21 and 22, illustration of the knee-ankle-foot orthosis 1 is omitted for easier understanding of the upper connecting body 160B.

As shown in FIGS. 17, 18, and 20 to 22, the upper connecting body 160B has an outer elastic body 161B positioned between the inner surface 121B of the upper frame 120B and the outer surface of the first thigh frame 20(1), and inner connecting members 165B connected to the upper frame 120B so as to bind the first thigh frame 20(1) and the outer elastic body 161B.

Specifically, the outer elastic body 161B is disposed between an outer binding region 121Ba (see FIG. 20) of the inner surface 121B of the upper frame 120B, which faces the outer surface of the first thigh frame 20(1), and the outer surface of the first thigh frame 20(1).

In the present embodiment, as shown in FIGS. 20 and 22, depressions are provided in a portion of the inner surface 121B of the upper frame 120B, which forms the outer binding region 121Ba, and the outer elastic body 161B is disposed in the depressions. This configuration makes it possible to effectively prevent the positional shift of the outer elastic body 161B.

In the present embodiment, in the upper frame 120B, the component forming the outer surface 122B to which the driver 110 is attached and the component forming the inner surface 121B including the outer binding region 121Ba with which the outer elastic body 161B is in contact are separate components, and both components are separably connected to each other by fastening members 125B (see FIGS. 21 and 22). Naturally, the upper frame 120B can also be formed as a single body.

The inner connecting members 165B have inner binding regions 166Ba that are opposed to the inner surface of the first thigh frame 20(1) on the side surface 166B facing outward in the user width direction, and are detachably connected to the upper frame 120B such that the first thigh frame 20(1) and the outer elastic body 161B are pressed by the inner binding regions 166Ba and the outer binding region 121Ba.

In the present embodiment, the inner connecting members 165B are detachably connected to the upper frame 120B by fastening members 169B such as bolts.

Including the upper connecting body 160B, the actuator unit 100B according to the present embodiment can be appropriately attached to variously shaped knee-ankle-foot orthoses 1 that are custom-made according to the user's physique.

This point will now be described in detail.

As described above, the knee-ankle-foot orthosis 1 is custom-made according to the user's physique, and thus the tilt angle and/or the curvature of the thigh frame 20 relative to the lower leg frame 40 with respect to the user width direction W is different for each knee-ankle-foot orthosis 1.

Figure 23:
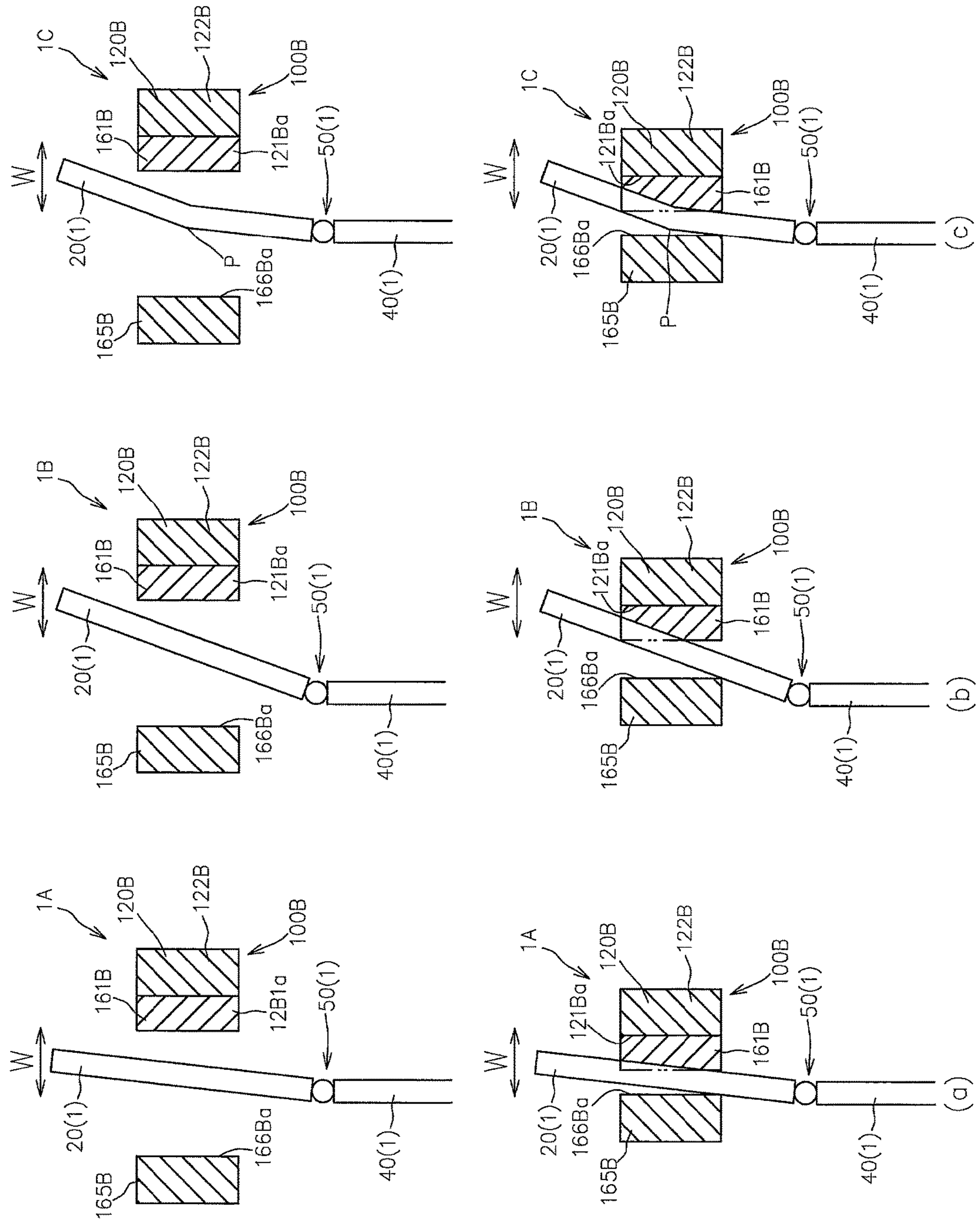
FIGS. 23(*a*) to 23(*c*) are respectively schematic front views of a first thigh frame on an outer side in the user width direction and a first lower leg frame on an outer side in the user width direction in first to third knee-ankle-foot orthoses wherein the tilt angle and/or the curvature in the user width direction of the first thigh frame relative to the first lower leg frame is different, and showing a state of connection by an upper connecting body in the actuator unit according to the second embodiment.

FIGS. 23(*a*) to (*c*) respectively show schematic front views of the first thigh frame 20(1) and the first lower leg frame 40(1) in first to third knee-ankle-foot orthoses 1A to 1C wherein the tilt angle and/or the curvature in the user width direction of the first thigh frame 20(1) relative to the first lower leg frame 40(1) is different, and depict the state of connection by the upper connecting body 160B.

The first knee-ankle-foot orthosis 1A shown in FIG. 23(*a*) is formed such that the tilt angle in the user width direction of the first thigh frame 20(1) relative to the first lower leg frame 40(1) is small.

The second knee-ankle-foot orthosis 1B shown in FIG. 23(*b*) is formed such that the tilt angle in the user width direction of the first thigh frame 20(1) relative to the first lower leg frame 40(1) is larger than that of the first knee-ankle-foot orthosis 1A.

The third knee-ankle-foot orthosis 1C shown in FIG. 23(*c*) is formed such that the tilt angle in the user width direction of the first thigh frame 20(1) relative to the first lower leg frame 40(1) is changed in the longitudinally intermediate part of the first thigh frame 20(1).

That is, the third knee-ankle-foot orthosis 1C is formed such that in the lower part of the first thigh frame 20(1), the tilt angle in the user width direction relative to the first lower leg frame 40(1) is small, and in the upper part above an inflection point P, the tilt angle in the user width direction relative to the first lower leg frame 40(1) is large.

As shown in the lower diagrams of FIGS. 23(*a*) to (*c*), the outer elastic body 161B in the upper connecting body 160B elastically deforms so as to absorb the difference in the tilt angle and/or curvature of the first thigh frame 20(1), which exists between the first to third knee-ankle-foot orthoses 1A to 1C.

Accordingly, even when the actuator unit 100B is attached to any of the first to third knee-ankle-foot orthoses 1A to 1C, the outer surface 122B of the upper frame 120B, which serves as an attachment surface for the driver 110, is maintained in a substantially upright manner.

In the present embodiment, as shown in FIGS. 20 to 22, the upper connecting body 160B further has inner elastic bodies 162B interposed between the inner binding regions 166Ba and the inner surface of the first thigh frame 20(1).

Figure 24:
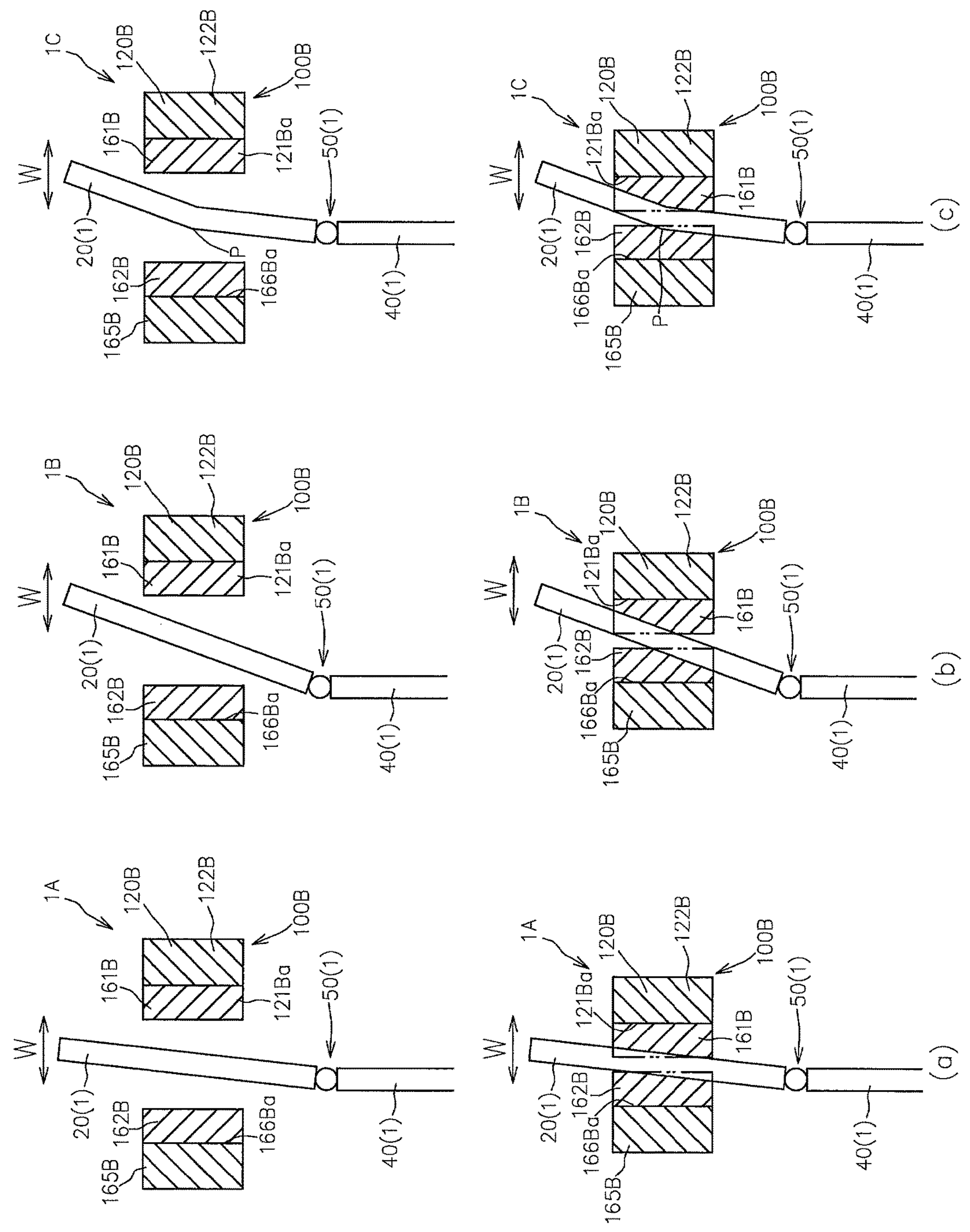
FIGS. 24(*a*) to 24(*c*) are schematic front views respectively corresponding to FIGS. 23(*a*) to 23(*c*), and showing a state of connection by the upper connecting body including inner elastic bodies.

FIGS. 24(*a*) to (*c*) respectively show schematic front views of the first thigh frame 20(1) and the first lower leg frame 40(1) in the first to third knee-ankle-foot orthoses 1A to 1C, and depict the state of connection by the upper connecting body 160B including the inner elastic bodies 162B.

As shown in FIGS. 24(*a*) to (*c*), the inner elastic bodies 162B make it possible to more stably connect the inner connecting members 165B and the first upper frame 120B.

Next, the lower connecting body 170B will now be described.

In the present embodiment, as shown in FIGS. 17 and 18, the lower connecting body 170B has a lower frame-side engagement part 171B provided on the inner surface 141B of the lower frame 140B.

The lower frame-side engagement part 171B has a depressed or projecting shape (a depressed shape in the illustrated embodiment) in the user width direction, and is configured so as to be directly or indirectly depression/projection-engaged with the first lower leg frame 40(1).

This configuration makes it possible to attain the state where the lower frame 140B is engaged with the first lower leg frame 40(1) so as to be capable of power transmission merely by moving the actuator unit 100B inward in the user width direction relative to the knee-ankle-foot orthosis 1, and also makes it possible to disengage the lower frame 140B from the first lower leg frame 40(1) merely by moving the actuator unit 100B outward in the user width direction relative to the knee-ankle-foot orthosis 1.

In the present embodiment, the lower frame-side engagement part 171B is formed on an engagement member 175B that is a component separate from the lower frame 140B and that is fixed to the lower frame 140B, while the lower frame-side engagement part 171B can also be formed integrally with the lower frame 140B.

In the present embodiment, while an engagement member 48B with which the lower frame-side engaging part 171B is depression/projection-engaged is fixed to the first lower leg frame 40(1), it is also possible to configure that the lower frame-side engagement part 171B is directly depression/projection-engaged with the first lower leg frame 40(1).

The actuator unit 100B according to the present embodiment, in addition to having the above-described configuration, includes a rotation center connecting body 180B that causes the actuator-side connecting part 150B to be coaxially engaged with the first brace-side connecting part 50(1).

The rotation center connecting body 180B makes it possible to precisely and stably position the pivot axis Y serving as the rotation center of the lower frame 140B relative to the upper frame 120B coaxially with the swing axis X serving as the rotational center of the first lower leg frame 40(1) relative to the first thigh frame 20(1).

In the present embodiment, the rotation center connecting body 180B is configured so as to connect the actuator-side connecting part 150B to the first brace-side connecting part 50(1) by utilizing the internally threaded member 52 of the first brace-side connecting part 50(1).

Specifically, as shown in FIGS. 17, 18, and 19, the rotation center connecting body 180B has a brace-side rotation center connecting member 181B connected to the knee-ankle-foot orthosis 1 and an actuator-side rotation center connecting member 185B connected to the actuator unit 100A.

The brace-side rotation center connecting member 181B has an external thread screwed into the screw hole of the internally threaded member 52 on one end side 181Ba and one of a projection and a depression on the other end side 181Bb.

In the present embodiment, as shown in FIGS. 17 and 19, the other end side 181Bb of the brace-side rotation center connecting member 181B has a projection.

The actuator-side rotation center connecting member 185B is fixed to the upper frame 120B so as to be positioned coaxially with the upper frame-side attachment hole 120Ba, and has the other of the projection and the depression that is depression/projection-engaged with the one of the projection and the depression of the brace-side rotation center connecting member 181B.

In the present embodiment, as shown in FIGS. 18 and 19, the actuator-side rotation center connecting member 185B has a depression.

In the present embodiment, as shown in FIG. 19, the actuator-side rotation center connecting member 185B has a projection that is on the side opposite the brace-side rotation center connecting member 181B and that is inserted into the upper frame-side attachment hole 120Ba, and accordingly the actuator-side rotation center connecting member 185B can be positioned so as to be precisely concentric with the actuator-side connecting part 150B.

According to the rotation center connecting body 180B having this configuration can provide the following effects.

Detaching the externally threaded member 55 from the internally threaded member 52 (see FIG. 6) and screwing the brace-side rotation center connecting member 181B in place of the externally threaded member 55 to the internally threaded member 52 enables the brace-side rotation center connecting member 181B to be attached to the knee-ankle-foot orthosis 1 on the swing axis X.

On the other hand, the actuator-side rotation center connecting member 185B can be fixed to the inner surface of the upper frame 120B by a fastening member 189B (see FIG.

19) such as a bolt so as to be positioned concentrically with the upper frame-side attachment hole 120Ba.

Merely by moving the actuator unit 100B equipped with the actuator-side rotation center connecting member 185B inward in the user width direction relative to the knee-ankle-foot orthosis 1, the actuator-side rotation center connecting member 185B can be depression/projection-engaged with the brace-side rotation center connecting member 181B, and the pivot axis Y serving as the rotation center of the lower frame 140B relative to the upper frame 120B can be accurately and stably aligned with the swing axis X serving as the rotation center of the first lower leg frame 40 (1) relative to the first thigh frame 20(1).

Also, merely by moving the actuator unit 100B outward in the user width direction relative to the knee-ankle-foot orthosis 1, the depression/projection engagement between the actuator-side rotation center connecting member 185B and the brace-side rotation center connecting member 181B can be cancelled.

In the present embodiment, the outer elastic body 161B (the outer elastic body 161B and the inner elastic body 162B in a preferable embodiment) enables the actuator unit 100B to be attached to variously shaped knee-ankle-foot orthoses 1 that are custom-made according to the user's physique. In addition, the actuator unit 100C having the following configuration can also be attached to variously shaped knee-ankle-foot orthoses 1.

Figure 25:
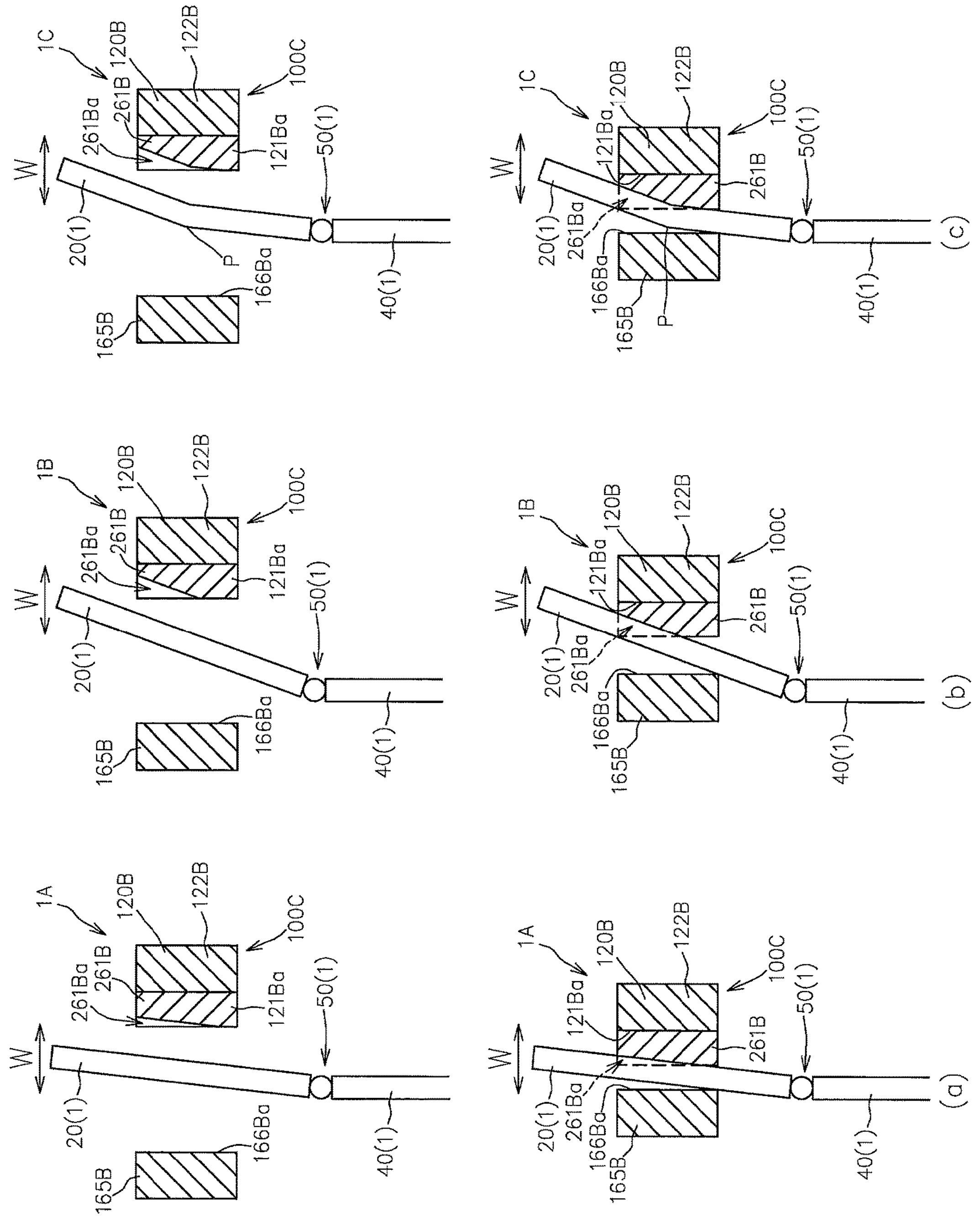
FIGS. 25(*a*) to 25(*c*) are schematic front views respectively corresponding to FIGS. 23(*a*) to 25(*c*), and showing a state of connection by an upper connecting body in an actuator unit according to a modification.

FIGS. 25(*a*) to (*c*) are schematic front views respectively showing the state where the actuator unit 100C according to a modification example is attached to the first to third knee-ankle-foot orthoses 1A to 1C.

In the drawings, the same components as those in the above embodiment are given the same reference numbers.

As shown in FIGS. 25(*a*) to (*c*), the actuator unit 100C according to a modification example has an outer spacer 261B in place of the outer elastic body 161B when compared with the actuator unit 100B.

The actuator unit 100C is configured such that the outer spacer 261B is detachably attached to the outer binding region 121Ba of the upper frame 120B.

The outer spacer 261B is formed of a rigid body such as metal or resin, and is configured such that the side surface facing outward in the user width direction is in surface contact with the outer binding region 121Ba and that the side surface facing inward in the user width direction is in surface contact with the outer surface of the first thigh frame 20(1) (see the lower diagrams of FIGS. 25(*a*) to (*c*)).

In the actuator unit 100C according to a modification example, merely by providing dedicated outer spacers 261B for variously shaped knee-ankle-foot orthoses 1 and changing the outer spacers 261B make it possible to attach the actuator unit 100C to the variously shaped knee-ankle-foot orthoses 1 having different tilt angles and/or curvatures of the thigh frame 20.

Preferably, as shown in FIGS. 25(*a*) to (*c*), a depression 261Ba is formed in the side surface of the outer spacer 261B facing inward in the user width direction, and the first thigh frame 20(1) can be inserted into the depression 261Ba such that the outer surface of the first thigh frame 20(1) is in surface contact with the bottom surface of the depression 261Ba.

This configuration makes it possible to attain the state where the outer surface of the upper frame 120B is maintained in a substantially upright manner while preventing the upper frame 120B from being relatively moved in the user front-back direction relative to the first thigh frame 20(1) by the outer spacer 261B, and, accordingly, makes it possible to stably attach the actuator unit 100C to the knee-ankle-foot orthosis 1.

Preferably, the actuator unit 100C according to a modification example can include an inner spacer 262B detachably attached to the inner binding regions 166Ba.

Figure 26:
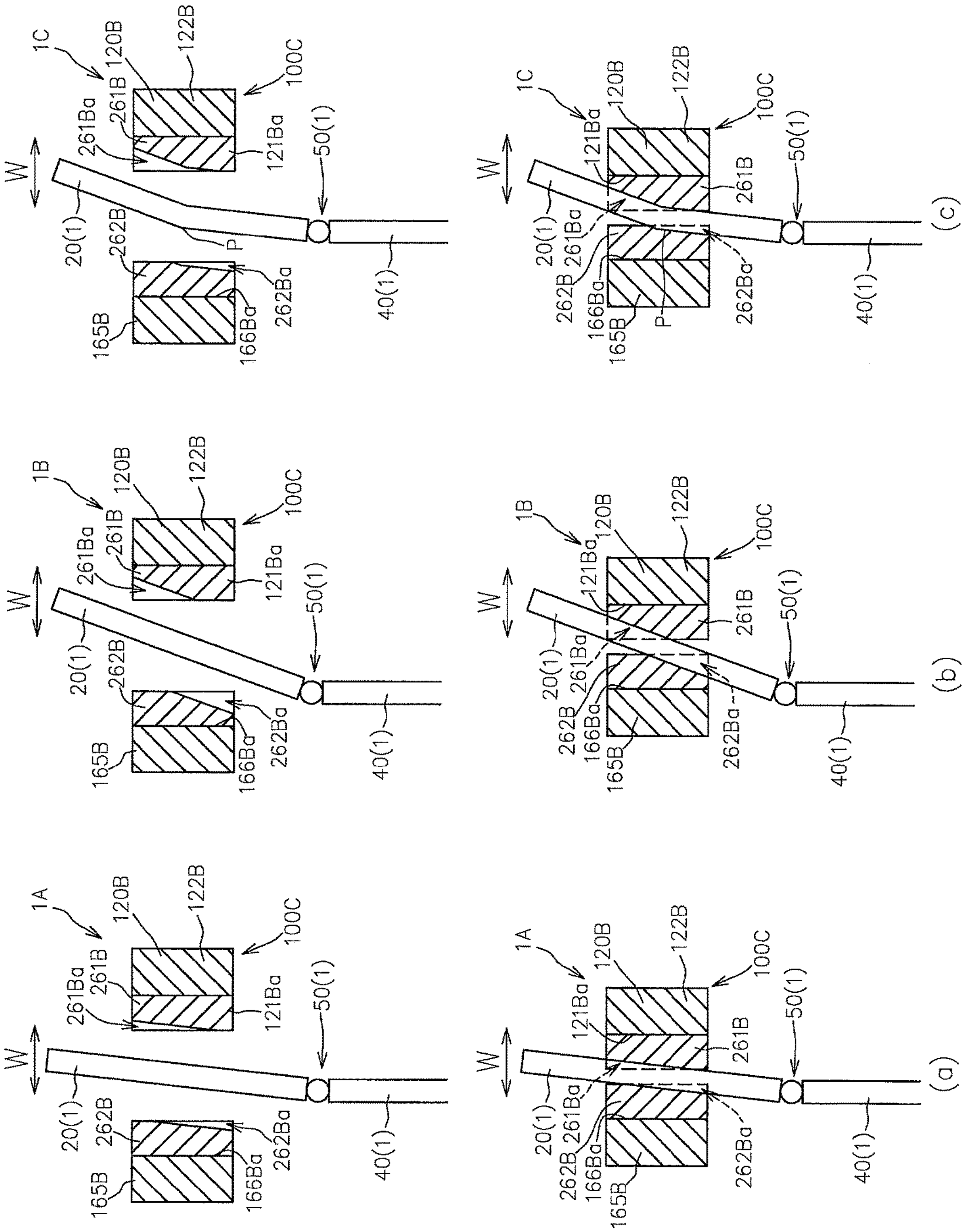
FIGS. 26(*a*) to 26(*c*) are schematic front views respectively corresponding to FIGS. 23(*a*) to 25(*c*), and showing a state of connection by the upper connecting body including inner elastic bodies in the actuator unit according to the modification.

FIGS. 26(*a*) to (*c*) respectively show schematic front views depicting the state where the actuator unit 100C according to a modification example including the inner spacer 262B is attached to the first to third knee-ankle-foot orthoses 1A to 1C.

The inner spacer 262B is formed of a rigid body such as metal or resin, and is configured such that the side surface facing inward in the user width direction is in surface contact with the inner binding regions 166Ba and that the side surface facing outward in the user width direction is in surface contact with the inner surface of the thigh frame 120B (see the lower diagrams of FIGS. 26(*a*) to (*c*)).

According to this configuration, merely by providing dedicated inner spacers 262B for variously shaped knee-ankle-foot orthoses 1 and changing the inner spacers 262B make it possible to attach the actuator unit 100C to the variously shaped knee-ankle-foot orthoses having different tilt angles and/or curvatures of the thigh frame 20.

Preferably, as shown in FIGS. 26(*a*) to (*c*), a depression 262Ba is formed in the side surface of the inner spacer 262B facing outward in the user width direction, and the first thigh frame 20(1) can be inserted into the depression 262Ba such that the inner surface of the first thigh frame 20(1) is in surface contact with the bottom surface of the depression 262Ba.

This configuration makes it possible to effectively prevent the inner connecting body 165B from being relatively move in the user front-back direction relative to the first thigh frame 20 by the inner spacer 262B when the inner connecting body 165B is connected to the upper frame 120B, and, accordingly, makes it possible to stably attach the actuator unit 100C to the knee-ankle-foot orthosis 1.

Third Embodiment

Below, one embodiment of the actuator unit for a knee-ankle-foot orthosis according to the present invention will now be described with reference to the attached drawings.

Figure 27:
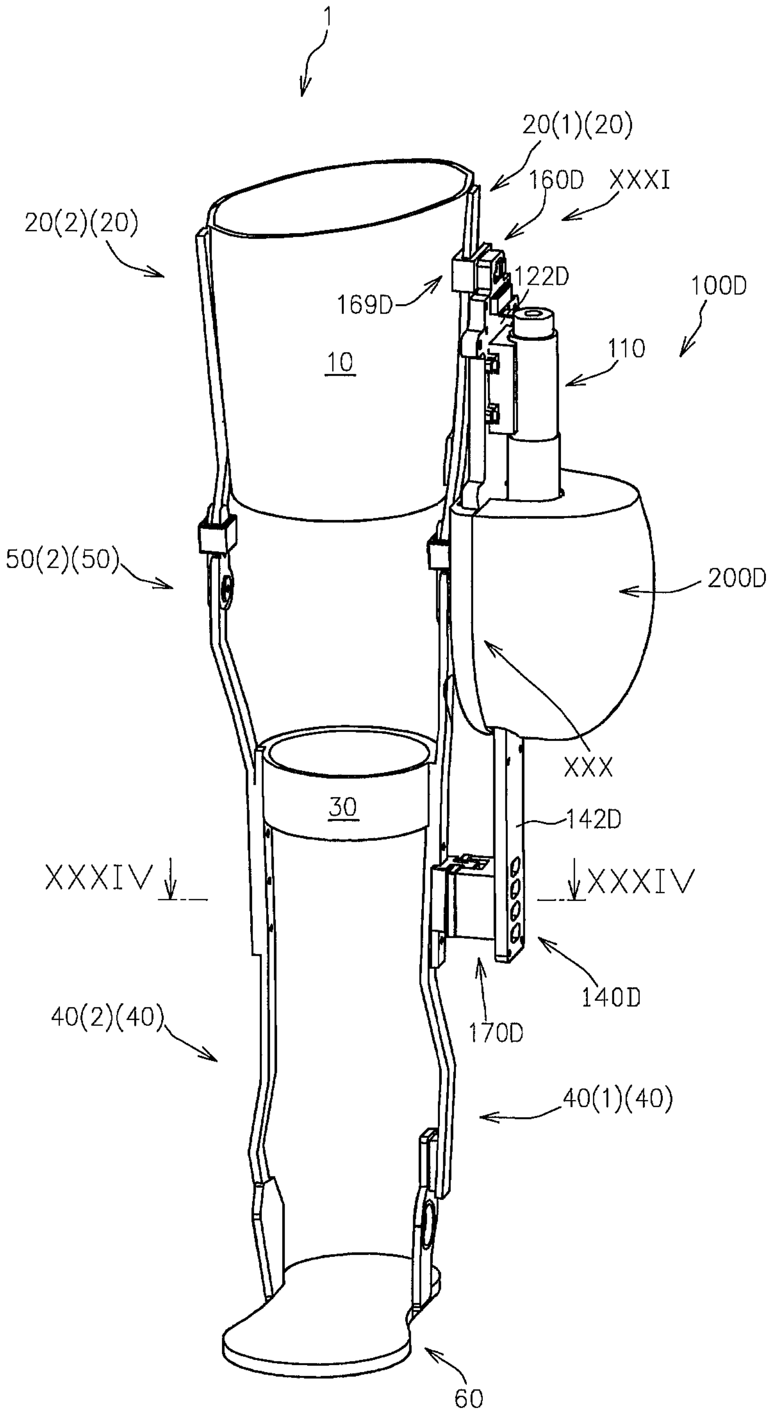
FIG. 27 is a perspective view of the knee-ankle-foot orthosis to which an actuator unit according to a third embodiment of the present invention is attached.

FIG. 27 shows a perspective view of a knee-ankle-foot orthosis 1 to which an actuator unit 100D of the present embodiment is attached.

Figure 28:
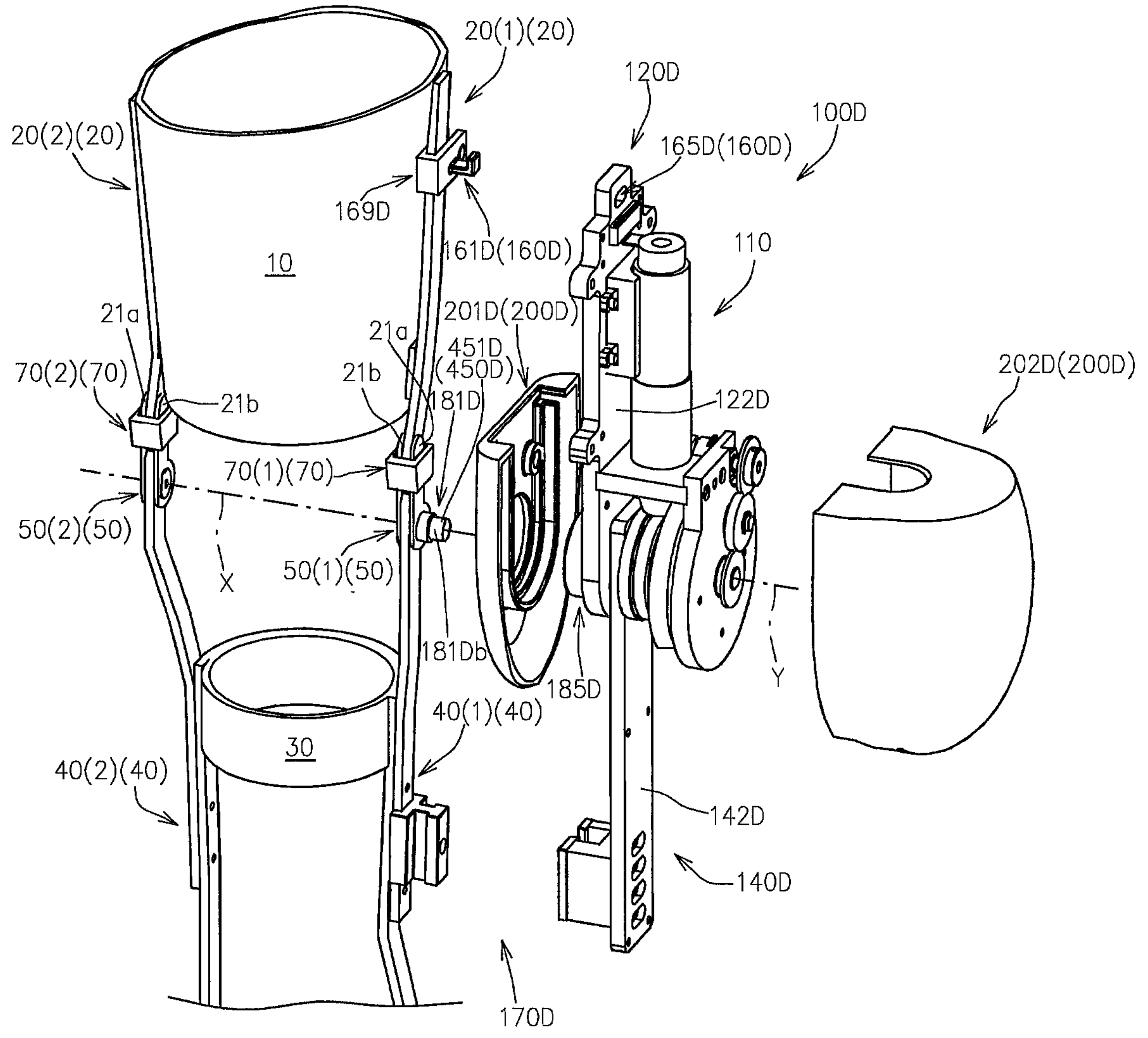
FIG. 28 is a partially exploded perspective view of the knee-ankle-foot orthosis of FIG. 27 as viewed from the outer side in the user width direction.
Figure 29:
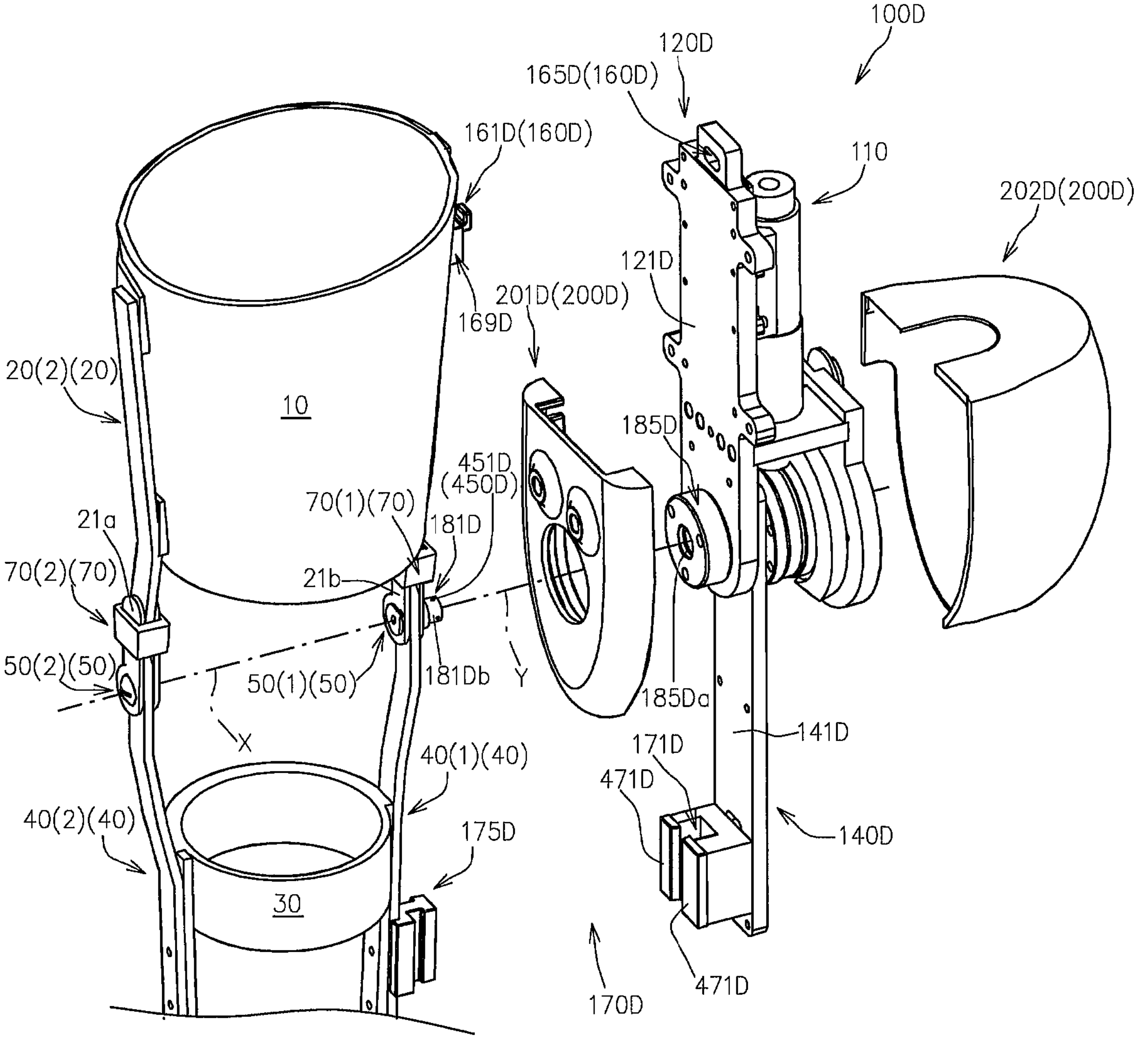
FIG. 29 is a partially exploded perspective view of the knee-ankle-foot orthosis of FIG. 27 as viewed from the inner side in the user width direction.

FIGS. 28 and 29 respectively show partially exploded perspective views of the knee-ankle-foot orthosis of FIG. 27 as viewed from the outer side and the inner side in the user width direction.

Figure 30:
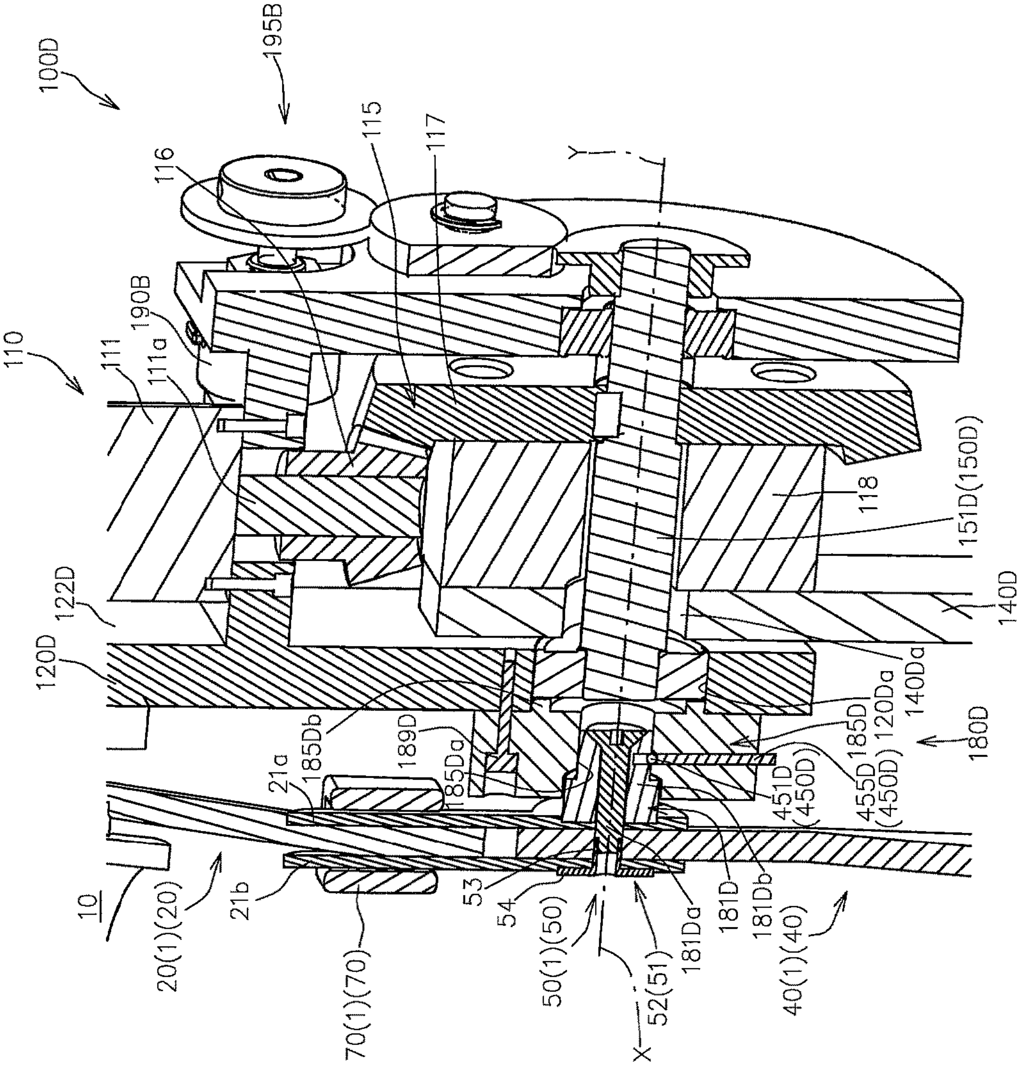
FIG. 30 is a partial vertical cross-sectional front view of XXX part in FIG. 27.

Moreover, FIG. 30 shows a partial vertical cross-sectional front view of the XXX part in FIG. 27.

As shown in FIGS. 27 to 30, the actuator unit 100D includes an upper frame 120D connectable to the first thigh frame 20(1), a lower frame 140D connectable to the first lower leg frame 40(1), an actuator-side rotational connecting part 150D for connecting the upper frame 120D and the lower frame 140D, and a driver 110 for producing driving force for rotating the lower frame 140D.

As shown in FIGS. 28 and 29, the upper frame 120D has an inner surface 121D facing inward in the user width direction and opposed to the first thigh frame 20(1) and an outer surface 122D facing outward in the user width direction.

As shown in FIGS. 28 and 29, the lower frame 140D has an inner surface 141D facing inward in the user width direction and opposed to the first lower let frame 40(1) and an outer surface 142D facing outward in the user width direction.

The actuator-side rotational connecting part 150D connects both frames 120D, 140D such that the lower frame 140D is rotatable around the pivot axis Y relative to the upper frame 120D.

In the present embodiment, as shown in FIG. 30, the actuator side rotational connecting part 150D has an upper frame attachment hole 120Da provided in the lower part of the upper frame 120D, a lower frame attachment hole 140Da provided in the upper part of the lower frame 140D, and a rotational connecting shaft 151D inserted into the upper frame attachment hole 120Da and the lower frame attachment hole 140Da.

The driver 110 has a driving source 111 such as an electric motor, and a transmission mechanism 115 for transmitting driving force produced by the driving source 111 to the lower frame 140.

The driving source 111 is fixed to an outer surface 122 of the upper frame 120.

In the present embodiment, as shown in FIG. 30, the driving source 111 is fixed to the outer surface 122D of the upper frame 120D, with the output shaft 11*a* extending downward.

In the present embodiment, as shown in FIG. 30, the transmission mechanism 115 includes a drive-side bevel gear 116 supported by the output shaft 11*a* so as to be incapable of relative rotation, a driven-side bevel gear 117 meshed with the drive-side bevel gear 116, and a torque limiter 118 for transmitting the rotation of the driven-side bevel gear 117 to the lower frame 140.

In the present embodiment, the driven-side bevel gear 117 is supported by the rotational connecting shaft 151D so as to be incapable of relative rotation, and the actuator unit 100D is provided with a sensor 190B for detecting the angle of axial rotation of the rotational connecting shaft 151D.

Detecting the angle of axial rotation of the rotational connecting shaft 151D by the sensor 190B enables the swinging angle of the lower frame 140D to be recognized.

Reference number 195B in FIG. 30 denotes a gear train for transmitting the rotation of the rotational connecting shaft 151D to the sensor 190B.

As shown in FIGS. 27 to 29, the actuator unit 100D according to the present embodiment further has a cover 200D for surrounding the actuator-side rotational connecting part 150D and the transmission mechanism 115 while permitting the rotation of the lower frame 140D around the pivot axis Y.

As shown in FIGS. 28 and 29, the cover 200D has an inner cover body 201D and an outer cover body 202D that are separable in the user width direction. In FIG. 30, illustration of the cover 200D is omitted.

The actuator unit 100D according to the present embodiment is detachably attached to three locations, i.e., the upper part, vertically intermediate part, and lower part, of the knee-ankle-foot orthosis.

Specifically, as shown in FIGS. 27 to 29, the actuator unit 100D has an upper connecting body 160D for connecting the upper frame 120D to the thigh frame 20, a rotation center connecting body 180D for coaxially connecting the actuator-side rotational connecting part 150D to the brace-side rotational connecting body 50, and a lower connecting body 170D for connecting the lower frame 140D to the lower leg frame 40 such that the lower leg frame 40 is rotated around the swing axis X relative to the thigh frame 20 by utilizing the rotational movement of the lower frame 140D around the pivot axis Y relative to the upper frame 120D.

First, the upper connecting body 160D will now be described.

Figure 31:
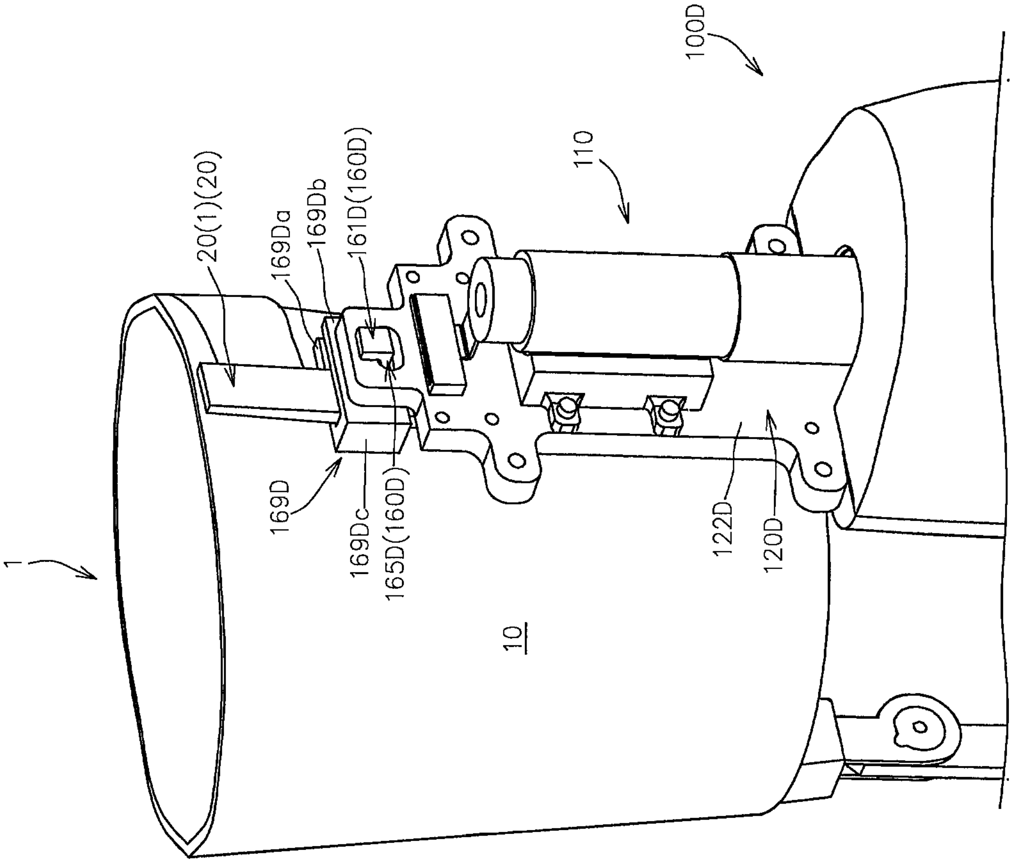
FIG. 31 is a perspective view of XXXI part in FIG. 27.
Figure 32:
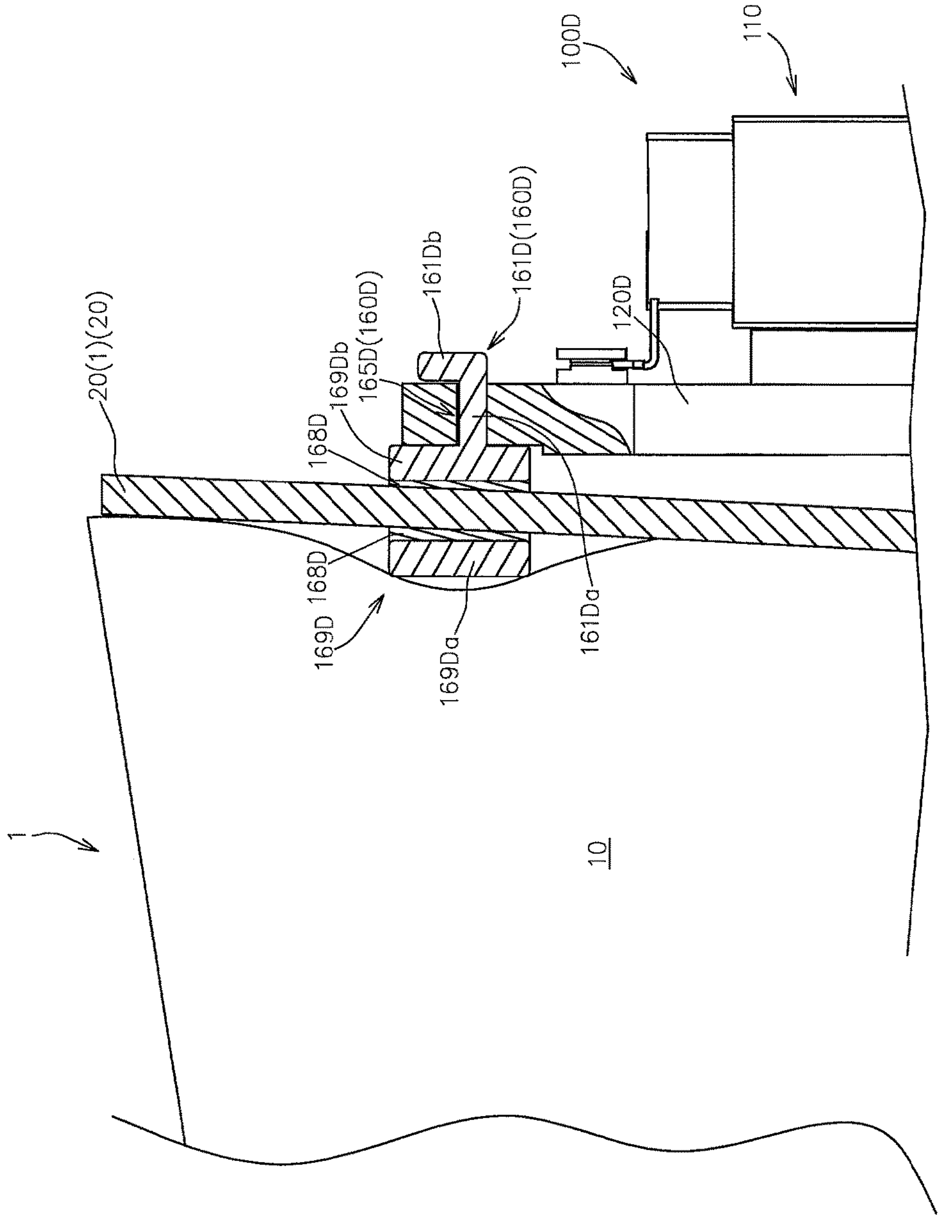
FIG. 32 is a vertical cross-sectional front view of XXXI part in FIG. 27.

FIGS. 31 and 32 respectively show a perspective view and a vertical cross-sectional front view of the XXXI part in FIG. 27.

As shown in FIGS. 27 to 29, 31, and 32, the upper connecting body 160D has a hook 161D provided directly or indirectly on one of the thigh frame 20 and the upper frame 120D and an opening 165D which is provided directly or indirectly on the other of the thigh frame 20 and the upper frame 120D and into which the hook 161D is detachably inserted.

In the present embodiment, the hook 161D is provided on the thigh frame 20, and the opening 165D is provided in the upper frame 120D.

The hook 161D may take various configurations.

In the present embodiment, the upper connecting body 160D has a hook support member 169D detachably attached to one of the thigh frame 20 and the upper frame 120D (the thigh frame 20 in the present embodiment), and the hook 161D is provided on the side surface of the hook support member 169D, which faces the other of the thigh frame 20 and the upper frame 120D.

As shown in FIGS. 31 and 32, in the present embodiment, the hook support member 169D has an inner piece 169Da and an outer piece 169Db opposed to each other and a connecting part 169Dc connecting the first ends of the inner piece 169Da and the outer piece 169Db, the second ends of the inner piece 169Da and the outer piece 169Db are free ends, and thus the hook support member 169D has a U-shape as viewed from above.

The hook support member 169D is detachably attached to one of the thigh frame 20 and the upper frame 120D (the thigh frame 20 in the present embodiment) by connecting the free ends of the inner piece 169Da and the outer piece 169Db to each other with a fastening member such as a bolt (not shown), with said one of the thigh frame 20 and the upper frame 120D (the thigh frame 20 in the present embodiment) being positioned between the inner piece 169Da and the outer piece 169Db.

The hook 161D is provided on the outer surface of the outer piece 169Db of the hook support member 169D having a U-shape as viewed from above.

Preferably, as shown in FIG. 32, the hook 161D has an extending piece 161Da extending directly or indirectly (via the hook support member 169D in the present embodiment as described above) in the user width direction from one of the thigh frame 20 and the upper frame 120D (the thigh frame 20 in the present embodiment) and an engagement piece 161Db extending upward from the free end of the extending piece 161Da, and the hook 161D is configured so as to be prevented from being unintentionally detached from the opening 165D by the engagement of the engagement piece 161Db with a component in which the opening 165D is formed (the upper frame 120D in the present embodiment), with the hook 161D being inserted in the opening 165D.

Preferably, as shown in FIG. 32, an elastic body 168D such as rubber sheet can be interposed either between the outer piece 169Db and the thigh frame 20 or between the inner piece 169Da and the thigh frame 20.

This configuration makes it possible to attach the actuator unit 100D in an appropriate attachment orientation to variously shaped knee-ankle-foot orthoses 1 that are custom-made according to the user's physique.

That is, the knee-ankle-foot orthosis 1 is custom-made according to the user's physique, and thus the tilt angle and/or the curvature of the thigh frame 20 relative to the lower leg frame 40 with respect to the user width direction W (see FIG. 4) is different for each knee-ankle-foot orthosis 1.

In this regard, providing the elastic body 168D makes it possible to attach the actuator unit 100D substantially vertically along the upper frame 120D to various knee-ankle-foot orthoses in which the tilt angle and/or the curvature of the thigh frame 20 relative to the lower leg frame 40 with respect to the user width direction W is different.

Next, the rotation center connecting body 180D will now be described.

The rotation center connecting body 180D is configured so as to coaxially connect the actuator-side rotational connecting part 150D to the first brace-side rotational connecting body 50(1).

The rotation center connecting body 180D has a brace-side rotation center connecting member 181D attached to the knee-ankle-foot orthosis 1 and an actuator-side rotation center connecting member 185D attached to the actuator unit 100D.

The brace-side rotation center connecting member 181D is attached to the knee-ankle-foot orthosis 1 by utilizing a threaded member, which is inserted into the brace-side attachment hole from the inner side in the user width direction, among the internally threaded member 52 and the externally threaded member 55 of the first brace-side rotational connecting body 50(1).

Specifically, as shown in FIG. 30, the brace-side rotation center connecting member 181D is configured so as to have a screw structure 181Da that can be screwed to the screw hole or the external screw of the threaded member, which is inserted in the brace-side attachment hole from the inner side in the user width direction, among the internally threaded member 52 and the externally threaded member 55 on one end side and a brace-side depression/projection engagement part 181Db on the other end side.

As described above, in the present embodiment, the internally threaded member 52 is the threaded member inserted into the brace-side attachment hole from the inner side in the user width direction, and, accordingly, the brace-side rotation center connecting member 181D is attached to the knee-ankle-foot orthosis 1 by utilizing the internally threaded member 52.

That is, in the present embodiment, the screw structure 181Da provided on one end side of the brace-side rotation center connecting member 181D can be screwed to the screw hole of the internally threaded member 52.

The brace-side depression/projection engagement part 181Db provided on the other end side of the brace-side rotation center connecting member 181D has a larger diameter than the brace-side attachment hole, and by removing the externally threaded member 55 of the brace-side rotational connecting body 50 and screwing the screw structure 181Da of the brace-side rotation center connecting member 181D in place of the externally threaded member 55 to the internally threaded member 52 of the brace-side rotational connecting body 50, the thigh frame 20 and the lower leg frame 40 can be connected so as to be capable of swinging around the swing axis X.

As shown in FIGS. 28 to 30, in the present embodiment, the brace-side depression/projection engagement part 181Db on the other end side of the brace-side rotation center connecting member 181D is a projecting engagement part.

The actuator-side rotation center connecting member 185D has an actuator-side depression/projection engagement part 185Da that can be detachably depression/projection-engaged with the brace-side depression/projection engagement part 181Db, and is fixed to the upper frame 120D or the lower frame 140D.

In the present embodiment, as shown in FIG. 30, the actuator-side rotation center connecting member 185D is fixed to the upper frame 120D by a fastening member 189D such as a bolt.

As described above, in the present embodiment, the brace-side depression/projection engagement part 181Db is a projecting engagement part, and, accordingly, the actuator-side depression/projection engagement part 185Da is a depressed engagement part.

In the present embodiment, as shown in FIG. 30, the actuator-side rotation center connecting member 185D has a fitment projection 185Db inserted into the upper frame attachment hole 120Da on the side opposite the brace-side rotation center connecting member 181D, and by inserting the fitment projection 185Db into the upper frame attachment hole 120Da, the actuator-side rotation center connecting member 185D can be positioned concentrically with the actuator-side rotational connecting part 150D in a precise manner.

The brace-side depression/projection engagement part 181Db and the actuator-side depression/projection engagement part 185Da are configured so as to attain a coaxially connected state where the actuator unit 100D is connected to the knee-ankle-foot orthosis 1, with the swing axis X and the pivot axis Y being coaxially positioned, by relatively moving the actuator unit 100D in the user width direction toward the knee-ankle-foot orthosis 1 to mutually depression/projection-engage the actuator unit 100D and the knee-ankle-foot orthosis 1, and cancel the depression/projection engagement from the coaxially connected state by relatively moving the actuator unit 100D away from the knee-ankle-foot orthosis 1 in the user width direction.

According to the rotation center connecting body 180D having this configuration, merely by moving the actuator unit 100D equipped with the actuator-side rotation center connecting member 185D inward in the user width direction relative to the knee-ankle-foot orthosis 1 equipped with the brace-side rotation center connecting member 181, the actuator-side rotation center connecting member 185D can be depression/projection-engaged with the brace-side rotation center connecting member 181D, and, accordingly, the pivot axis Y serving as the rotation center of the lower frame 140D relative to the upper frame 120D can be accurately and stably aligned with the swing axis X serving as the rotation center of the first lower leg frame 40 (1) relative to the first thigh frame 20(1).

In the present embodiment, the rotation center connecting body 180D is provided with a retaining mechanism 450D for preventing the actuator-side rotation center connecting member 185D and the brace-side rotation center connecting member 181D in a connected state from being unintentionally detached.

As shown in FIGS. 28 to 30, the retaining mechanism 450D in the present embodiment has a detent member 451D such as a ball provided on the projecting engagement part of one of the brace-side rotation center connecting member 181D and the actuator-side rotation center connecting member 185D (the brace-side rotation center connecting member 181D in the present embodiment) and an operation member 255D provided on the other of the brace-side rotation center connecting member 181D and the actuator-side rotation center connecting member 185D (the actuator-side rotation center connecting member 185D in the present embodiment), which has a depressed engagement part depression/projection-engaged with the projecting engagement part.

Figure 33:
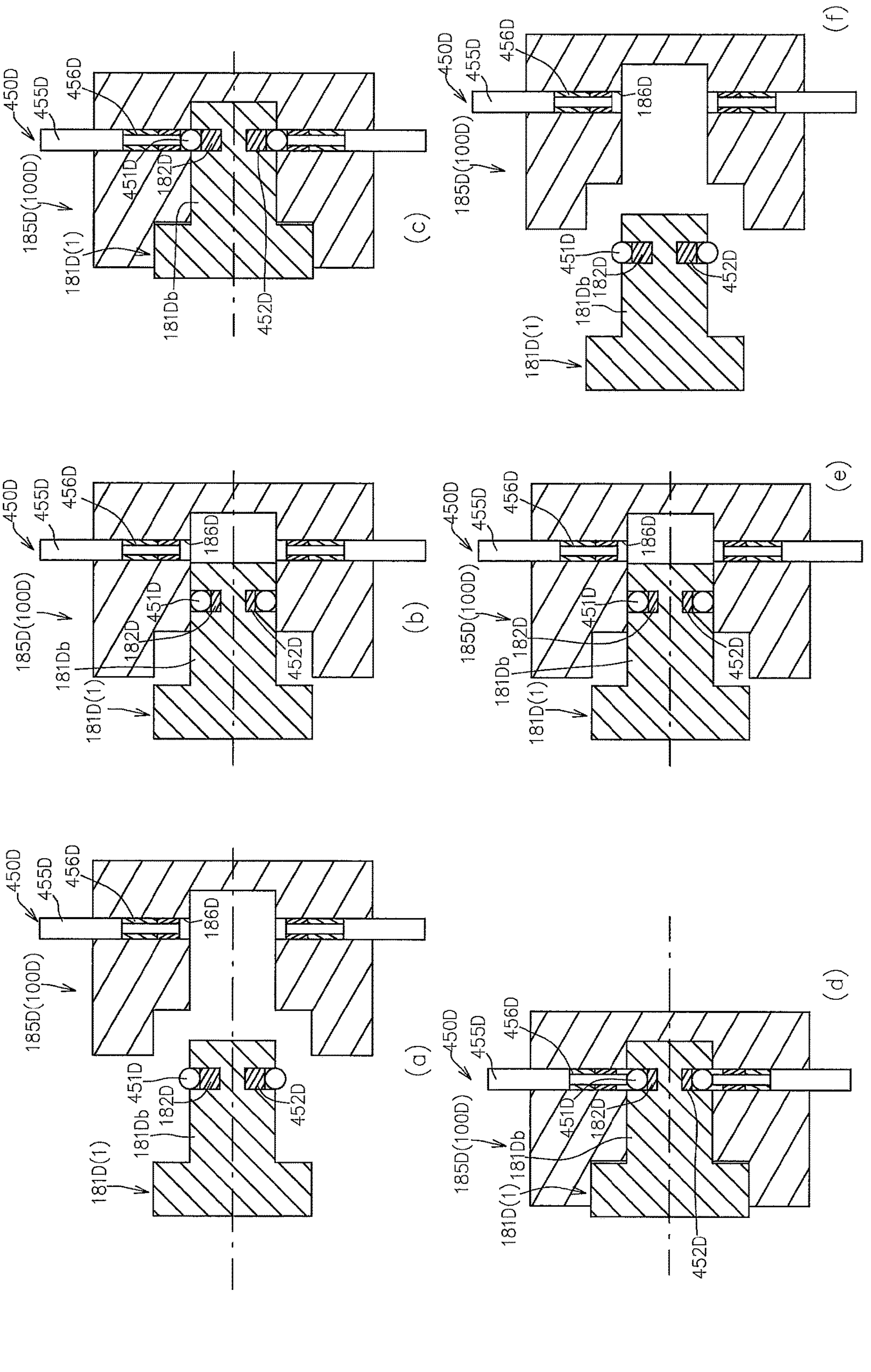
FIGS. 33(*a*) to 33(*f*) are schematic views showing engagement movement and disengagement movement of a brace-side rotation center connecting member and an actuator-side rotation center connecting member in the actuator unit according to the third embodiment.

FIGS. 33(*a*) to (*f*) show schematic views of the brace-side rotation center connecting member 181D and the actuator-side rotation center connecting member 185D.

As shown in FIGS. 33(*a*) to (*f*), the projecting engagement part (the brace-side depression/projection engagement part 181Db in the present embodiment) has an accommodation depression 182D open to the outer surface, and the detent member 451D is accommodated in the accommodation depression so as to be capable of reaching a projecting position where the detent member 451D projects outward from the outer surface of the projecting engagement part and a retreated position where the detent member 451D is disposed within the accommodation depression so as not to project from the outer surface.

A detent biasing member 452D such as a spring for biasing the detent member 451D toward the projecting position is disposed in the accommodation depression 182D, and in an initial state where no external force is exerted on the detent member 451D, the detent member 451D is positioned in the projecting position (the position depicted in FIG. 33(*a*)) by the detent biasing member 452D.

The component having the depressed engagement part (the actuator-side rotation center connecting member 185D in the present embodiment) has a communication hole 186D, the inner end part of which is open to the inner circumferential surface of the depressed engagement part and the outer end part of which is open to the outer surface of the component having the depressed engagement part.

The inner end part of the communication hole 186D is open to the inner circumferential surface of the depressed engagement part in a position facing the accommodation depression 182D when the actuator-side rotation center connecting member 185D is positioned in a predetermined depression/projection engagement position (the position depicted in FIGS. 33(*c*) and (*d*)) with respect to a relative position in the user width direction relative to the brace-side rotation center connecting member 181D.

The operation member 455D is accommodated in the communication hole 186D so as to be axially movable, and is configured so as to be capable of reaching a detent depression forming position (the position depicted in FIGS. 33(*a*) to (*c*)) where the detent member 451D positioned in the projecting position can be inserted into the inner end part of the communication hole 186D and a pressing position (the position depicted in FIG. 33(*d*)) where the detent member 451D positioned in the projecting position is pressed from the projecting position to the retreated position.

Specifically, the operation member 455D is biased toward the detent depression forming position by an operation biasing member 456D, and is positioned in the detent depression forming position in the initial state where no external operational force is exerted.

The retaining mechanism 450D having this configuration operates in the following manner.

As shown in FIG. 33(*a*), when the brace-side rotation center connecting member 181D attached to the knee-ankle-foot orthosis 1 and the actuator-side rotation center connecting member 185 attached to the actuator unit 100D are spaced apart, the detent member 451D is positioned in the projecting position by the biasing force of the detent biasing member 452D, and the operation member 455D is positioned in the retreated position by the biasing force of the operation biasing member 456D.

From this state, when the actuator unit 100D is brought close to the knee-ankle-foot orthosis 1 in the user width direction to cause the actuator-side rotation center connecting member 185D to be depression/projection-engaged with the brace-side rotation center connecting member 181D, the detent member 451D is pressed in by the inner circumferential surface of the depressed engagement part and positioned in the retreated position while compressing the detent biasing member 452D as shown in FIG. 33(*b*).

Subsequently, by bringing the actuator unit 100D close to the knee-ankle-foot orthosis 1 in the user width direction to position the actuator-side rotation center connecting member 185D in a predetermined depression/projection engagement position with respect to a relative position in the user width direction relative to the brace-side rotation center connecting member 181D, the detent member 451D is pressed to the projecting position by the biasing force of the detent biasing member 452D and inserted into the detent depression as shown in FIG. 33(*c*).

Accordingly, the actuator-side rotation center connecting member 185D is prevented from being unintentionally disengaged from the brace-side rotation center connecting member 181D.

When separating the actuator-side rotation center connecting member 185D from the brace-side rotation center connecting member 181D (i.e., when detaching the actuator unit 100D from the knee-ankle-foot orthosis 1) in the state where the actuator-side rotation center connecting member 185D is positioned in a predetermined depression/projection engagement position with respect to a relative position in the user width direction relative to the brace-side rotation center connecting member 181D and the detent member 451D is inserted in the detent depression (FIG. 33(*c*)), first, the operation member 455D is positioned in the pressed position against the biasing force of the operation biasing member 456D and the detent biasing member 182D by external operational force to position the detent member 451D in the retreated position (FIG. 33(*d*)).

In this state, the actuator-side rotation center connecting member 185D is relatively moved outward in the user width direction relative to the brace-side rotation center connecting member 181D (FIG. 33(*e*)).

In the state depicted by FIG. 33(*e*), the actuator-side rotation center connecting member 185D can be spaced apart from the brace-side rotation center connecting member 181D even when the external operational force exerted on the operation member 455D is removed.

When the external operational force exerted on the operation member 455D is removed, the operation member 455D is brought back to the detent depression forming position by the biasing force of the operation biasing member 456D.

Subsequently, by relatively moving the actuator-side rotation center connecting member 185D outward in the user width direction relative to the brace-side rotation center connecting member 181D, the depression/projection engagement of the actuator-side rotation center connecting member 185D and the brace-side rotation center connecting member 181D is completely cancelled, and the actuator unit 100D can be completely detached from the knee-ankle-foot orthosis 1 (FIG. 33(*f*)).

When the depression/projection engagement of the actuator-side rotation center connecting member 185D and the brace-side rotation center connecting member 181D is completely cancelled, the detent member 451D is brought back to the projecting position (the position depicted in FIG. 33(*f*)) by the biasing force of the detent biasing member 452D.

Next, the lower connecting body 170D will now be described.

The lower connecting body 170D has a lower engagement groove 171D directly or indirectly provided in one of the lower frame 140D and the lower leg frame 40.

In the present embodiment, as shown in, for example, FIGS. 28 and 29, the lower engagement groove 171D is provided in the lower frame 140D.

The lower engagement groove 171D is open toward the other of the lower frame 140D and the lower leg frame 40 (the lower leg frame 40 in the present embodiment) and extends in the longitudinal direction of said one of the frames (the lower frame 140D in the present embodiment), and is configured so as to be directly or indirectly depression/projection-engaged with the other frame by relatively moving the actuator unit 100D toward the knee-ankle-foot orthosis 1 in the user width direction.

Due to the direct or indirect depression/projection engagement of the lower engagement groove 171D with the other frame, an interlocking state is attained where the lower leg frame 40 is rotated around the swing axis X relative to the thigh frame 20 in conjunction with the rotational movement of the lower frame 140D around the pivot axis Y relative to the upper frame 120D, with the lower frame 140D being relatively movable relative to the lower leg frame 40 in the longitudinal direction of the frame and outward in the user width direction, and from the interconnecting state, the depression/projection engagement is cancelled by relatively moving the actuator unit 100D away from the knee-ankle-foot orthosis 1 in the user width direction.

This configuration makes it possible to attach the actuator unit 100D to the knee-ankle-foot orthosis 1 without excessively increasing the dimensional accuracy of the knee-ankle-foot orthosis 1 and/or the actuator unit 100D.

Figure 34:
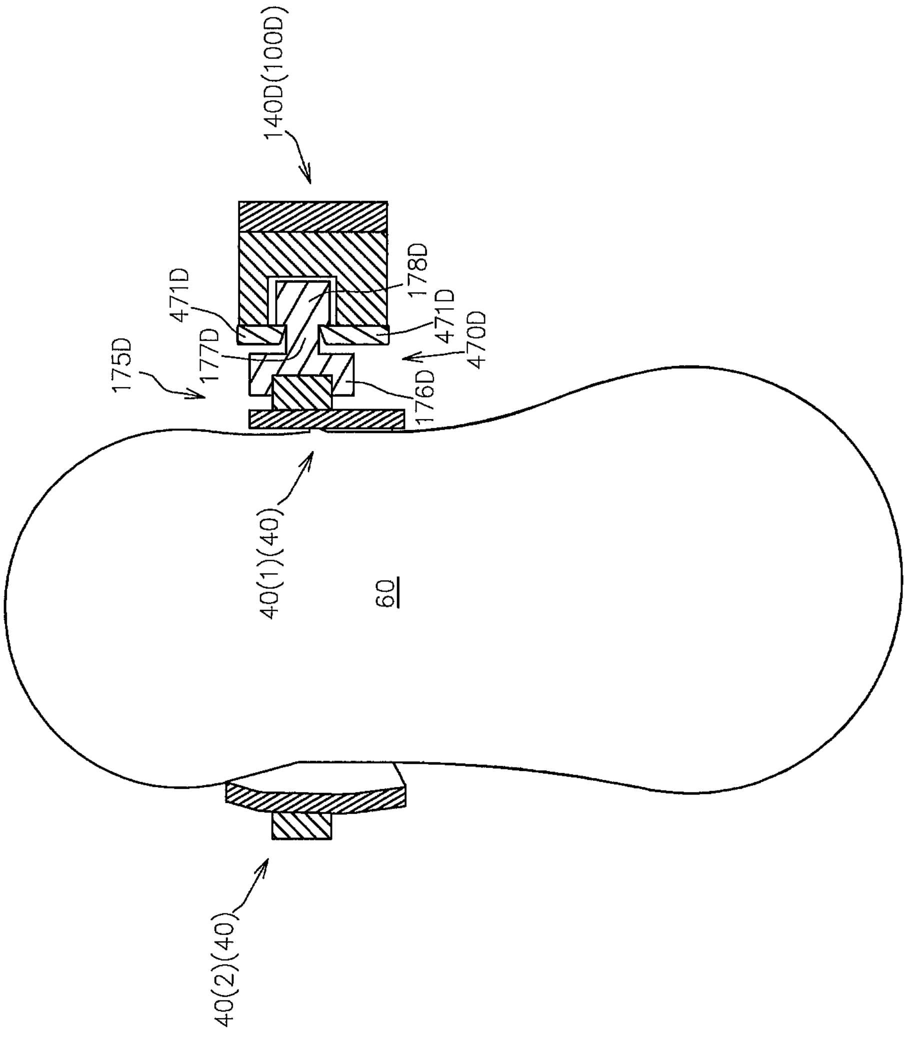
FIG. 34 is a transverse cross-sectional plan view taken along line XXXIV-XXXIV in FIG. 27.

FIG. 34 shows a transverse cross-sectional plan view taken along the line XXXIV-XXXIV in FIG. 27.

Figure 35:
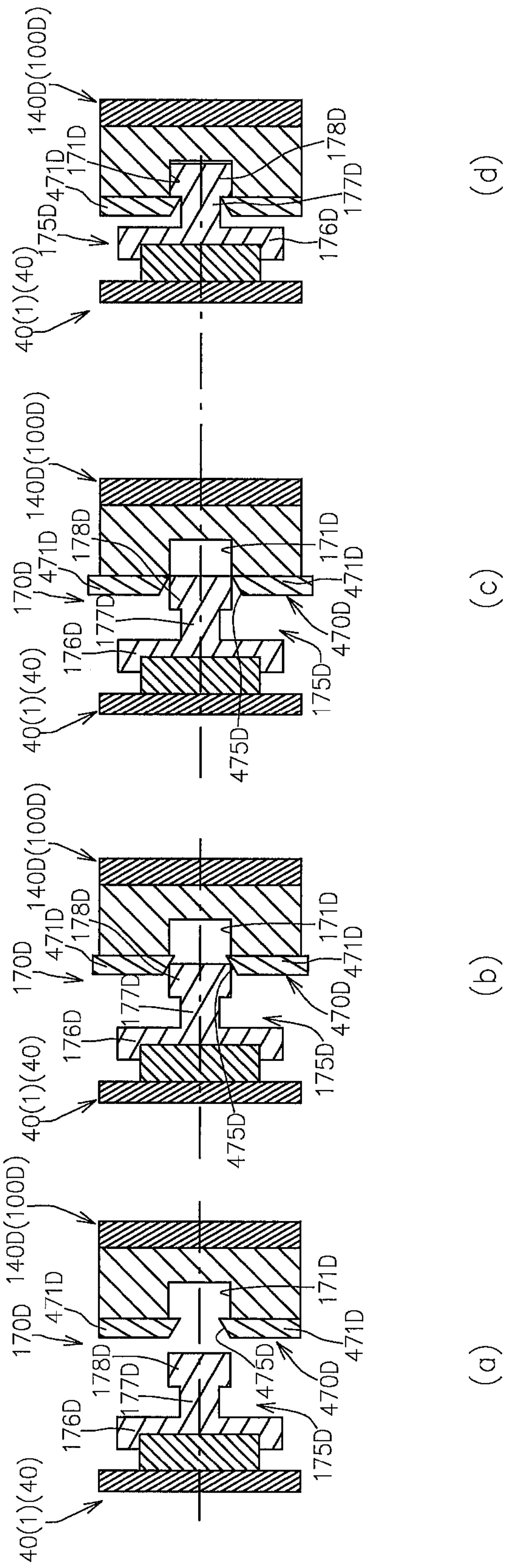
FIGS. 35(*a*) to 35(*d*) are schematic views showing engagement movement of an lower connecting body in the actuator unit according to the third embodiment.

FIGS. 35(*a*) to (*d*) show schematic plan views of the lower connecting body 170D.

In the present embodiment, the lower connecting body 170D has a lower projecting member 175D that is fixed to the other of the lower frame 140D and the lower leg frame 40 (the lower leg frame 40 in the present embodiment) and that is capable of depression/projection engagement with the lower engagement groove 171D, and a retaining mechanism 470D for preventing the lower projecting member 175D from being unintentionally detached from the lower engagement groove 171D.

As shown in FIGS. 28, 29, 34, and 35, the lower projecting member 175D has a proximal end part 176D fixed to the other of the lower frame 140D and the lower leg frame 40, an extending part 177D extending in the user width direction from the proximal end part 176D and having a narrower width than the opening width of the lower engagement groove 171D, and a wide head part 178D including a step and enlarged from the free end of the extending part 177D in the width direction of the lower engagement groove 171D to a size that enables insertion into the lower engagement groove 171D.

The retaining mechanism 470D has shutter members 471D provided on one of the lower frame 140D and the lower leg frame 40 so as to be capable of changing the position, and retaining biasing members (not shown) for biasing the shutter members 471D.

The shutter members 471D are provided on one of the lower frame 140D and the lower leg frame 40 so as to be slidable in the width direction of the lower engagement groove 171D such that the shutter members 471D can reach a retaining position (the position depicted in FIG. 35(*d*)) in which the shutter members 471D partially cover the lower engagement groove 171D so as to be engaged with the step, with the wide head part 178D being inserted in the lower engagement groove 171D, and a retreated position (the position depicted in FIG. 35(*c*)) in which the lower engagement groove 171D is open such that the wide head part 178D is capable of advancing and retreating relative to the lower engagement groove 171D, and the retaining biasing members bias the shutter members 471D toward the retaining position.

This configuration makes it possible to effectively prevent the lower frame 140D from being unintentionally detached from the lower leg frame 40 while effectively reaching the interlocking state of the lower frame 140D and the lower leg frame 40.

Preferably, cam surfaces 475D that convert the relative movement of the lower frame 140D toward the lower leg frame 40 in the user width direction into force for pressing the shutter members 471D from the retaining position toward the retreated position against the biasing force of the retaining biasing member can be provided on at least one of the contact portions of the wide head part 178D and the shutter members 471D brought into contact with each other when bringing the lower frame 140D spaced apart from the lower leg frame 40 close to the lower leg frame 40 in the user width direction.

In the present embodiment, as shown in FIGS. 34 and 35, the cam surfaces 475D are provided on the contact portion of the shutter members 471D.

The retaining mechanism 470D operates in the following manner.

In the state where the lower frame 140D is apart from the lower leg frame 40, the shutter members 471D are positioned in the retaining position by the biasing force of the retaining biasing members (FIG. 35(*a*)).

When the lower frame 140D is brought close to the lower leg frame 40 in the user width direction from the state shown in FIG. 35(*a*), the contact portions of the shutter members 471D and the contact portions of the wide head part 178D come into contact with each other, and the shutter members 471D are pressed from the retaining position to the retreated position due to the action of the cam surfaces 475D (FIGS. 35(*b*) and (*c*)).

Then, when the wide head part 178D completely enters the lower engagement groove 171D, the shutter members 471D are disengaged from the wide head part 178D, moved from the retreated position to the retaining position by the biasing force of the retaining biasing members, and engaged with the step to prevent detachment of the lower projecting member 175D from the lower engagement groove 171D (FIG. 35(*d*)).

In the present embodiment, the lower engagement groove 171D is formed in a lower depressed member 173D fixed to the lower frame 140D, and the retaining mechanism 470D is provided on the lower depressed member 173D.

The actuator unit 100D having this configuration can be easily attached to the knee-ankle-foot orthosis 1 by being relatively moved inward in the user width direction relative to the knee-ankle-foot orthosis.

Figure 36:
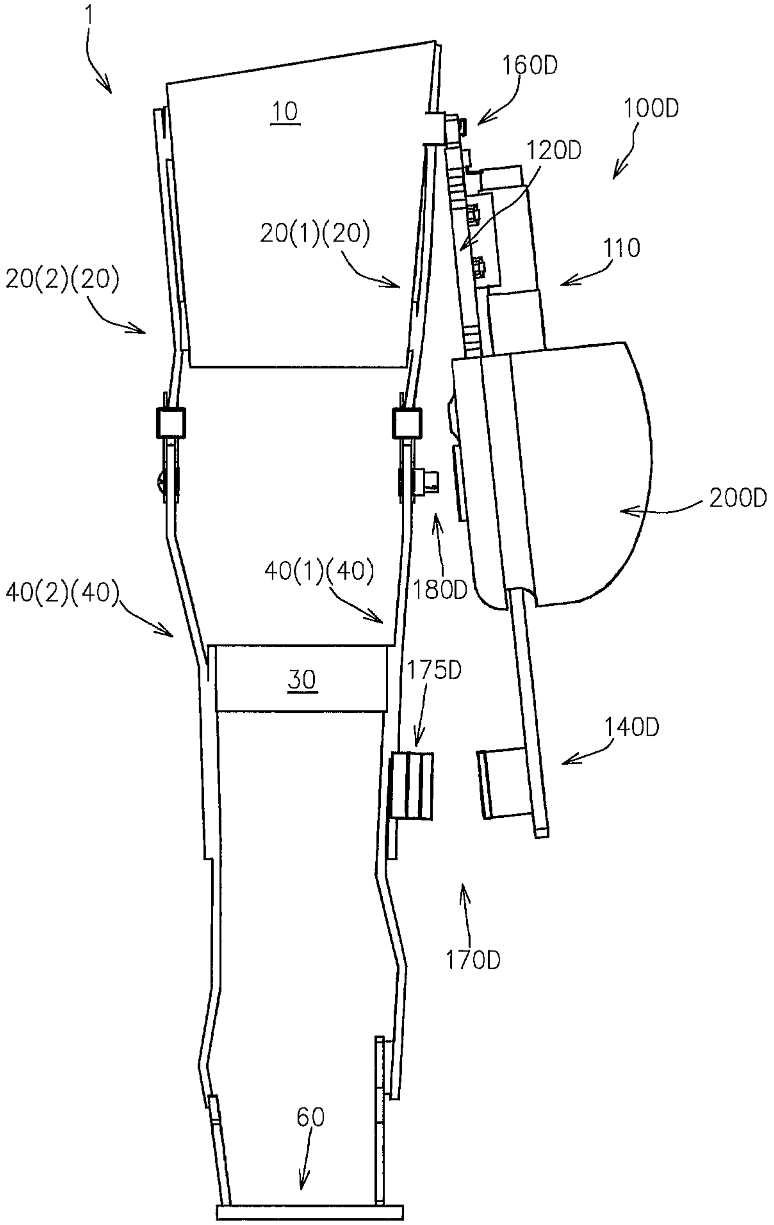
FIG. 36 is a front view showing a halfway state where the actuator unit according to the third embodiment is being attached to the knee-ankle-foot orthosis.

In particular, in the present embodiment, the upper connecting body 160D has the hook 161D and the opening 165D, thus, by inserting the hook 161D into the opening 165D, the actuator unit 100D is engaged with the knee-ankle-foot orthosis 1 in a suspended state (see FIG. 36), and by swinging the actuator unit 100D toward the knee-ankle-foot orthosis 1 by using the upper connecting body 160D as a fulcrum from the suspended state, the actuator unit 100D can be brought close to the knee-ankle-foot orthosis 1 in the user width direction. Thus, the actuator unit 100D can be easily connected to the knee-ankle-foot orthosis 1 by the rotation center connection body 180D and the lower connecting body 170D.

Also, according to the actuator unit 100D of the present embodiment, when detaching the actuator unit 100D attached to the knee-ankle-foot orthosis 1 from the knee-ankle-foot orthosis 1 as well, first, the connection of the rotation center connecting body 180D and the lower connecting body 170D can be cancelled while maintaining the upper connecting body 160D in the connected state (i.e., the state where the hook 161D is inserted in the opening 165D and thus the actuator unit 100D is engaged with the knee-ankle-foot orthosis 1 in a suspended state), and, thereafter, the connection of the upper connecting body 160D can be cancelled.

Moreover, in the present embodiment, the rotation center connecting body 180D is provided with the retaining mechanism 450D, and the lower connecting body 170D is provided with the retaining mechanism 470D. Accordingly, the actuator unit 100D can be effectively prevented from being unintentionally detached from the knee-ankle-foot orthosis 1.

It is possible to omit one of the retaining mechanism 450D of the rotation center connecting body 180D and the retaining mechanism 270D of the lower connecting body 170D.

In the present embodiment, the upper connecting body 160D has the hook 161D and the opening 165D as described above, but the present invention is not limited to such an embodiment.

Figure 37:
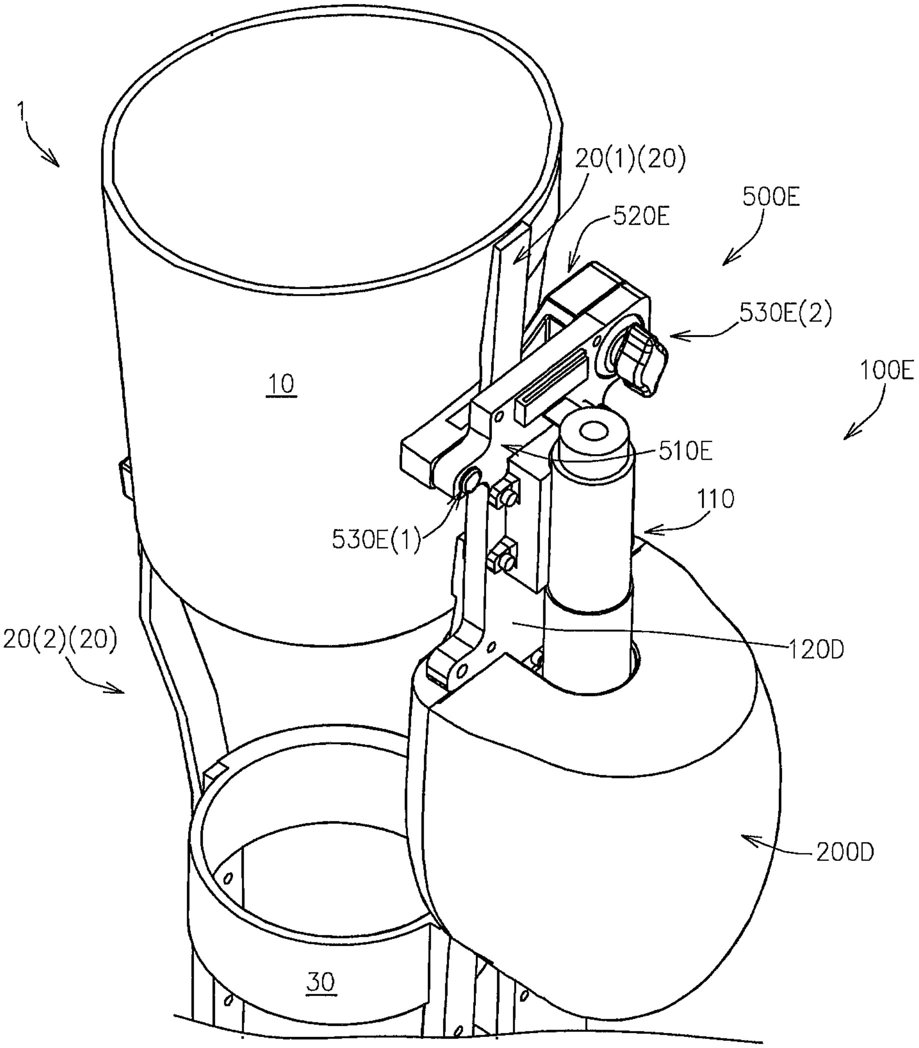
FIG. 37 is an upper perspective view in which an actuator unit according to a modification of the third embodiment is attached to the knee-ankle-foot orthosis.

FIG. 37 shows a partial perspective view in which an actuator unit 100E provided with an upper connecting body 500E in place of the upper connecting body 160D is attached to the knee-ankle-foot orthosis 1.

The upper connecting body 500E of the actuator unit 100E shown in FIG. 37 has an actuator-side plate 510E fixed to the upper frame 120D, a fastening plate 520E disposed so as to be opposed to the actuator-side plate 510E with the thigh frame 20 in-between, and a fastening member 530E for fastening the actuator-side plate 510E and the fastening plate 520E such that the thigh frame 20 is bound by the actuator-side plate 510E and the fastening plate 520E.

In the example shown in FIG. 37, the actuator-side plate 510E is integrally formed with the upper plate 120D, but, naturally, the actuator-side plate 510E can be formed as a component separate from the upper plate 120D and fixed thereto by a bolt or the like.

The fastening member 530E has first and second fastening members 530E(1), 530E(2) respectively positioned on one side and the other side of the thigh frame 20 in the user front-back direction.

The first and second fastening members 530E(1), 530E(2) can have various configurations.

In the example shown in FIG. 37, the first fastening member 530E(1) has a bolt.

In this case, the first fastening member 530E(1) in the state of being inserted in a through hole formed in the actuator-side plate 510E is screwed in to a threaded hole formed in the fastening plate 520E or screwed into a nut through a through hole formed in the fastening plate 520E, thus fastens the actuator-side plate 510E and the fastening plate 520E to each other, with the thigh frame 20 in-between.

Figure 38:
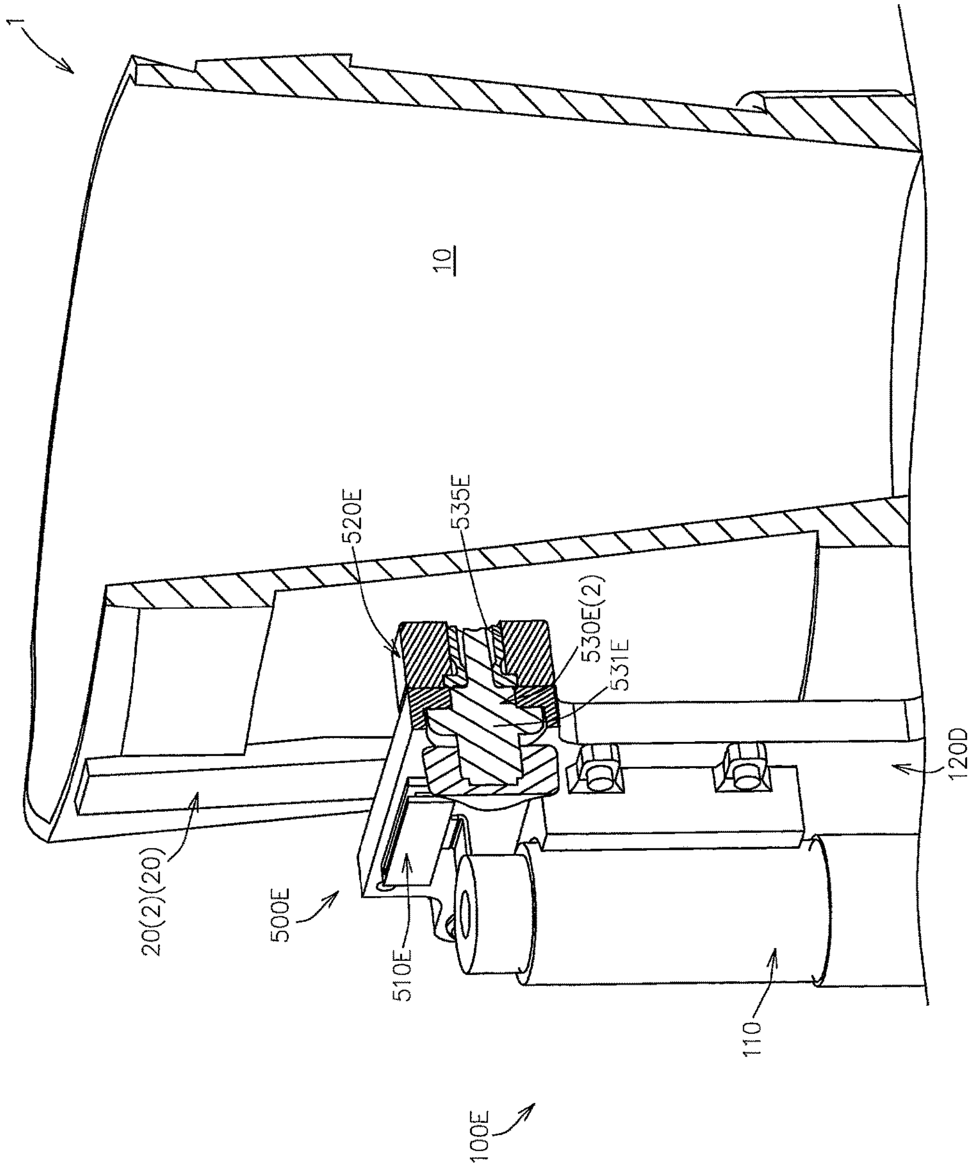
FIG. 38 is a vertical cross-sectional view of FIG. 37.

FIG. 38 shows a vertical cross-sectional view of the second fastening member 530E(2).

In the example shown in FIGS. 37 and 38, the second fastening member 530E(2) has an engagement hole 535E provided in the fastening plate 520E, an engagement projection 531E that is provided on the actuator-side plate 510E and that can be depression/projection-engaged with the engagement hole 521E.

Preferably, the second fastening member 530E(2) can be provided with a retaining function.

For example, the engagement projection 531E can be configured so as to be axially rotatable while being depression/projection-engaged with the engagement hole 535E, and so as to be capable of axially reaching a locked position in which the engagement projection 531E cannot be detached from the engagement hole 535E and a cancelled position in which the engagement projection 531E can be detached from the engagement hole 535E.

The actuator unit 100E having this configuration can be easily attached to the knee-ankle-foot orthosis 1 by substantially simultaneously performing the fastening of the first and second fastening members 530E(1), 530E(2) of the upper connecting body 500E, the depression/projection engagement of the rotation center connecting body 180D, and the depression/projection engagement of the lower connecting body 170D, and then performing the operation of the engagement projection 531E of the second fastening member 530E(2) to the locked position, and, in the case where the rotation center connecting body 180D and/or the lower connecting body 170D are provided with the retention mechanisms 450D, 470D, the retaining operation of the corresponding retaining mechanisms 450D, 470D.

Fourth Embodiment

Below, another embodiment of the actuator unit for a knee-ankle-foot orthosis according to the present invention will now be described with reference to the attached drawings.

Figure 39:
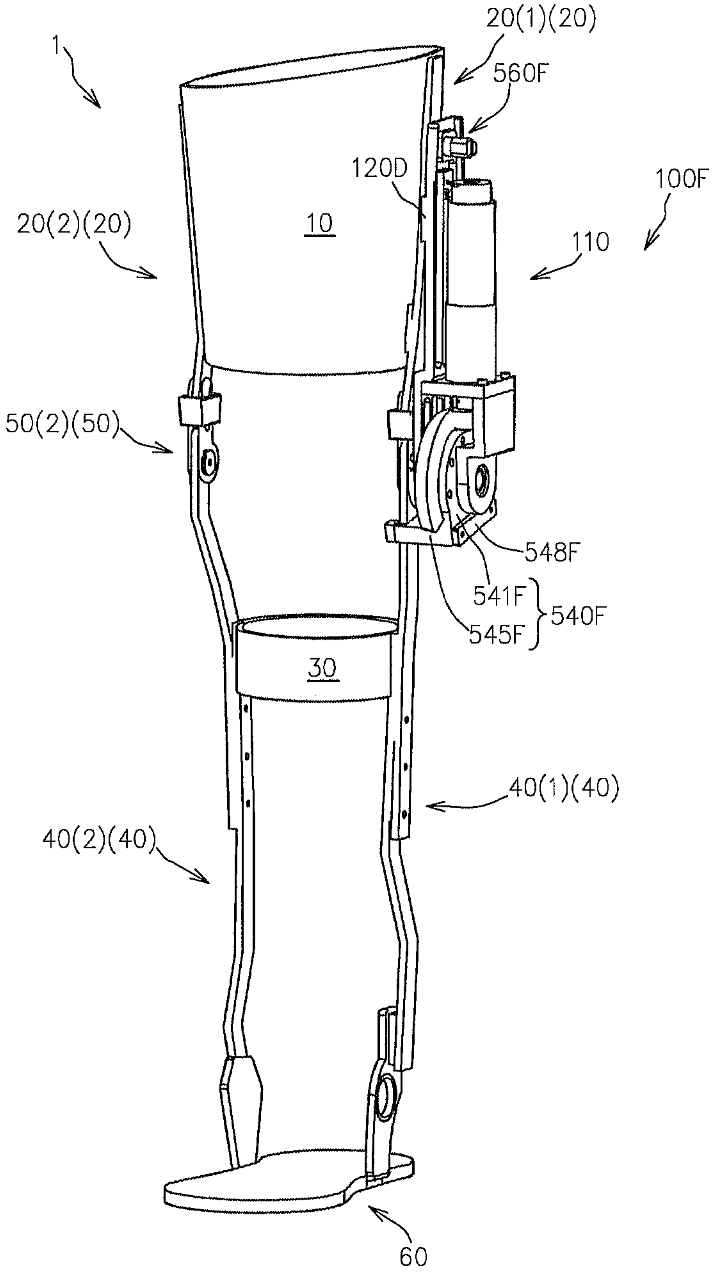
FIG. 39 is a perspective view of the knee-ankle-foot orthosis to which an actuator unit according to a fourth embodiment of the present invention is attached.

FIG. 39 shows a perspective view of a knee-ankle-foot orthosis 1 to which an actuator unit 100F of the present embodiment is attached.

Figure 40:
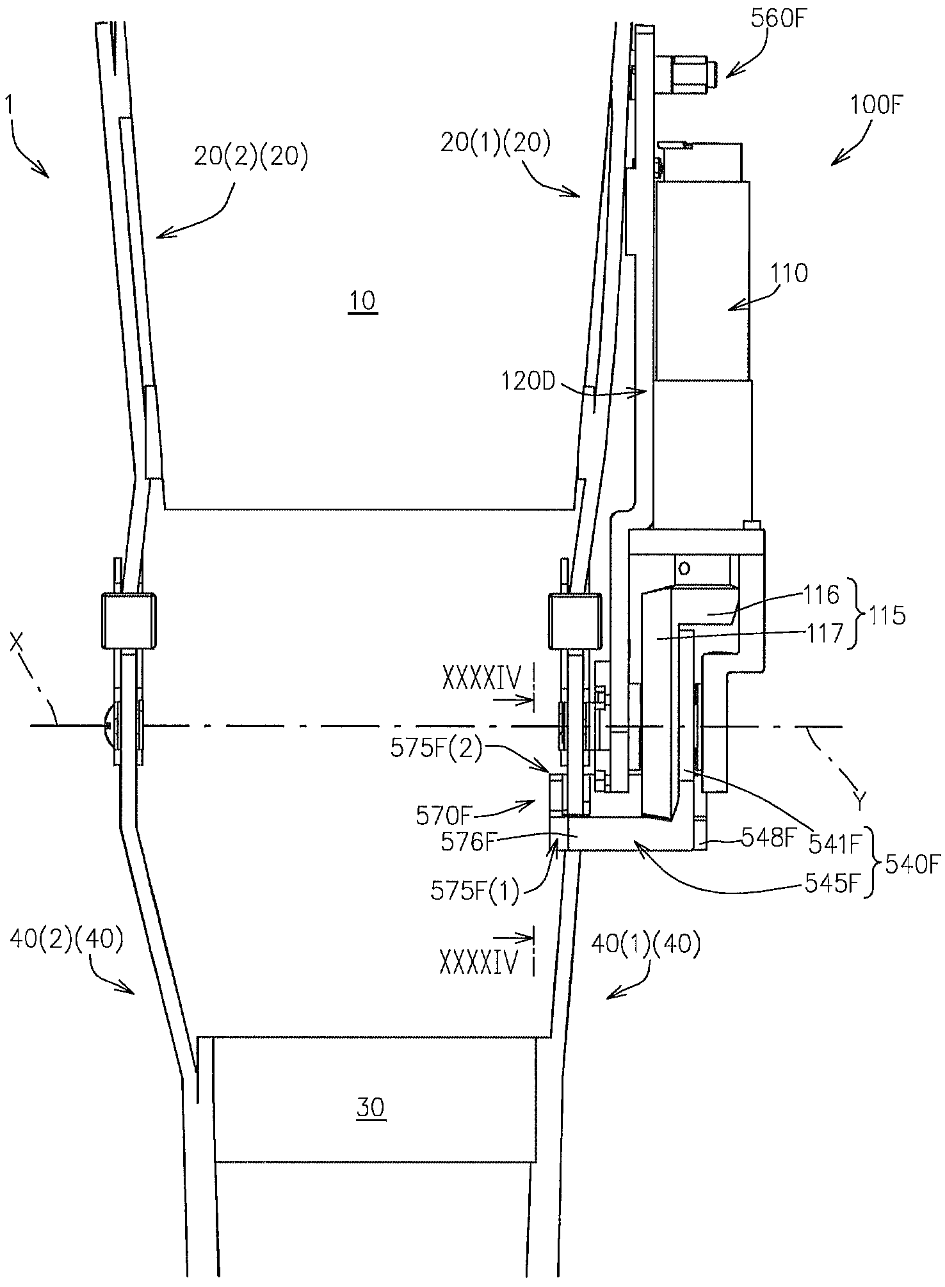
FIG. 40 is a partial front view of the knee-ankle-foot orthosis in the vicinity of the actuator unit shown in FIG. 39.

FIG. 40 shows a partial front view of the knee-ankle-foot orthosis 1 in the vicinity of the actuator unit 100F.

Figure 41:
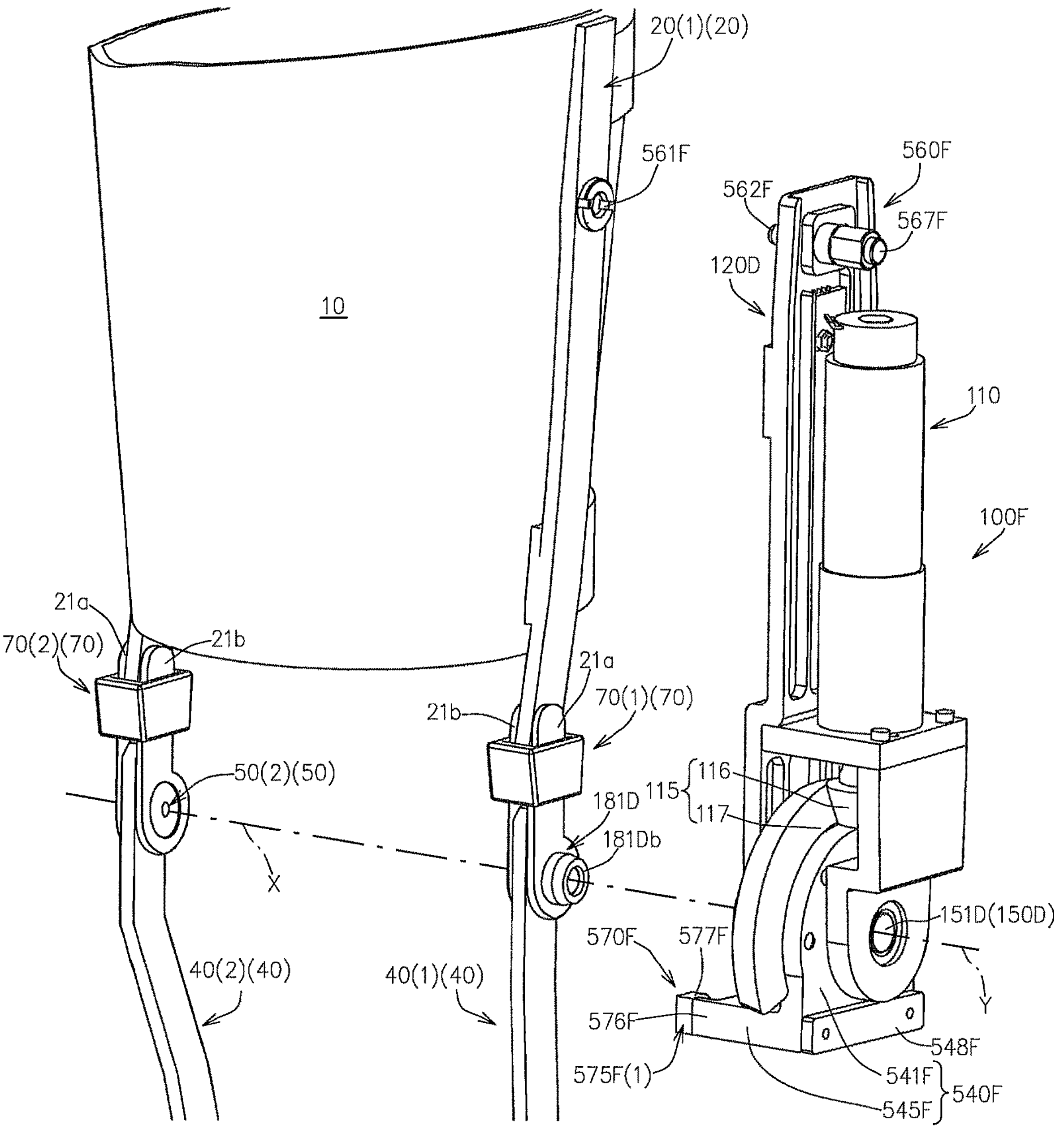
FIG. 41 is a partially exploded perspective view of the knee-ankle-foot orthosis of FIG. 39 as viewed from the outer side in the user width direction.
Figure 42:
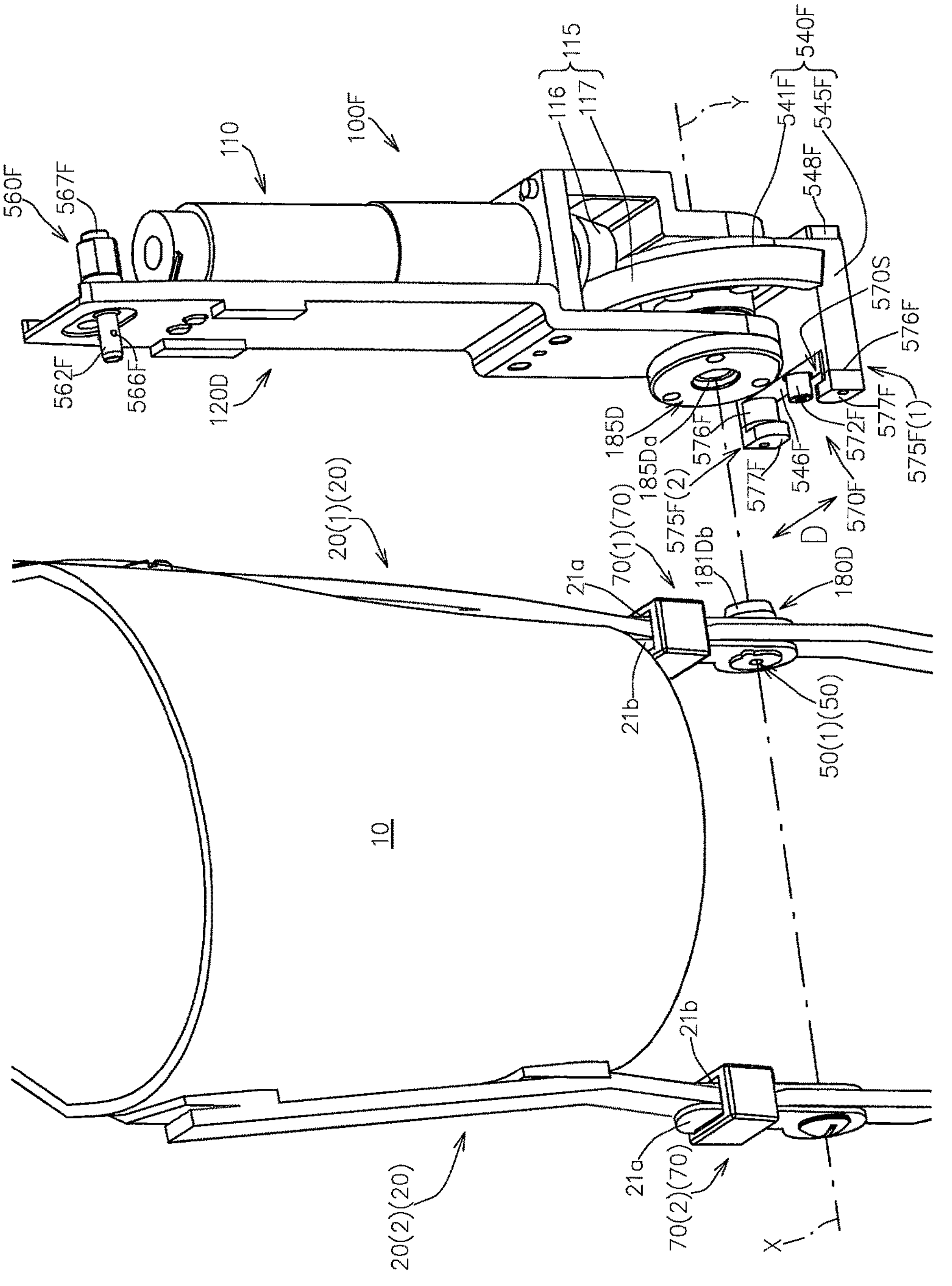
FIG. 42 is a partially exploded perspective view of the knee-ankle-foot orthosis of FIG. 39 as viewed from the inner side in the user width direction.

FIGS. 41 and 42 respectively show partially exploded perspective views of the knee-ankle-foot orthosis of FIG. 39 as viewed from the outer side and the inner side in the user width direction.

Figure 43:
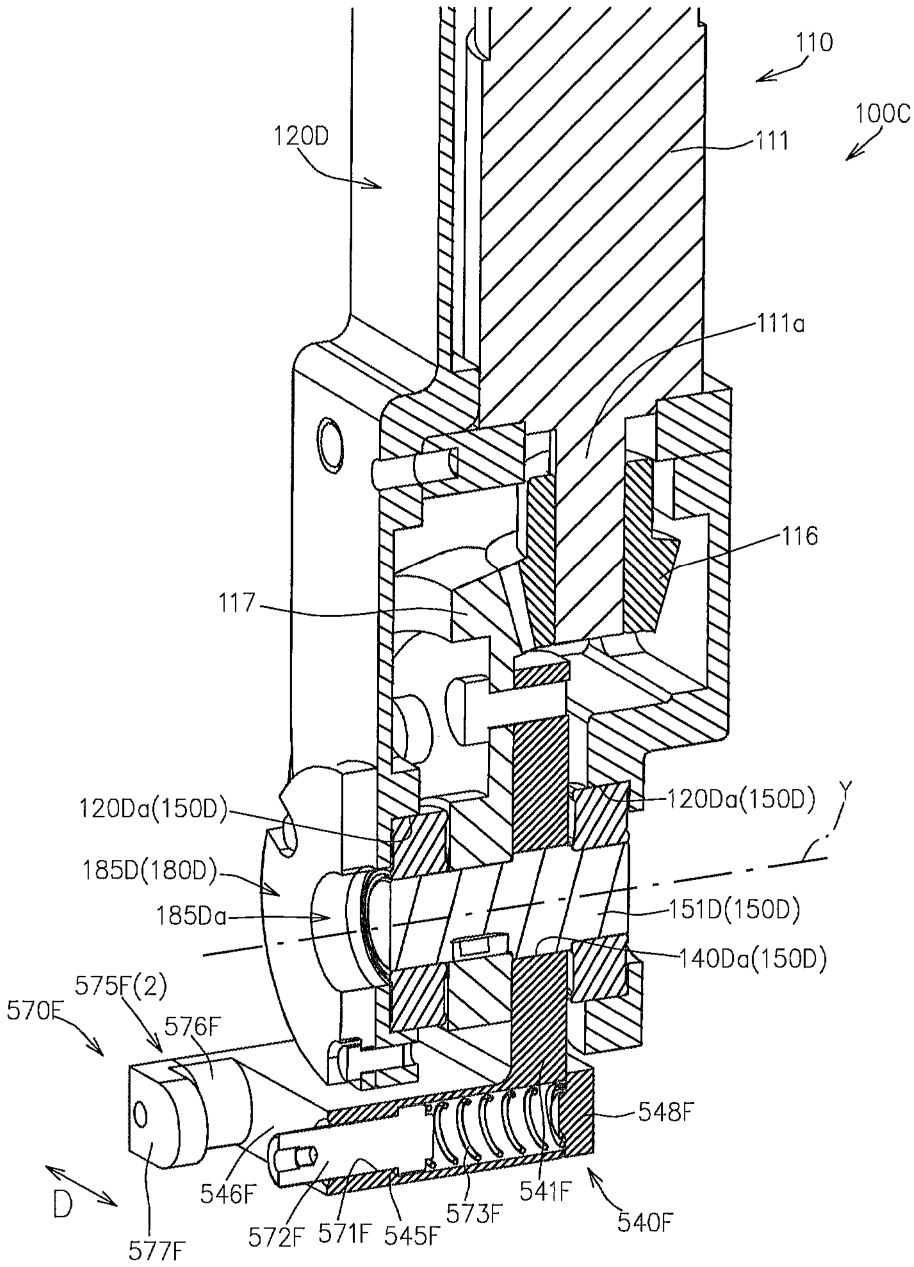
FIG. 43 is a vertical cross-sectional perspective view of the actuator unit according to the fourth embodiment.

Moreover, FIG. 43 shows a vertical cross-sectional perspective view of the actuator unit 100F.

In the drawings, substantially the same components as those in the third embodiment are given the same reference numbers, and descriptions thereof are omitted as appropriate.

The actuator unit 100F according to the present embodiment is different from the actuator unit 100D according to the third embodiment in having a lower frame 540F in place of the lower frame 140D, having an upper connecting body 560F in place of the upper connecting body 160D, and having a lower connecting body 570F in place of the lower connecting body 170D.

Specifically, as shown in FIGS. 39 to 43, the actuator unit 100F has the upper frame 120D, the lower frame 540F connectable to the first lower leg frame 40(1), the actuator-side rotational connecting part 150D, the driver 110, the upper connecting body 560F for connecting the upper frame 120D to the thigh frame 20, the rotation center connecting body 180D, and a lower connecting body 570F for connecting the lower frame 540F to the lower leg frame 40 such that the lower leg frame 40 is rotated around the swing axis X relative to the thigh frame 20 by utilizing the rotational movement of the lower frame 540F around the pivot axis Y relative to the upper frame 120D.

Although not shown in FIGS. 39 to 43, the actuator unit 100F may have the cover 200D as in the third embodiment.

As shown in FIGS. 41 and 42, the upper connecting body 560F has an engagement hole 561F provided in the thigh frame 20 so as to be parallel to the pivot axis Y and open toward the upper frame 120D, and an engagement pin 562F provided on the upper frame 120D so as to be engageable with the engagement hole 561F.

Preferably, the upper connecting body 560F has a locking mechanism.

The locking mechanism may have a projection 566F capable of radially advancing and retreating from the outer surface of the engagement pin 562F and capable of reaching an engagement position where the projection projects radially outward from the outer surface of the engagement pin 562F and a cancelling position where the projection is retreated in the engagement pin 562F, a biasing member (not shown) for biasing the projection 566F toward the engagement position, a depression (not shown) provided in the engagement hole such that the engagement pin 562F inserted in the engagement hole 561F is engaged with the projection 566F, and a cancellation operation part 567F for pressing the projection to a cancellation position against the biasing force of the biasing member in response to manual operation from outside.

As shown in FIGS. 40 to 43, the lower frame 540F has a proximal end part 541F connected to the upper frame 120D via the actuator-side rotational connecting part 150D so as to be rotatable around the pivot axis, and a distal end part 545F extending from the proximal end part 541F toward the lower leg frame 40.

As shown in, for example, FIG. 43, in the present embodiment, the proximal end part 541F supports the driven-side bevel gear 117 so as to be integrally rotated around the pivot axis Y and, thereby, the driven-side bevel gear 117 and the proximal end part 541F are integrally rotated around the pivot axis Y by rotational power from the driver 110.

In the present embodiment, the proximal end part 541F is in a substantially upright flat plate form.

As shown in FIGS. 42 and 43, a distal end surface 546F of the distal end part 545F forms an opposing surface facing the outer surface of the lower leg frame 40 facing outward in the user width direction.

The distal end surface 546F has a predetermined length in a width direction D corresponding to the width direction of the lower leg frame 40 (i.e., the user front-back direction).

In the present embodiment, the distal end part 545F is in a substantially horizontal flat plate form, and the distal end surface 546F is substantially rectangular.

As shown in FIGS. 42 and 43, the lower connecting body 570F has a support hole 571F formed in the distal end part 545F, an engagement pin 572F accommodated in the support hole 571F so as to capable of advancing and retreating, a biasing spring 573F for biasing the engagement pin 572F, and an engagement arm 575F provided on the distal end part 575F.

The support hole 571F is open to the opposing surface in an intermediate region in the width direction of the opposing surface and extends in a direction substantially perpendicular to the outer surface of the lower leg frame 40.

The engagement pin 572F is accommodated in the support hole 571F so as to be axially movable such that the distal end can take a projecting position where the distal end projects from the opposing surface and a retreated position where the distal end is in the support hole 571F so as to be away from the lower leg frame 40.

The biasing spring 573F biases the engagement pin 572F toward the projecting position.

In the present embodiment, the biasing spring 573F is interposed between the proximal end part of the engagement pin 572F and the back surface of the support hole 571F.

Specifically, in the present embodiment, the support hole 571F is formed in the distal end part 575F such that one end side is open to the opposing surface and the other end side is open to the back surface opposite the opposing surface, and the other end side of the support hole 571F is closed by a closing plate 548F fixed to the back surface of the distal end part 575F. In this case, the closing plate 548F forms the back surface of the support hole 571F.

The engagement arm 575F has an axially extending part 576F extending along the pivot axis Y from the opposing surface toward the lower leg frame 40.

A width-direction separating distance between the axially extending part 576F and the engagement pin 572F is set such that the lower leg frame 40 can be disposed between the axially extending part 576F and the engagement pin 572F with respect to the width direction of the lower frame 540F.

That is, the width-direction separating distance between the engagement pin 572F and the axially extending part 576F is greater than the width of the lower leg frame 40 such that the lower leg frame 40 can be positioned between the engagement pin 572F and the axially extending part 576F with respect to the user front-back direction.

Here, an operation for attaching the lower frame 540F to the lower leg frame 40 by the lower connecting body 570F will now be described.

Figure 44:
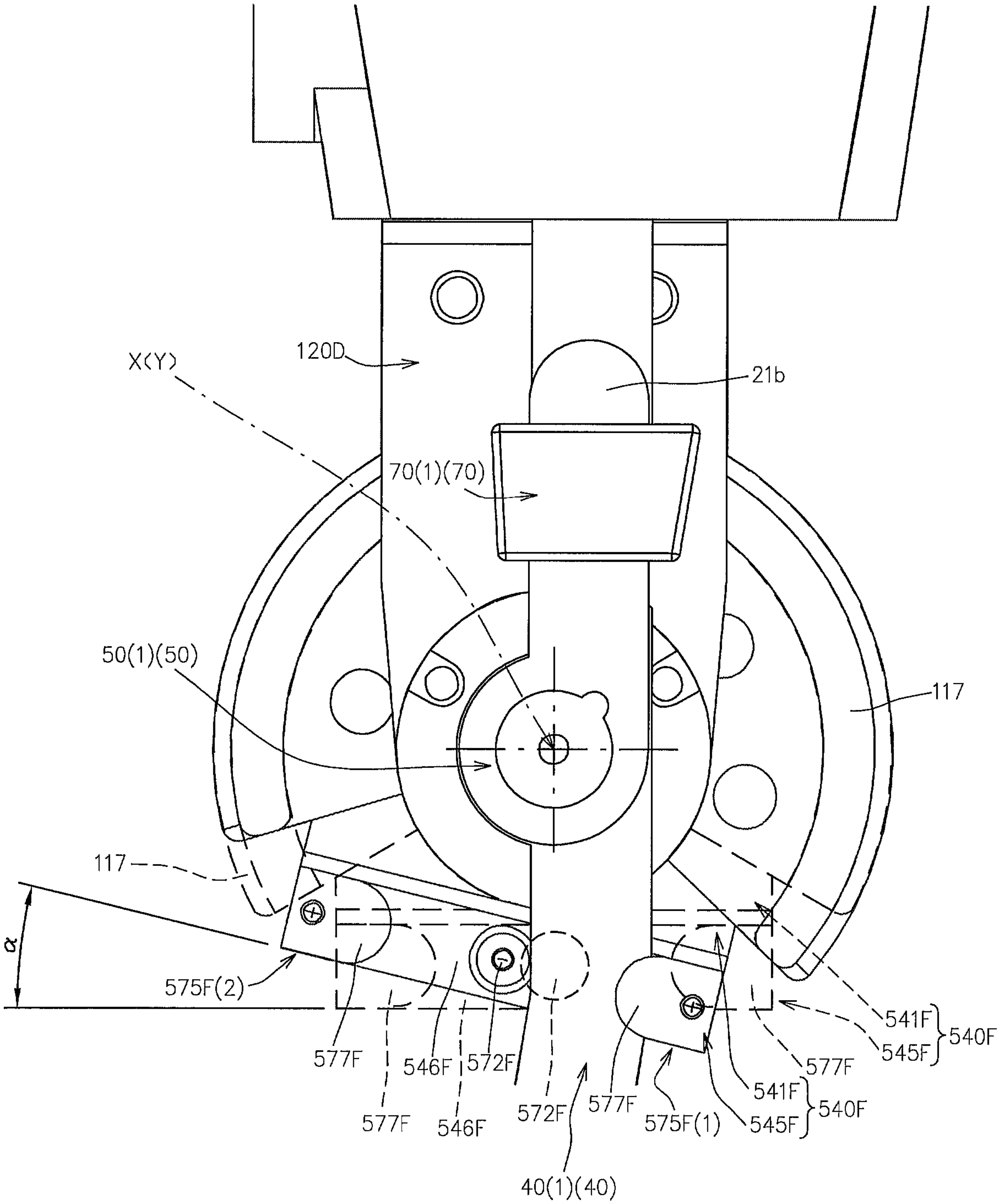
FIG. 44 is an end view taken along line XXXXIV-XXXXIV in FIG. 40.

FIG. 44 shows an end view taken along the line XXXXIV-XXXXIV in FIG. 40.

When connecting the lower frame 540F to the lower leg frame 40 by the lower connecting body 570F, first the actuator unit 100F and the knee-ankle-foot orthosis 1 are relatively moved in the pivot axis Y direction to a position where the lower leg frame 40 overlaps the axially extending part 576F with respect to the direction parallel to the pivot axis Y, while positioning the engagement pin 572F in the retreated position against the biasing force of the biasing spring 573F.

At this time, preferably, movement of the engagement pin 572F to the retreated position can be performed via the outer surface of the lower leg frame 40.

That is, the actuator unit 100F can be relatively moved toward the lower leg frame 40 such that the engagement pin 572F is moved from the projecting position to the retreated position, with the outer surface of the lower leg frame 40 being in contact with the engagement pin 572F.

This state is indicated by broken lines in FIG. 44.

From the state indicated by broken lines in FIG. 44, rotating the lower frame 540F in a connecting direction around the pivot axis Y (the clockwise direction in FIG. 44) cancels contact between the engagement pin 572F and the lower leg frame 40, and brings the engaging pin 572F from the retreated position to the projecting position due to the biasing force of the biasing spring 573F.

Accordingly, the lower leg frame 40 is sandwiched between the engagement pin 572F and the axially extending part 576F with respect to the width direction of the lower frame 540F (the user front-back direction) (see solid lines in FIG. 44). Thus, with the lower frame 540F being relatively movable in the longitudinal direction of the frame relative to the lower leg frame 40, an interlocking state is attained where the lower leg frame 40 is rotated around the swing axis X relative to the thigh frame 20 in conjunction with the rotational movement of the lower frame 540F around the pivot axis Y relative to the upper frame 120D.

By reversing the operation performed during attachment, the lower frame 540F connected to the lower leg frame 40 by the lower connecting body 570F can be detached.

That is, when the lower frame 540F is connected to the lower leg frame 40 by the lower connecting body 570F, the engagement pin 572F is positioned in the projecting position due to the biasing force of the biasing spring 573F.

By pressing the engagement pin 572F in the projecting position to the retreated position against the biasing force of the biasing spring 573F by manual operational force and rotating the lower frame 540F in the cancelling direction around the pivot axis Y (the counterclockwise direction in FIG. 44), a state where the distal end part of the engagement pin 572F is in contact with the outer surface of the lower leg frame 40 is attained (the state indicated by broken lines in FIG. 44).

Thereafter, by relatively moving the lower leg frame 40 and the lower frame 540F in mutually separating directions, the lower frame 540F can be detached from the lower leg frame 40.

Preferably, the engagement arm 575F includes a width-direction extending part 577F extending from the axially extending part 576F toward the engagement pin 572F with respect to a width direction W of the opposing surface and facing the inner surface of the lower leg frame 40 (the side surface facing inward relative to the user width direction), with the lower frame 540F being connected to the lower leg frame 40.

The width-direction extending part 577F is configured such that the axially separating distance between the width-direction extending part 577F and the distal end surface 546F is greater than the thickness of the lower leg frame 40 such that the lower leg frame 40 can be disposed in a retaining space 570S (see FIG. 42) surrounded by the engagement pin 572F, the distal end surface 546F forming the opposing surface, the axially extending part 576F, and the width-direction extending part 577F.

By providing the engagement arm 575F with the width-direction extending part 577F, the lower frame 540F and the lower leg frame 40 can be effectively prevented from relatively moving away from each other in the pivot axis Y directions in the state where the lower frame 540F is connected to the lower leg frame 40 by the lower connecting body 570F. Accordingly, unintentional detachment of the lower frame 540F from the lower leg frame 40 can be effectively prevented.

In the present embodiment, the engagement arm 575F has first and second engagement arms 575F(1), 575F(2) respectively provided on one side and the other side in the width direction of the opposing surface, and is capable of connecting the lower frame 540F to the lower leg frame 40 even when the lower frame 540F is rotated in any direction around the pivot axis Y from the state indicated by broken lines in FIG. 44.

In the present embodiment, as shown in FIG. 44, the swing axis X is off-center toward one side in the width direction (the user front-back direction) of the lower leg frame 40 relative to the center in the width direction (the user front-back direction) of the lower leg frame 40. In FIG. 44, the swing axis X is off-center toward the back with respect to the user front-back direction relative to the width direction center of the lower leg frame 40.

Concerning such knee-ankle-foot orthosis 1, as in the present embodiment, the actuator unit 100F can be attached to any of the left foot side and the right foot side of the knee-ankle-foot orthosis 1 by disposing the engagement pin 572F in the center in the width direction (the user front-back direction) of the lower frame 140, and configuring the engagement arm 575F to have the first and second engagement arms 575F(1), 575F(2) that are respectively positioned on one side and the other side in the width direction of the lower frame 140 (the front side and the back side with respect to the user front-back direction), with the engagement pin 572F in-between.

That is, when attaching the actuator unit 100F to the left foot side of the knee-ankle-foot orthosis 1, the lower leg frame 40 can be sandwiched between the engagement pin 572F and the first engagement arm 575F(1), and when attaching the actuator unit 100F to the right foot side of the knee-ankle-foot orthosis 1, the lower leg frame 40 can be sandwiched between the engagement pin 572F and the second engagement arm 575F(2).

In the present embodiment, as shown in FIGS. 39 and 44, the actuator unit 100F is attached to the knee-ankle-foot orthosis 1 such that the lower leg frame 40 is sandwiched between the engagement pin 572F and the first engagement arm 575F(1) positioned on the front side with respect to the user front-back direction, but when it is desired to increase the rotational angle of the lower leg frame 40 relative to the thigh frame 20, the actuator unit 100F can be attached to the knee-ankle-foot orthosis 1 such that the lower leg frame 40 is sandwiched between the engagement pin 572F and the second engagement arm 575F(2) positioned on the back side with respect to the user front-back direction.

That is, when the lower leg frame 40 is sandwiched between the engagement pin 572F and the first engagement arm 575F(1) positioned on the front side with respect to the user front-back direction, the initial orientation of the lower frame 540F (the orientation of the lower frame 540F when a user is in substantially upright posture with the actuator unit 100F being attached to the knee-ankle-foot orthosis 1, and the orientation indicated by solid lines in FIG. 44) is an orientation reached by rotating the lower frame 540F a predetermined angle α in the clockwise direction around the pivot axis Y from the horizontal orientation (the orientation indicated by broken lines in FIG. 44) as viewed from the inner side in the user width direction.

Here, given the movement of a leg when a user wearing the knee-ankle-foot orthosis 1 equipped with the actuator unit 100F walks, the lower leg frame 40 is rotated in the clockwise direction relative to the thigh frame 20 as viewed from the inner side in the user width direction.

Accordingly, in the initial orientation with the actuator unit 100F being attached to the knee-ankle-foot orthosis 1, assuming that the lower frame 140 is rotated the predetermined angle α in the clockwise direction around the pivot axis Y from a horizontal orientation (the orientation indicated by broken lines in FIG. 44) as viewed from the inner side in the user width direction, the range in which pressing force can be applied in the bending direction of the knee to assist the user's gait movement, i.e., the rotation range in which the lower frame 540F can be rotated in the clockwise direction around the pivot axis Y as viewed from the inner side in the user width direction, is reduced to an extent corresponding to the predetermined angle α in reference to the horizontal orientation.

On the other hand, attaching the actuator unit 100F to the knee-ankle-foot orthosis 1 such that the lower leg frame 40 is sandwiched between the engagement pin 572F and the second engagement arm 575F(2) positioned on the back side with respect to the user front-back direction brings the lower frame 540F into an orientation wherein the lower frame 540F is rotated the predetermined angle α in the counter-clockwise direction around the pivot axis Y from the horizontal orientation (the orientation indicated by broken lines in FIG. 44) as viewed from the inner side in the user thickness direction in the initial orientation (the orientation wherein the user is in a substantially upright state).

Accordingly, the range in which pressing force can be applied in the knee bending direction to assist the user's gait movement, i.e., the rotation range in which the lower frame 540F can be rotated in the clockwise direction around the pivot axis Y as viewed from the inner side in the user width direction, can be increased to an extent corresponding to the predetermined angle α in reference to the horizontal orientation.

The lower connecting body 570F of the present embodiment is applicable to the actuator units 100D, 100E of the third embodiment, and the upper connecting body 560F is applicable to the actuator units 100D, 100E of the third embodiment.

Likewise, the lower connecting body 170D of the third embodiment is applicable to the actuator unit 100F according to the fourth embodiment, and the upper connecting body 160D is applicable to the actuator unit 100F of the fourth embodiment.

DESCRIPTION OF THE REFERENCE NUMERALS

1 Knee-ankle-foot orthosis
10 Thigh attachment
20(1) Outer side thigh frame (first thigh frame)
20*a* Thigh frame attachment hole
30 Lower leg attachment
40(1) Outer side lower leg frame (first lower leg frame)
40*a* Lower leg frame attachment hole
50 Brace-side rotational connecting part
51 Swinging connector
52 Internally threaded member
53 Cylindrical part
54 Flange part
55 Externally threaded member
56 Cylindrical part
57 Flange part
100 Actuator unit
110 Driver
120 Upper frame
121 Upper frame main body
121*a* Downward extending portion
122 Connecting wall body
123 Outer wall body
140 Lower frame
141 First lower frame
142 Second lower frame
145 Swing shaft
150 Actuator-side rotational connecting par
151 Swing shaft
250 Upper connecting body
251 Upper rotational shaft
260 Upper fastening member
261 Bearing part
263 Cam part
265 Operation arm
267 Engagement arm
267*a* Engagement groove
270 Upper receiving member
271 Elastic roller
275 Upper receiving shaft
300 Intermediate connecting body
310 Ball stud
311 Shaft part
313 Spherical head part
313*a* Large diameter part
313*b* Distal end-side spherical surface part
313*c* Proximal end-side spherical surface part
315 Axial hole
315*a* Large diameter hole
315*b* Small diameter hole
315*c* Step
317 Fastening member
317*a* Head part
317*b* Shaft part
317*c* Radially extending part
330 Accommodation depression
340 Retaining member
350 Lower connecting body
351 Lower rotational shaft
360 Lower fastening member
361 Bearing part
363 Cam part
365 Operation arm
367 Engagement arm
367*a* Engagement groove
370 Lower receiving member
371 Elastic roller
X Brace-side pivot axis
Y Actuator-side pivot axis

The invention claimed is:

1. An actuator unit attachable to a knee-ankle-foot orthosis including a thigh attachment and a lower leg attachment to be respectively attached to user's thigh and lower leg, a thigh frame and a lower leg frame respectively supporting the thigh attachment and the lower leg attachment, and a brace-side rotational connecting part connecting the thigh frame and the lower leg frame such that the lower leg frame is rotatable relative to the thigh frame around a brace-side pivot axis that is coaxial with a swing axis of a user's knee joint, the actuator unit comprising:
- an upper frame connectable to the thigh frame;
- a lower frame connectable to the lower leg frame;
- an actuator-side rotational connecting part connecting the upper and lower frames such that the lower frame is rotatable around an actuator-side pivot axis relative to the upper frame;
- a driver mounted on an outer surface of the upper frame and producing a driving force for rotating the lower frame around the actuator-side pivot axis;
- an upper connecting body connecting the upper frame to the thigh frame;
- an intermediate connecting body connecting a vicinity of the actuator-side rotational connecting part to a vicinity of the brace-side rotational connecting part;
- a lower connecting body connecting the lower frame to the lower leg frame such that the lower leg frame is rotated around the brace-side pivot axis relative to the thigh frame by utilizing a rotational movement of the lower frame around the actuator-side pivot axis relative to the upper frame; and the intermediate connecting body being provided with a ball stud provided on one of the knee-ankle-foot orthosis and the actuator unit concentrically with the corresponding pivot axis, and an accommodation depression that is provided on another of the knee-ankle-foot orthosis and the actuator unit concentrically with the corresponding pivot axis in such a manner that a spherical head part of the ball stud is rotatably and detachably accommodated in the accommodation depression.

2. The actuator unit according to claim 1, wherein:

the spherical head part has a large diameter part having the largest diameter, a distal end-side spherical surface part, a diameter of which is reduced toward a distal end side from the large diameter part, and a proximal end-side spherical surface part, a diameter of which is reduced toward a proximal end side from the large diameter part;

the accommodation depression is provided with an annular engagement groove at a portion, which the proximal end-side spherical surface part of the spherical head part faces when the spherical head part is accommodated in the accommodation depression;

a retaining member is inserted into the annular engagement groove; and the retaining member is shaped such that a force for expanding the retaining member in a radially outward direction is exerted on the retaining member by a movement of the spherical head part in an axial direction, and the retaining member is inserted into the annular engagement groove to prevent passage of the large diameter part of the spherical head part when the force resulting from the movement of the spherical head part in the axial direction is equal to or less than a predetermined value and to be elastically deformed in the radially outward direction by the spherical head part and permit passage of the large diameter part of the spherical head part when the force exceeds the predetermined value.

3. The actuator unit according to claim 1, wherein:

the upper frame has an upper frame main body extending vertically to face the thigh frame, a connecting wall body extending outward in a user width direction from a vertically intermediate position of the upper frame main body, and an outer wall body extending downward from the connecting wall body to be opposed to a downward extending portion of the upper frame main body, which extends downward below the connecting wall body, while retaining an accommodating space in the user width direction between the outer wall body and the downward extending portion;

the actuator-side rotational connecting part has a swing shaft, which is supported by the downward extending portion and the outer wall body such that the swing shaft crosses the accommodating space in the user width direction, defines the actuator-side pivot axis, and supports the lower frame; and the ball stud is provided on the knee-ankle-foot orthosis, and the accommodation depression is provided on the downward extending portion to be open toward the knee-ankle-foot orthosis.

4. The actuator unit according to claim 3, wherein:

the brace-side rotational connecting part has a swinging connector for connecting the thigh frame and the lower leg frame to be rotatable around the brace-side pivot axis by being inserted into a brace-side frame attachment hole formed by a thigh frame attachment hole provided in the thigh frame coaxially with the brace-side pivot axis and a lower leg frame attachment hole provided in the lower leg frame coaxially with the brace-side pivot axis;

the swinging connector has an internally threaded member and an externally threaded member, the internally threaded member including a cylindrical part to be inserted into the brace-side frame attachment hole from one side in the user width direction and a flange part extending more radially outward than the brace-side frame attachment hole from the one side in the user width direction of the cylindrical part, the cylindrical part having a screw hole that is open toward a free end side, the externally threaded member having a cylindrical part that has an external thread to be screwed into the screw hole from another side in the user width direction and a flange part that extends more radially outward than the brace-side frame attachment hole from the another side in the user width direction of the cylindrical part; and the ball stud is provided on the knee-ankle-foot orthosis by being screw-connected to an inner threaded member positioned on an inner side in the user width direction among the internally threaded member and the externally threaded member in place of an outer threaded member positioned on an outer side in the user width direction among the internally threaded member and the externally threaded member.

5. The actuator unit according to claim 4, wherein:

the internally threaded member is the inner threaded member;

the ball stud is screw-connected to the inner threaded member via a fastening member inserted in an axial hole that penetrates the ball stud in an axial direction;

the axial hole has a large diameter hole that is open on a side where the spherical head part is positioned with respect to the axial direction, a small diameter hole that is open on a side opposite to the spherical head part with respect to the axial direction, and a step connecting the large diameter hole and the small diameter hole; and the fastening member has a head part inserted in the large diameter hole and a shaft part that is reduced in diameter from the head part via a radially extending part and that penetrates the small diameter hole to extend outward, a portion of the shaft part extending outward, with the radially extending part being in contact with the step, has a screw structure screwed into the internally threaded member.

6. The actuator unit according to claim 1, wherein:

the upper connecting body includes an upper rotational shaft provided on the upper frame to extend inward in a user width direction, an upper fastening member supported by the upper rotational shaft to be rotatable around an axis of the upper rotational shaft, and an upper receiving member supported by the upper frame in a position spaced apart in a user front-back direction from the upper rotational shaft at a distance that enables the thigh frame to be interposed between the upper receiving member and the upper rotational shaft;

the upper fastening member has a bearing part supported by the upper rotational shaft and a cam part extending radially outward from the bearing part;

the cam part is configured such that a radial distance between an outer circumferential surface of the cam part and the axis of the upper rotational shaft is increased toward a first side around the axis of the upper rotational shaft; and in a state where the upper fastening member is positioned in a released position around the upper rotational shaft, relatively moving the upper frame and the thigh frame toward each other with respect to the user width direction enables the thigh frame to be positioned in a space between the upper fastening member and the upper receiving member, and in a state where the thigh frame is positioned in the space, relatively moving the upper frame and the thigh frame away from each other with respect to the user width direction enables the thigh frame to be retreated from the space, while, in the state where the thigh frame is positioned in the space, rotating the upper fastening member from the released position around the upper rotational shaft to a second side opposite to the first side around the axis causes the cam part to hold the thigh frame in cooperation with the upper receiving member with respect to the user front-back direction, and thereby the upper frame is connected to the thigh frame.

7. The actuator unit according to claim 6, wherein:

the upper fastening member has an operation arm extending radially outward from the bearing part in a position circumferentially different from the cam part; and a radial length between a free end of the operation arm and the axis of the upper rotational shaft is greater than a radial length between a radially outermost end of the cam part and the axis of the upper rotational shaft.

8. The actuator unit according to claim 6, wherein:

the upper connecting body includes an upper receiving shaft provided on the upper frame to extend inward in the user width direction;

the upper receiving member includes an elastic roller supported by the upper receiving shaft;

the upper fastening member has an engagement arm extending radially outward from the bearing part in a position more inside in the user width direction than the cam part; and the engagement arm is provided with an engagement groove for engagement with a portion of the upper receiving shaft, which extends more inward in the user width direction than the elastic roller, when the upper fastening member is rotated around the upper rotational shaft from the released position toward the second side around the axis to hold the thigh frame with respect to the user front-back direction in cooperation with the upper receiving member.

9. The actuator unit according to claim 1, wherein:

the lower connecting body includes a lower rotational shaft provided on the lower frame to extend inward in a user width direction, a lower fastening member supported by the lower rotational shaft to be rotatable around an axis of the lower rotational shaft and a lower receiving member supported by the lower frame in a position spaced apart in a user front-back direction from the lower rotational shaft at a distance that enables the lower leg frame to be interposed between the lower fastening member and the lower rotational shaft;

the lower fastening member has a bearing part supported by the lower rotational shaft and a cam part extending radially outward from the bearing part;

the cam part is configured such that a radial distance between an outer circumferential surface of the cam part and the axis of the lower rotational shaft is increased toward a first side around the axis of the lower rotational shaft; and in a state where the lower fastening member is positioned in a released position around the lower rotational shaft, relatively moving the lower frame and the lower leg frame toward each other with respect to the user width direction enables the lower leg frame to be positioned in a space between the lower fastening member and the lower receiving member, and in a state where the lower leg frame is positioned in the space, relatively moving the lower frame and the lower leg frame away from each other with respect to the user width direction enables the lower leg frame to be retreated from the space, while, in the state where the lower leg frame is positioned in the space, axially rotating the lower fastening member from the released position around the lower rotational shaft to a second side opposite to the first side causes the cam part to hold the lower leg frame in cooperation with the lower receiving member with respect to the user front-back direction, and thereby the lower frame is connected to the lower leg frame.

10. The actuator unit according to claim 9, wherein:

the lower fastening member has an operation arm extending radially outward from the bearing part in a position circumferentially different from the cam part; and the operation arm is configured such that a radial length between a free end of the operation arm and the axis of the lower rotational shaft is greater than a radial length between a radially outermost end of the cam part and the axis of the lower rotational shaft.

11. The actuator unit according to claim 9, wherein:

the lower connecting body includes a lower receiving shaft provided on the lower frame to extend inward in the user width direction;

the lower receiving member includes an elastic roller supported by the lower receiving shaft;

the lower fastening member has an engagement arm extending radially outward from the bearing part in a position more inside in the user width direction than the cam part; and the engagement arm is provided with an engagement groove for engagement with a portion of the lower receiving shaft, which extends more inward in the user width direction than the elastic roller, when the lower fastening member is rotated around the lower rotational shaft from the released position toward the second side around the axis of the lower rotational shaft to hold the lower leg frame with respect to the user front-back direction in cooperation with the lower receiving member.

12. The actuator unit according to claim 9, wherein:

the lower frame includes a first lower frame connected to the upper frame via the actuator-side rotational connecting part to be rotatable around the actuator-side pivot axis, and a second lower frame directly or indirectly supporting the lower rotational shaft and the lower receiving member; and the second lower frame is connected to the first lower frame to be rotatable around a swing shaft in the user front-back direction.

* * * * *